United States Patent
Iizuka et al.

(10) Patent No.: US 7,362,324 B2
(45) Date of Patent: Apr. 22, 2008

(54) STEREO IMAGE DISPLAY APPARATUS AND METHOD, AND STORAGE MEDIUM

(75) Inventors: Yoshio Iizuka, Kanagawa (JP); Tomoaki Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 10/932,361

(22) Filed: Sep. 1, 2004

(65) Prior Publication Data

US 2005/0035963 A1 Feb. 17, 2005

Related U.S. Application Data

(62) Division of application No. 09/949,967, filed on Sep. 10, 2001, now Pat. No. 6,911,975.

(30) Foreign Application Priority Data

Sep. 11, 2000 (JP) ............................. 2000-275303
Sep. 12, 2000 (JP) ............................. 2000-276730

(51) Int. Cl.
*G06T 15/00* (2006.01)
(52) U.S. Cl. ..................... 345/419; 348/51; 348/56
(58) Field of Classification Search ................ 345/419, 345/421, 427, 619; 382/154; 348/51, 56, 348/59
See application file for complete search history.

(56) References Cited

U.S. PATENT DOCUMENTS

| | | | | |
|---|---|---|---|---|
| 4,740,073 A | * | 4/1988 | Meacham ..................... 352/58 |
| 5,574,836 A | * | 11/1996 | Broemmelsiek ............ 345/427 |
| 5,742,332 A | * | 4/1998 | Imai et al. .................... 348/51 |
| 5,751,927 A | * | 5/1998 | Wason ........................ 345/419 |
| 5,764,231 A | * | 6/1998 | Ray et al. ................... 345/419 |
| 5,777,720 A | * | 7/1998 | Shapiro et al. ............. 351/237 |
| 5,986,804 A | * | 11/1999 | Mashitani et al. .......... 359/462 |
| 6,201,517 B1 | * | 3/2001 | Sato ............................. 345/7 |
| 6,268,862 B1 | * | 7/2001 | Uchiyama et al. .......... 345/427 |
| 6,549,650 B1 | * | 4/2003 | Ishikawa et al. ............ 382/154 |

OTHER PUBLICATIONS

Kitamura et al., Interactive Stereoscopic Display for Three or More Users, ACM SIGGRAPH 2001, Aug. 12-17, 2001, pp. 231-239.*

* cited by examiner

*Primary Examiner*—Phu K. Nguyen
(74) *Attorney, Agent, or Firm*—Cowan, Liebowitz & Latman, P.C.

(57) ABSTRACT

There is provided a stereo image display apparatus in which a CPU 201 of a PC 101 carries out control in accordance with a stereo image display program such that a suitable viewing position verification image that appears different when a glasses-free type display 102 is viewed from a suitable viewing position to when the glasses-free type display 102 is viewed from elsewhere is displayed on the glasses-free type display 102 in accordance with a user's instructions.

14 Claims, 47 Drawing Sheets

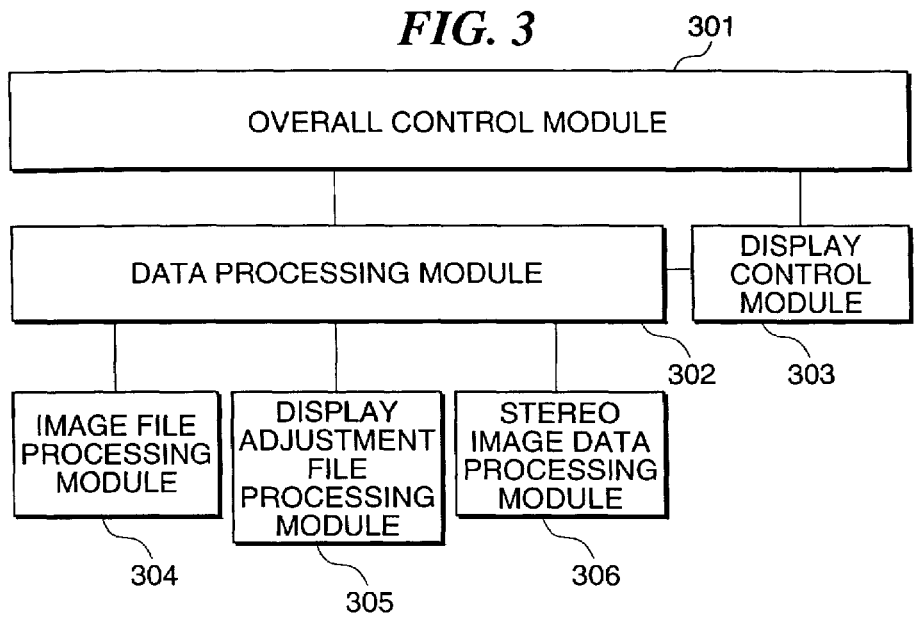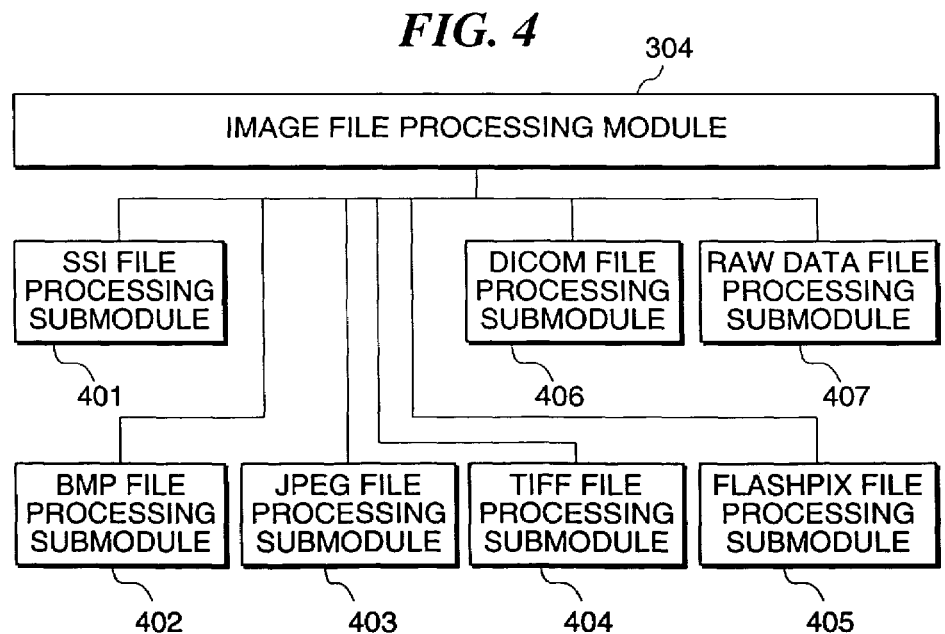

FIG. 5A

```
C:¥scene1¥take11.bmp    C:¥scene1¥take1r.bmp
C:¥scene1¥take21.bmp    C:¥scene1¥take2r.bmp
C:¥scene1¥take31.bmp    C:¥scene1¥take3r.bmp
C:¥scene1¥take41.bmp    C:¥scene1¥take4r.bmp
C:¥scene1¥take51.bmp    C:¥scene1¥take5r.bmp
<P>
C:¥scene2¥take11.bmp    C:¥scene2¥take1r.bmp
C:¥scene2¥take21.bmp    C:¥scene2¥take2r.bmp
C:¥scene2¥take31.bmp    C:¥scene2¥take3r.bmp
C:¥scene2¥take41.bmp    C:¥scene2¥take4r.bmp
C:¥scene2¥take51.bmp    C:¥scene2¥take5r.bmp
<P>
C:¥scene3¥take11.bmp    C:¥scene3¥take1r.bmp
C:¥scene3¥take21.bmp    C:¥scene3¥take2r.bmp
C:¥scene3¥take31.bmp    C:¥scene3¥take3r.bmp
C:¥scene3¥take41.bmp    C:¥scene3¥take4r.bmp
C:¥scene3¥take51.bmp    C:¥scene3¥take5r.bmp
```

FIG. 5B

|        | take1 | take2 | take3 | take4 | take5 |
|--------|-------|-------|-------|-------|-------|
| scene1 | (0,0) | (1,0) | (2,0) | (3,0) | (4,0) |
| scene2 | (0,1) | (1,1) | (2,1) | (3,1) | (4,1) |
| scene3 | (0,2) | (1,2) | (2,2) | (3,2) | (4,2) |

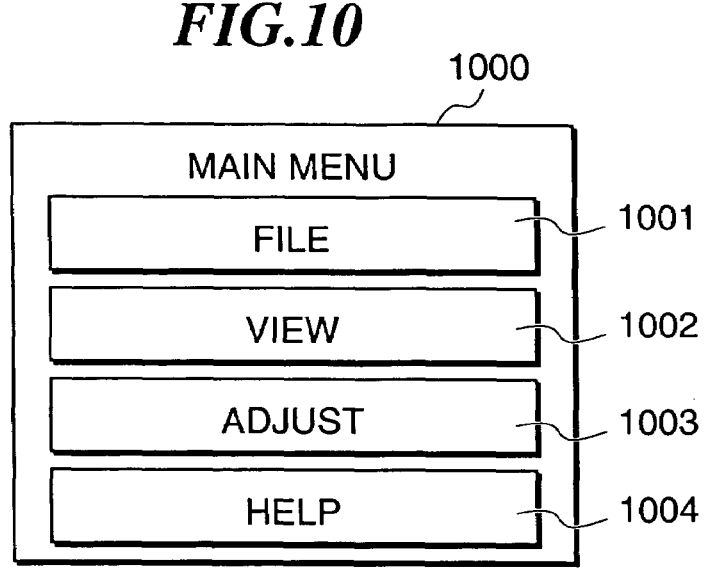
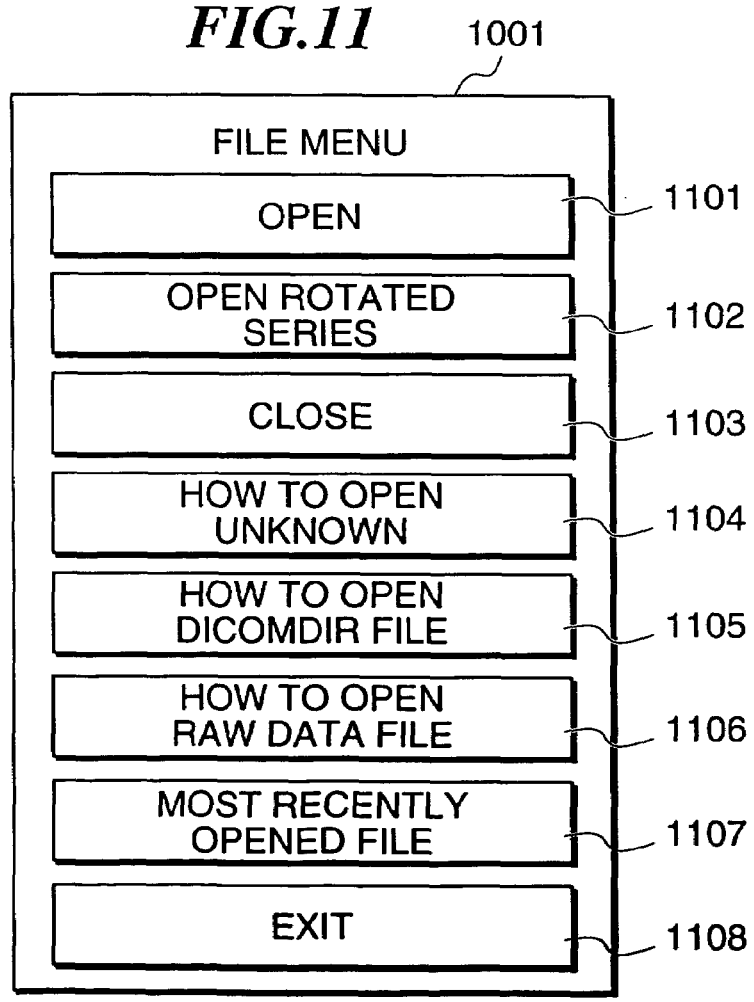

FIG.69
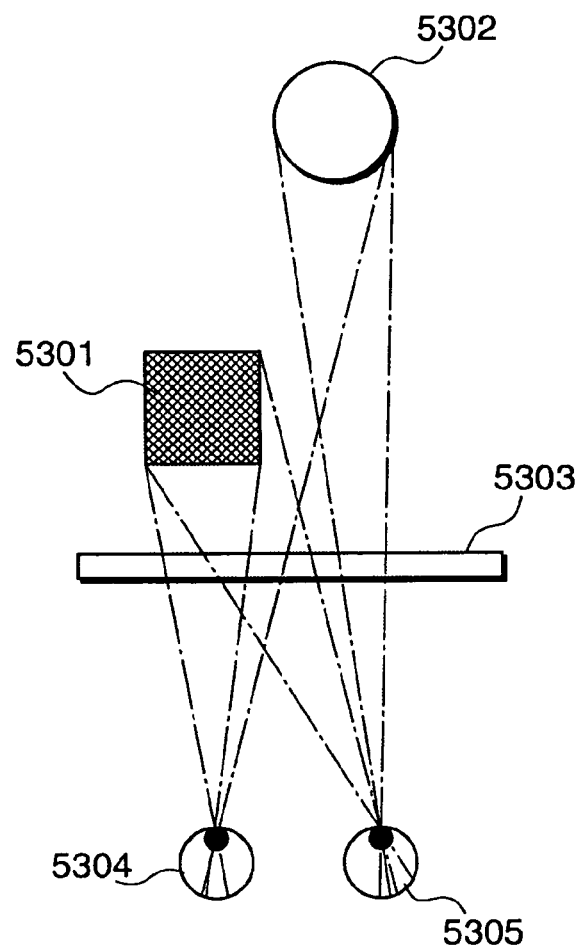
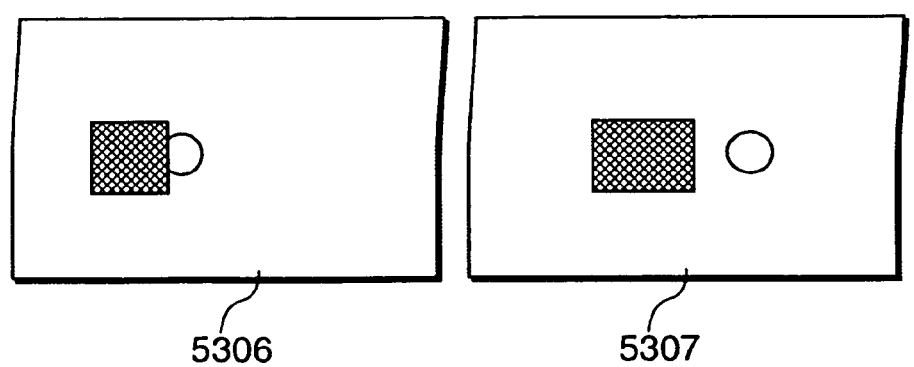

STEREO IMAGE DISPLAY APPARATUS AND METHOD, AND STORAGE MEDIUM

CROSS-REFERENCE TO RELATED APPLICATIONS

This application is a divisional of application Ser. No. 09/949,967, filed Sep. 10, 2001 now U.S. Pat. No. 6,911,975.

BACKGROUND OF THE INVENTION

1. Field of the Invention

The present invention relates to a stereo image display apparatus and method that allows a user to view stereo images three-dimensionally without using special spectacles such as polarizing spectacles or liquid crystal shutter spectacles, and a storage medium storing a program for implementing the method.

2. Prior Art

Conventional glasses-free type stereo image display apparatuses that do not require the use of special spectacles include 3-D (three-dimensional) displays that use a parallax barrier method and 3-D displays that use a lenticular lens method.

Such 3-D displays use the optical properties of a parallax barrier, lenticular lenses or the like, and are designed such that a left eye image and a right eye image displayed on an image display panel are separated to the left and right respectively, thus allowing a user positioned in a suitable viewing position a certain fixed distance perpendicularly in front of the display to see a 3-D image. If the user views the display from a position away from the suitable viewing position, then the 3-D image will not be seen properly.

The following two methods are known for ensuring that the user is always in a suitable viewing position when viewing the display.

In the first method, movement of the user is detected using sensors, a camera or the like, and the suitable viewing position is shifted in accordance with the viewer's movement. According to this method, the suitable viewing position can be shifted left and right by controlling the parallax barrier or lenticular lenses mechanically or electrically.

However, it is difficult to shift the suitable viewing position forward and backward, and hence the user's movement in the forward/backward direction cannot be followed. Moreover, to realize this method, the mechanism of the apparatus must be made more complex, resulting in increased manufacturing costs.

In the second method, when the user is not in the suitable viewing position, the image displayed is changed in a clearly perceptible way, so that the user realizes that he/she has strayed from the suitable viewing position, and can then move back to the suitable viewing position of his/her own accord. In Japanese Patent No. 2951232, a method is disclosed in which this method is put into practice using a parallax barrier base plate.

However, the above conventional example suffers from the following problems. The method disclosed in Japanese Patent No. 2951232 is intimately linked to the design of the parallax barrier type 3-D display, and hence it is unclear whether the method can also be applied to other types of 3-D display. Moreover, the method must be fixedly incorporated into the 3-D display, thus lowering the degree of design freedom. Furthermore, even if the viewer does not wish to verify the suitable viewing position, this function cannot be "switched off".

SUMMARY OF THE INVENTION

With the foregoing in view, it is a first object of the present invention to provide a stereo image display apparatus and method, in which a suitable viewing position verification image (LR pattern) is displayed in a main window in accordance with a user's operations, thus enabling the user to verify the suitable viewing position whenever so desired, regardless of the type of the 3-D display, and a storage medium storing a program for implementing the stereo image display method.

It is a second object of the present invention to provide an image display apparatus and method in which only user interfaces are displayed on the 2-D image display unit, and only 3-D images are displayed on the 3-D image display unit, thereby allowing easily viewable user interfaces and 3-D images to be displayed simultaneously, and a storage medium storing a program for implementing the image display method.

To attain the first object, in a first aspect of the present invention, there is provided a stereo image display apparatus allowing proper viewing from a suitable viewing position of a stereo image in which are composited a left eye image and a right eye image on a display, the stereo image display apparatus comprising display means for displaying a stereo image comprising a left eye image and a right eye image, and display control means for displaying on the display a suitable viewing position verification image that appears different when the display is viewed from the suitable viewing position to when the display is viewed from elsewhere, in accordance with external input.

In a preferred embodiment of the first aspect, the stereo image display control apparatus includes first input means for setting a display method comprising at least one of display position, display range, and display color, of the suitable viewing position verification image.

In a preferred embodiment of the first aspect, the display control means displays the suitable viewing position verification image in the whole of a stereo image display region when no stereo image is displayed on the display, and displays the suitable viewing position verification image in part of the stereo image display region when a stereo image is displayed on the display.

More preferably, the stereo image display apparatus according to the first aspect includes second input means for setting a display method comprising at least one of display position, display range, and display color, of the suitable viewing position verification image displayed in part of the stereo image display region.

Preferably, part or all of the suitable viewing position verification image is composed of a fixed pattern.

In a preferred embodiment of the first aspect, the display control means displays, as the suitable viewing position verification image, a left eye pattern in a predetermined region on the display in pixel positions only seen by a left eye, and a right eye pattern in the predetermined region on the display in pixel positions only seen by a right eye.

Preferably, the display is a glasses-free type 3-D display.

To attain the first object, the first aspect of the present invention also provides a stereo image display method for use in a stereo image display apparatus allowing proper viewing from a suitable viewing position of a stereo image in which are composited a left eye image and a right eye image on a display, the stereo image display method comprising a display step of displaying a stereo image comprising a left eye image and a right eye image on the display, and a display control step of displaying on the display a suitable viewing position verification image that appears different when the display is viewed from the suitable viewing position to when the display is viewed from elsewhere in accordance with external input.

To attain the first object, the first aspect of the present invention further provides a computer-readable storage medium storing a program that implements a stereo image display method for use in a stereo image display apparatus allowing proper viewing from a suitable viewing position of a stereo image in which are composited a left eye image and a right eye image on a display, the stereo image display method comprising a display control step of displaying on the display a suitable viewing position verification image that appears different when the display is viewed from the suitable viewing position to when the display is viewed from elsewhere in accordance with external input.

To attain the second object, a second aspect of the present invention provides an image display apparatus comprising display means comprising a 2-D image display unit and a 3-D image display unit, and display control means for displaying user interfaces on the 2-D image display unit and a 3-D image on the 3-D image display unit.

In a preferred embodiment of the second aspect, the user interfaces displayed on the 2-D image display unit by the display control means include operation menus and operation buttons.

In a preferred embodiment of the second aspect, the 3-D image displayed on the 3-D image display unit by the display control means comprises a left eye image drawn on predetermined lines and a right eye image drawn on lines positioned between the predetermined lines.

To attain the second object, the second aspect of the present invention also provides an image display method for use in an image display apparatus comprising a 2-D image display unit and a 3-D image display unit, the image display method comprising a display control step of displaying user interfaces on the 2-D image display unit, and displaying a 3-D image on the 3-D image display unit.

To attain the second object, the second aspect of the present invention further provides a computer-readable storage medium storing a program that implements an image display method for use in an image display apparatus comprising a 2-D image display unit and a 3-D image display unit, the image display method comprising a display control step of displaying user interfaces on the 2-D image display unit, and displaying a 3-D image on the 3-D image display unit.

To attain the second object, a third aspect of the present invention provides an image display apparatus comprising a 2-D image display unit, a 3-D image display unit, display control means for displaying user interfaces including a 2-D image corresponding to a 3-D image on the 2-D image display unit, and displaying the 3-D image on the 3-D image display unit, and display control linking means for linking together display control of the 2-D image and display control of the 3-D image carried out by the display control means.

In a preferred embodiment of the third aspect, the user interfaces displayed on the 2-D image display unit by the display control means include operation menus, operation buttons, and an image display region.

In a preferred embodiment of the third aspect, the display control means displays, in an image display region of the user interfaces displayed on the 2-D image display unit, as the 2-D image corresponding to the 3-D image, one of a left eye image and a right eye image constituting the 3-D image.

More preferably, one of the left eye image and the right eye image constituting the 3-D image is displayed at reduced size in the image display region.

Preferably, the display control means changes a display magnification of the 3-D image displayed on the 3-D image display unit in accordance with a magnification setting operation carried out using the user interfaces displayed on the 2-D image display unit.

Preferably, the 3-D image displayed on the 3-D image display unit by the display control means comprises a left eye image drawn on predetermined lines and a right eye image drawn on lines positioned between the predetermined lines.

To attain the second object, the third aspect of the present invention also provides an image display method for use in an image display apparatus comprising a 2-D image display unit and a 3-D image display unit, the image display method comprising a display control step of displaying user interfaces including a 2-D image corresponding to a 3-D image on the 2-D image display unit, and displaying the 3-D image on the 3-D image display unit, and a display control linking step of linking together display control of the 2-D image and display control of the 3-D image carried out in the display control step.

To attain the second object, the third aspect of the present invention further provides a computer-readable storage medium storing a program that implements an image display method for use in an image display apparatus comprising a 2-D image display unit and a 3-D image display unit, the image display method comprising a display control step of displaying user interfaces including a 2-D image corresponding to a 3-D image on the 2-D image display unit, and displaying the 3-D image on the 3-D image display unit, and a display control linking step of linking together display control of the 2-D image and display control of the 3-D image carried out in the display control step.

To attain the second object, a fourth aspect of the present invention provides an image display apparatus comprising a 2-D image display unit, a 3-D image display unit, display position setting means for setting a display position of user interfaces, and user interface switching means for constructing the user interfaces using 2-D images when the user interfaces are displayed on the 2-D image display unit, and constructing the user interfaces using 3-D images when the user interfaces are displayed on the 3-D image display unit.

In a preferred embodiment of the fourth aspect, the user interfaces using the 2-D images displayed on the 2-D image display unit by the user interface switching means and the user interfaces using the 3-D images displayed on the 3-D image display unit by the user interface switching means include operation menus and operation buttons.

In a preferred embodiment of the fourth aspect, the user interfaces using the 3-D images displayed on the 3-D image display unit by the user interface switching means comprise a left eye image drawn on predetermined lines and a right eye image drawn on lines positioned between the predetermined lines.

To attain the second object, the fourth aspect of the present invention also provides an image display method for use in an image display apparatus comprising a 2-D image display unit and a 3-D image display unit, the image display method comprising a display position setting step of setting a display position of user interfaces, and a user interface switching step of constructing the user interfaces using 2-D images when the user interfaces are displayed on the 2-D image display unit, and constructing the user interfaces using 3-D images when the user interfaces are displayed on the 3-D image display unit.

To attain the second object, the fourth aspect of the present invention further provides a computer-readable storage medium storing a program that implements an image display method for use in an image display apparatus comprising a 2-D image display unit and a 3-D image display unit, the image display method comprising a display position setting step of setting a display position of user interfaces, and a user interface switching step of constructing the user interfaces using 2-D images when the user interfaces are displayed on the 2-D image display unit, and constructing the user interfaces using 3-D images when the user interfaces are displayed on the 3-D image display unit.

To attain the second object, a fifth aspect of the present invention provides an image display apparatus comprising a 2-D image display unit, a 3-D image display unit, display position setting means for setting a display position of an image, and image switching means for displaying a 2-D image obtained by selecting one of a left eye image and a right eye image when the image is displayed on the 2-D image display unit, and displaying a 3-D image obtained by compositing a left eye image and a right eye image when the image is displayed on the 3-D image display unit.

In a preferred embodiment of the fifth aspect, the 3-D image displayed on the 3-D image display unit by the image switching means comprises a left eye image drawn on predetermined lines and a right eye image drawn on lines positioned between the predetermined lines.

To attain the second object, the fifth aspect of the present invention also provides an image display method for use in an image display apparatus comprising a 2-D image display unit and a 3-D image display unit, the image display method comprising a display position setting step of setting a display position of an image, and an image switching step of displaying a 2-D image obtained by selecting one of a left eye image and a right eye image when the image is displayed on the 2-D image display unit, and displaying a 3-D image obtained by compositing a left eye image and a right eye image when the image is displayed on the 3-D image display unit.

To attain the second object, the fifth aspect of the present invention further provides a computer-readable storage medium storing a program that implements an image display method for use in an image display apparatus comprising a 2-D image display unit and a 3-D image display unit, the image display method comprising a display position setting step of setting a display position of an image, and an image switching step of displaying a 2-D image obtained by selecting one of a left eye image and a right eye image when the image is displayed on the 2-D image display unit, and displaying a 3-D image obtained by compositing a left eye image and a right eye image when the image is displayed on the 3-D image display unit.

The above and other objects, features and advantages of the invention will become more apparent from the following detailed description taken in conjunction with the accompanying drawings.

BRIEF DESCRIPTION OF THE DRAWINGS

FIG. 3 is a block diagram showing the modular constitution of the stereo image display program;

FIG. 4 is a block diagram showing the constitution of an image file processing module of the stereo image display program;

FIGS. 5A and 5B are diagrams showing useful in explaining respectively a very basic example of the contents of an SSI file and the corresponding 2-D image series array;

FIG. 10 is a view showing a main menu;

FIG. 11 is a view showing a file menu;

FIG. 69 is a view showing the principle of stereo vision.

DETAILED DESCRIPTION OF PREFERRED EMBODIMENTS

Embodiments of the present invention will now be described in detail with reference to the drawings.

First, a stereo image display apparatus according to a first embodiment of the present invention will be described. Stereo images handled by the stereo image display apparatus according to the present embodiment may be images created using animation, CG (computer graphics) or the like, images taken by a camera or images read in from a scanner, or images such as the above that have been further processed.

Moreover, in the present embodiment, a left eye image and a right eye image that differ from one another only in a way corresponding to left/right parallax will be referred to as a "stereo pair"; combining such a left eye image and a right eye image together results in a "stereo image". Furthermore, a plurality of stereo images in a certain order will be referred to as an "image series". In the present embodiment, it is assumed that images in an image series can be laid out in a virtual 2-D array, with a top left corner of the array being taken as the origin. One of the dimensions of the 2-D array is a dimension that extends out from the origin in a horizontal direction rightwards, and the other is a dimension that extends out from the origin in a vertical direction downwards.

Moreover, in the present embodiment, dialog boxes are used; If an "OK" or "cancel" button is pressed, then the dialog box is closed. However, if the "OK" button is pressed, then values set using the dialog box are put into effect, whereas if the "cancel" button is pressed, then values set using the dialog box are ignored.

Figure 1:
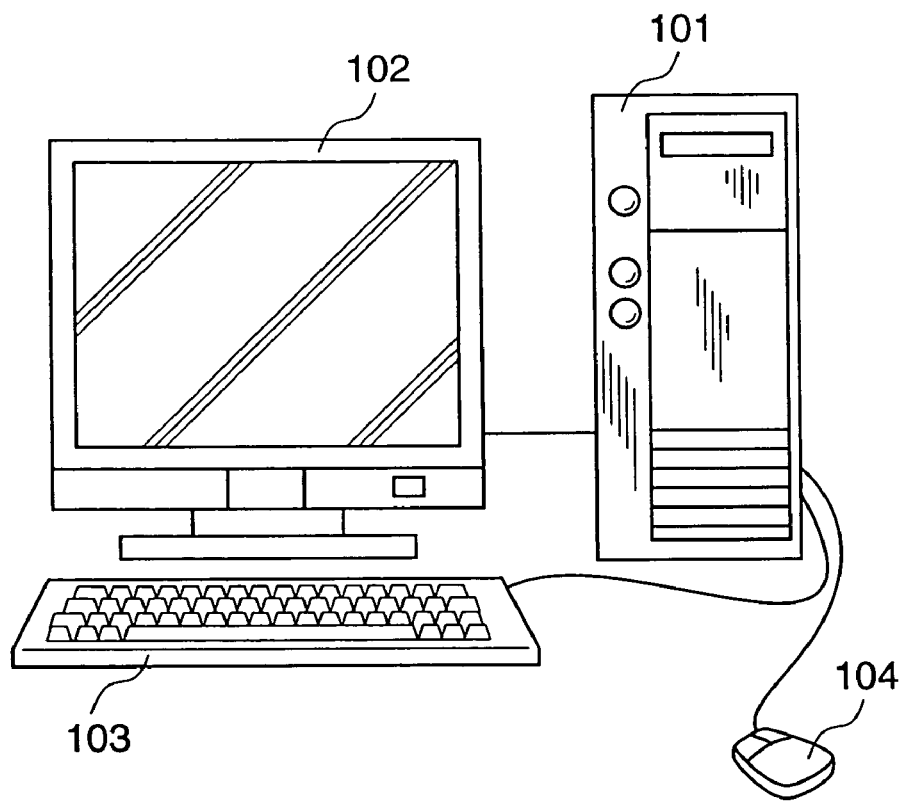
FIG. 1 is a view showing the constitution of a glasses-free type stereo image display apparatus according to a first embodiment of the present invention.

FIG. 1 is a view showing the constitution of a glasses-free type stereo image display apparatus according to the present embodiment. The stereo image display apparatus according to the present embodiment is a glasses-free type which is comprised of a personal computer (PC) 101, a glasses-free type display (DP) 102 (display, first input means, second input means) capable of stereo image display, a keyboard (KB) 103, and a mouse (MS) 104.

The personal computer (PC) 101, which is capable of executing stereo image display software (a stereo image display program) according to the present invention, is connected to the glasses-free type display (DP) 102, the keyboard (KB) 103 and the mouse (MS) 104.

The glasses-free type display (DP) 102 may be a conventional parallax barrier type 3-D display or lenticular type 3-D display, as referred to before as the prior art.

Figure 2:
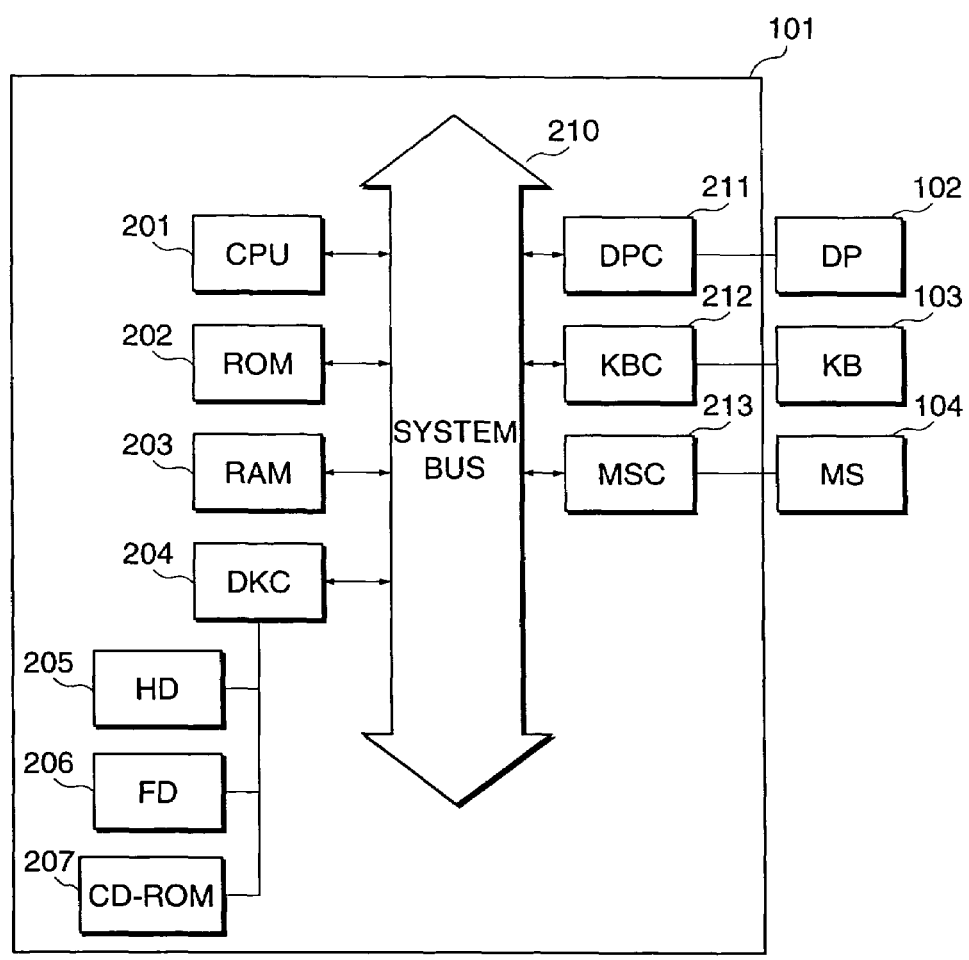
FIG. 2 is a block diagram showing the constitution of a personal computer capable of executing a stereo image display program according to the first embodiment.

FIG. 2 is a block diagram showing the constitution of the personal computer (PC) 101 capable of executing the stereo image display software (stereo image display program) within the stereo image display apparatus according to the present embodiment.

The PC 101 has a CPU 201 (display control means), a ROM 202, a RAM 203, a disk controller (DKC) 204, a hard disk (HD) 205, a floppy disk controller (FD) 206, a CD-ROM drive (CD-ROM) 207, a system bus 210, a display controller (DPC) 211, a keyboard controller (KBC) 212, and a mouse controller (MSC) 213.

The CPU 201 executes a stereo image display program stored in the ROM 202 or the hard disk (HD) 205, or a stereo image display program supplied from the floppy disk controller (FD) 206 or the CD-ROM drive (CD-ROM) 207. The CPU 201 also carries out overall control of the various devices connected to the system bus 210. The ROM 202, which stores programs including the stereo image display program, functions as the main memory, a work area or the like of the CPU 201.

The disk controller (DKC) 204 controls access to the hard disk (HD) 205, which stores a boot program, an OS (operating system), various applications, edited files, user files, possibly the stereo image display program, and the like, the floppy disk controller (FD) 206, and the CD-ROM drive (CD-ROM) 207. The display controller (DPC) 211 controls the displays on the glasses-free type display 102 and other displays (not shown). The keyboard controller (KBC) 212 controls command input from the keyboard (KB) 103. The mouse controller (MSC) 213 controls command input from a pointing device such as the mouse (MS) 104.

In the present embodiment, the stereo image display apparatus is realized using a PC having the same constitution in terms of hardware as an ordinary PC; the stereo image display apparatus is characterized by the software control described below. Moreover, the stereo image display apparatus can be realized using another computer having a similar constitution to the PC capable of realizing the stereo image display apparatus shown in FIG. 1.

In the present embodiment, the stereo image display program is stored in the hard disk (HD) 205. Running of the hardware is carried out mainly by the CPU 201, while software control is carried out mainly-by the stereo image display program stored in the hard disk (HD) 205. It should also be noted that the stereo image display program may be stored on a storage medium such as a floppy disk or a CD-ROM and then supplied therefrom. In this case, the program is read from the storage medium using, for example, the floppy disk controller (FD) 206 or the CD-ROM drive (CD-ROM) 207 shown in FIG. 2, and is installed into the hard disk (HD) 205.

FIG. 3 is a block diagram showing the modular constitution of the stereo image display software (stereo image display program) according to the present embodiment. The stereo image display software (stereo image display program) according to the present embodiment is comprised of an overall control module 301, a data processing module 302, a display control module 303 (display control means), an image file processing module 304, a display adjustment file processing module 305, and a stereo image data processing module 306 (display control means).

The overall control module 301 operates in close cooperation with the OS, and carries out startup and termination of the stereo image display program, control of the cooperative operation of the other modules, storage and retrieval of various set values related to the program as a whole, and so on. The modules directly controlled by the overall control module 301 are the data processing module 302 and the display control module 303.

The data processing module 302 carries out reading of various types of file, processing of stereo image data and so on in response to requests from the overall control module 301 and the display control module 303. The data processing module 302 has three submodules, namely the image file processing module 304, the display adjustment file processing module 305, and the stereo image data processing module 306. The functions of the data processing module 302 are accomplished by controlling these submodules.

The image file processing module 304 reads various types of image file, analyzes the file contents, carries out decoding of compressed data as necessary, and converts the data into image data of a predetermined standard format. The image file processing module 304 will be described in more detail later.

The display adjustment file processing module 305 receives requests from the display control module 303 via the data processing module 302, and saves and reads correction values relating to the display of stereo images into and from files.

Based on correction values received from the display adjustment file processing module 305, the stereo image data processing module 306 combines standard format image data for pairs of left/right images received from the image file processing module 304, creating stereo image data of a format suitable for displaying on the glasses-free type display (DP) 102.

The display control module 303 receives stereo images created by the stereo image data processing module 306 via the data processing module 302, and displays these stereo images on the glasses-free type display (DP) 102. The display control module 303 also receives, via the OS or the overall control module 301, user commands relating to display control inputted from the keyboard (KB) 103 or the mouse (MS) 104, and carries out display control in accordance with these commands. The types of display control will be described later.

FIG. 4 is a block diagram showing the constitution of the image file processing module 304 shown in FIG. 3. The image file processing module 304 according to the present embodiment is comprised of an SSI file processing submodule 401, a BMP (bitmap) file processing submodule 402, a JPEG (Joint Photographic Experts Group: a still image compression format) file processing submodule 403, a TIFF (Tag Image File Format: a format for high-density bitmap image file interchanging) file processing submodule 404, a FlashPix file processing submodule 405, a DICOM file processing submodule 406, and a raw (uncompressed) data file processing submodule 407.

The image file processing module 304 must process various types of image file, and must also be able to cope flexibly even if the number of types of image file to be processed increases further in the future. The image file processing module 304 thus has a submodule for each type of image file, and hence if an extra type of image file is introduced in the future, then it is merely necessary to add a submodule for this type of image file.

More specifically, the SSI file processing submodule 401 reads SSI files and analyzes the contents thereof. The contents of an SSI file and the SSI file processing submodule 401 will be described in more detail later. The BMP file processing submodule 402, the JPEG file processing submodule 403, the TIFF file processing submodule 404, the FlashPix file processing submodule 405, the DICOM file processing submodule 406 and the raw data file processing submodule 407 read BMP files, JPEG files, TIFF files, FlashPix files, DICOM files and raw data files respectively, analyze the contents thereof, carry out decoding of compressed data as necessary, and convert the data into image data of the predetermined standard format.

The BMP file specification is described in manuals of the Windows series, Windows being an OS made by Microsoft. The JPEG file specification is described in ISO (International Organization for Standardization)/IEC (International Electrotechnical Commission) 10918. The TIFF file specification is described in the document "TIFF Revision 6.0" distributed by Adobe Systems. The FlashPix file specification is described in the document "FlashPix Format Specification Version 1.01" distributed by Kodak. The DICOM file specification is described in "NEMA Standards Publication PS 3.1-1992: Digital Imaging and Communications in Medicine (DICOM)", and is the international standard in the medical field.

Raw data file, on the other hand, is a general term for any uncompressed data file that does not fall under any of the above types; the format is not particularly stipulated. Raw data files will be described later when a description is given of menus.

In the present embodiment, it is assumed that only one frame is contained in a single BMP file, JPEG file, TIFF file or FlashPix file. A single TIFF file or FlashPix file may contain two or more frames, but in this case only the first frame will be read, with subsequent frames being ignored. The file names of BMP files, JPEG files, TIFF files and FlashPix files can be written in an SSI (stereo sequential image) file, which represents an ordered series of stereo pairs of left/right images.

Moreover, in the present embodiment, it is assumed that a single DICOM file or raw data file contains one or more frames. An image series can thus be represented using a single DICOM file or raw data file. In this case, the frames contained in the DICOM file or raw data file are arranged along only the topmost row of the 2-D array of the image series.

That is, the frames are arranged in the order in which they were stored in the file rightwards from the origin of the 2-D array (the top left position). The file names of DICOM files and raw data files can be written in an SSI file, but in this case it will be assumed that each of the DICOM files or raw data files whose names are written in the SSI file contains only one frame, and hence any subsequent frames contained in the DICOM files or raw data files will be ignored.

This is because, as described later, an SSI file is a file for representing an image series, and if each image file whose name is written in the SSI file further represents an image series, then a multiple series will result and hence processing of the image series will become very complex. To avoid this complexity, processing is carried out under the presupposition that each image file whose name is written in the SSI file contains only one frame.

FIGS. 5A and 5B are diagrams showing respectively a very basic example of the contents of an SSI file and the corresponding 2-D image series array, according to the present embodiment. The SSI file format has been independently stipulated by the inventors of the present invention. For brevity, the SSI file format will not be described in full here, but rather only the items relevant to the present invention will be described.

An SSI file is a file for representing an image series, and does not itself contain image data.

The names of left eye and right eye image files (stereo file name pairs) contained in an image series are stored in order in an SSI file, along with predetermined control character strings.

The two file names written on each line in the example shown in FIG. 5A are the names of a left eye image file and a right eye image file, respectively. The character string "<P>" is a control character string for shifting the position in the 2-D image series array to the far left of the next row down.

FIG. 5B shows the 2-D image series array corresponding to the SSI file contents shown in FIG. 5A. In FIG. 5B, the large rectangle represents the 2-D image series array, and the small rectangles represent the elements of the 2-D array, i.e. the stereo images or the stereo file name pairs. The position of each element in the 2-D array is written in the corresponding small rectangle in the form "(x-coordinate, y-coordinate)".

The SSI file processing submodule 401 shown in FIG. 4 reads the lines of the SSI file in order, and stores the stereo file name pairs in the corresponding order in a pre-prepared 2-D array.

The storage position starts at the origin (0,0) of the 2-D array and then moves progressively to the right. When a control character string "<P>" appears in the SSI file, the storage position moves to the far left of the next row down. The SSI file processing submodule 401 thus stores the stereo file name pairs written in the SSI file in corresponding positions in the 2-D array.

Figure 6:
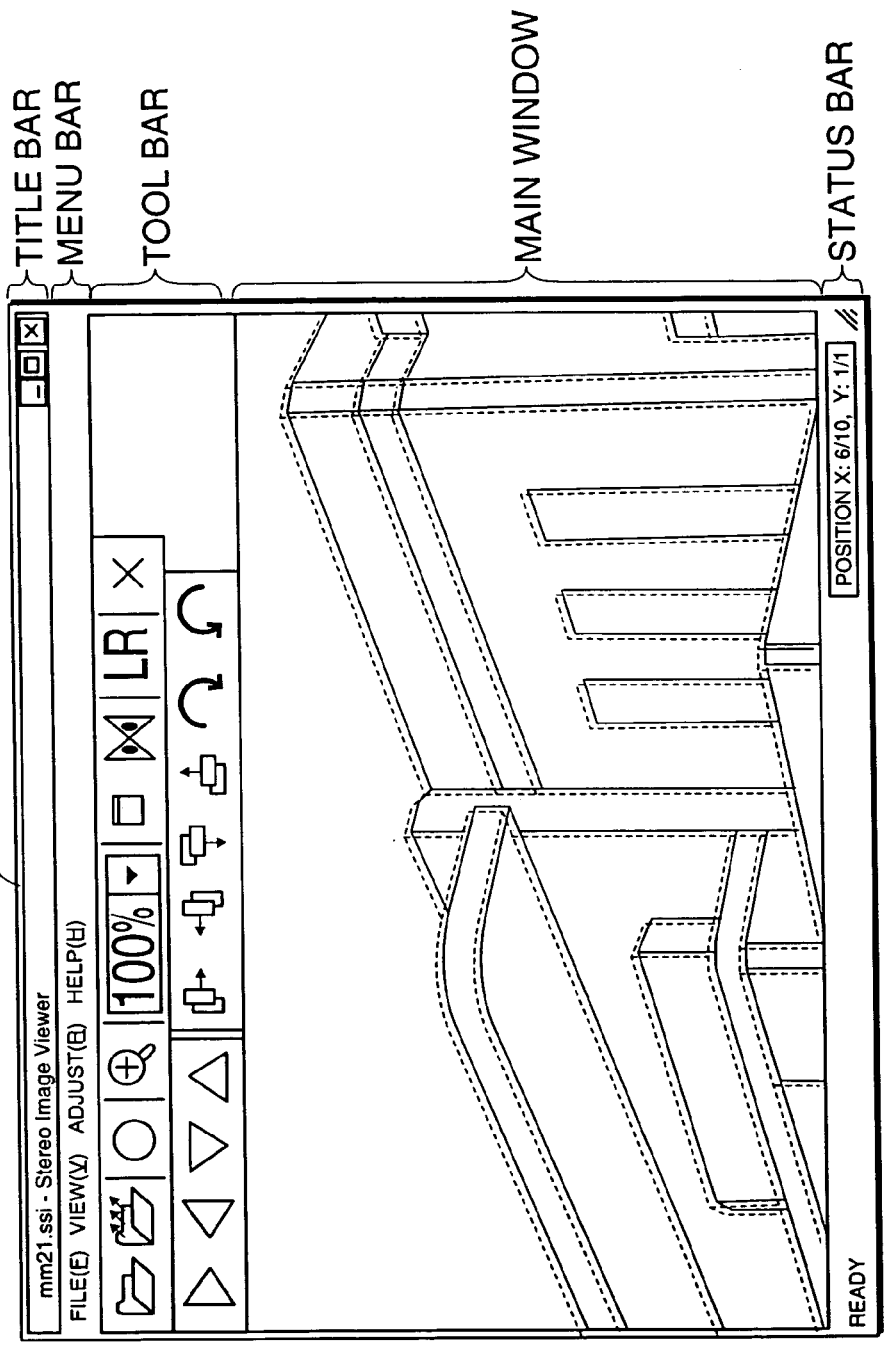
FIG. 6 is a view showing the constitution of an application window of the stereo image display program.

A description will now be given of the constitution of an application window that is displayed by the stereo image display program during operation, with reference to FIGS. 6 to 9. FIG. 6 is a view showing the constitution of the application window of the stereo image display program. The constituent elements of the application window are, in order from the top downwards, a title bar, a menu bar, tool bars, a main window, and a status bar.

On the left side of the title bar are displayed, in order from the left rightwards, an icon indicating the stereo image display program and a window title. The window title includes the name of the file currently opened by the stereo image display program. On the right side of the title bar are displayed, in order from the left rightwards, a minimize button, a maximize button, and a close button. These are standard Microsoft Windows buttons, and thus further explanation thereof will be omitted here. On the menu bar is displayed a main menu, which will be described in detail later.

Figure 7:
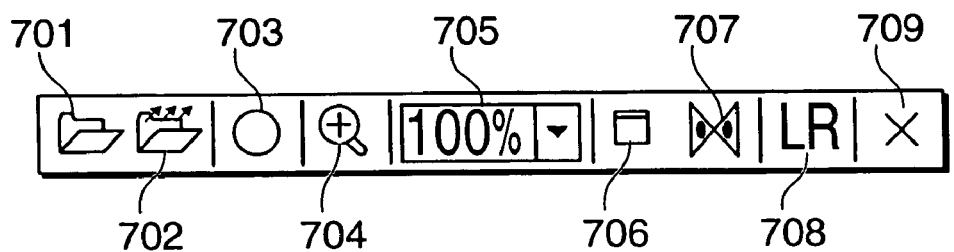
FIG. 7 is a view showing a main tool bar.
Figure 8:
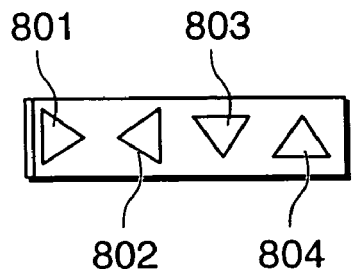
FIG. 8 is a view showing a switching direction tool bar.
Figure 9:
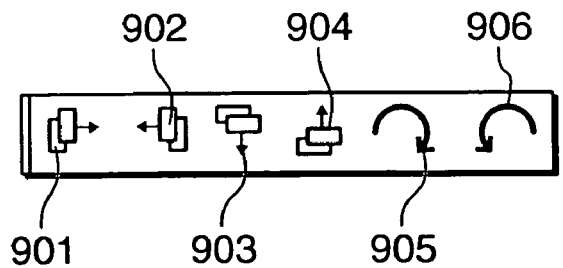
FIG. 9 is a view showing a shift correction tool bar.

There are 3 tool bars, namely a main tool bar, a switching direction tool bar and a shift correction tool bar. FIG. 7 is a view showing the main tool bar, FIG. 8 is a view showing the switching direction tool bar, and FIG. 9 is a view showing the shift correction tool bar. The tool bars provide alternative means for carrying out some of the functions in the menus to be described later. That is, each of the icons on the tool bars corresponds to one of the menu items. Clicking upon a tool bar icon using the mouse 104 produces the same result as selecting the corresponding menu item. The functions of the tool bar icons will be described later together with the functions of the menu items.

The main tool bar shown in FIG. 7 is comprised of an "open" icon 701, an "open rotated series" icon 702, an "automatic switching mode" icon 703, a "zoom mode" icon 704, a "zoom" combo box 705, a "full screen" icon 706, a "reverse stereo viewing" icon 707, an "LR pattern" icon 708, and an "tail" icon 709.

The switching direction tool bar shown in FIG. 8 is comprised of a "switch right" icon 801, a "switch left" icon 802, a "switch down" icon 803, and a "switch up" icon 804.

The shift correction tool bar shown in FIG. 9 is comprised of a "1 pixel right" icon 901, a "1 pixel left" icon 902, a "1 pixel down" icon 903, a "1 pixel up" icon 904, a "0.1° clockwise" icon 905, and a "0.1° counterclockwise" icon 906.

In the main window shown in FIG. 6 is displayed a stereo image created by the stereo image data processing module 306 and having a format suitable for displaying on the glasses-free type display (DP) 102.

At the left end of the status bar shown in FIG. 6 is displayed character information indicating the operational state of the application. Moreover, when a menu item is selected or the mouse cursor is moved over a tool bar icon by the user, a brief description of that menu item or tool bar icon is displayed.

When an SSI file, DICOM file or raw data file is opened by the stereo image display program, the size of the 2-D array of the image series represented by the opened file, and the position within the 2-D array of the stereo image currently displayed in the main window are displayed at the right end of the status bar.

A description will now be given of the menus with reference to FIGS. 10 to 14. FIG. 10 is a view showing a main menu 1000. The main menu 1000 has 4 submenus, namely a file menu 1001, a view menu 1002, a adjustment menu 1003, and a help menu 1004.

A description will now be given of FIGS. 11 to 14, and, accompanying this, a description of FIGS. 7 to 9 and 15 to 46. The menu items shown in FIGS. 11 to 14 and the icons shown in FIGS. 7 to 9 each have one of the following two styles. In the first style, referred to as "push style" in the present invention, each menu item and icon is either in a selectable (valid) state or a non-selectable (invalid) state.

In the second style, referred to as "check style" in the present invention, each menu item and icon is either in a selectable (valid) and selected (on) state, a selectable (valid) but unselected (off) state, or a non-selectable (invalid) state.

FIG. 11 is a view showing the file menu 1001. The file menu 1001 has the following menu items.

An "open" menu item 1101 corresponds to the "open" icon 701 shown in FIG. 7, and is selected to open an image file. The "open" menu item 1101 and the "open" icon 701 are push style, and are always selectable (valid).

If the "open" menu item 1101 is selected or the "open" icon 701 is clicked upon using the mouse 104, then an "open" dialog box is displayed.

Figure 15:
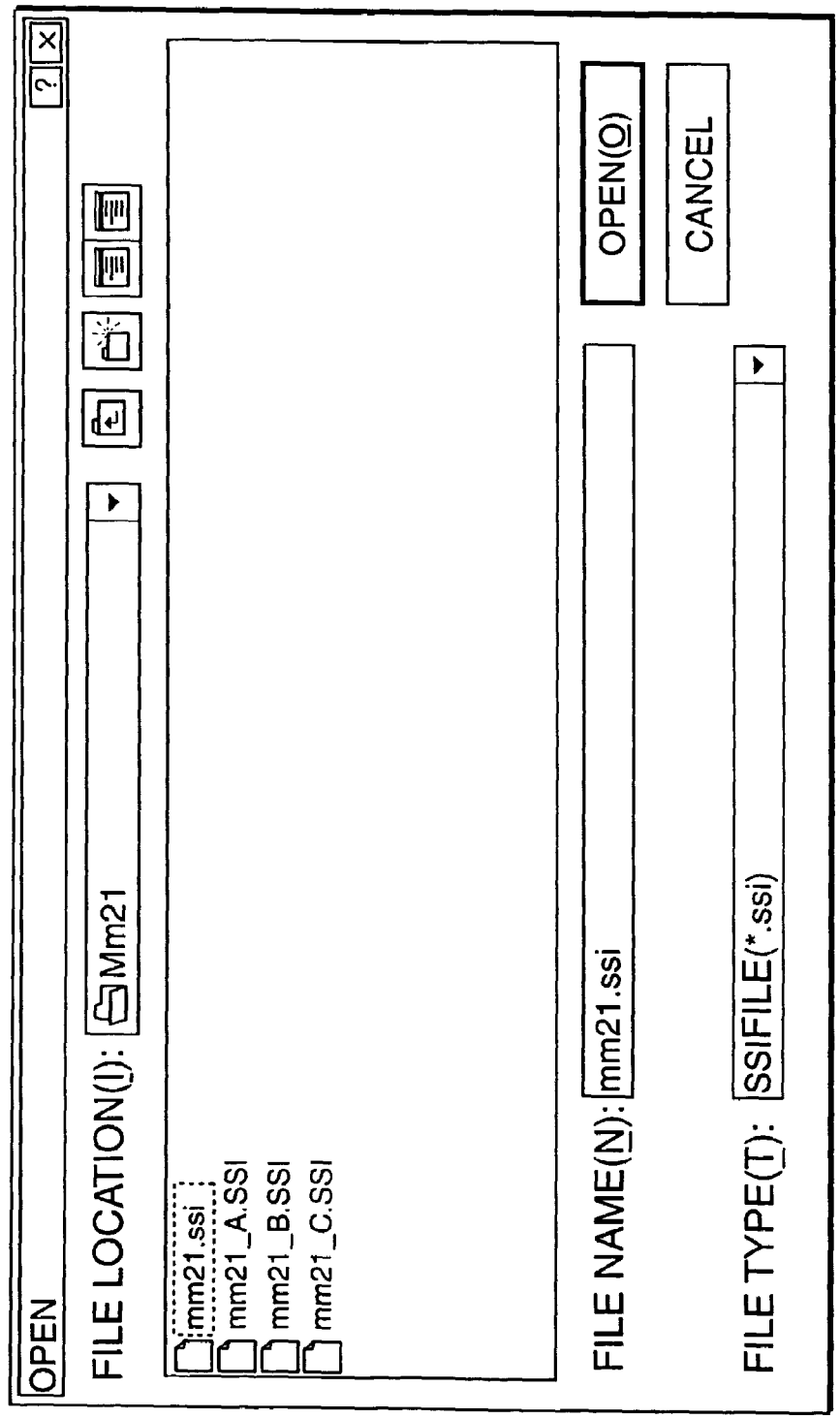
FIG. 15 is a view showing an "open" dialog box.
Figure 16:
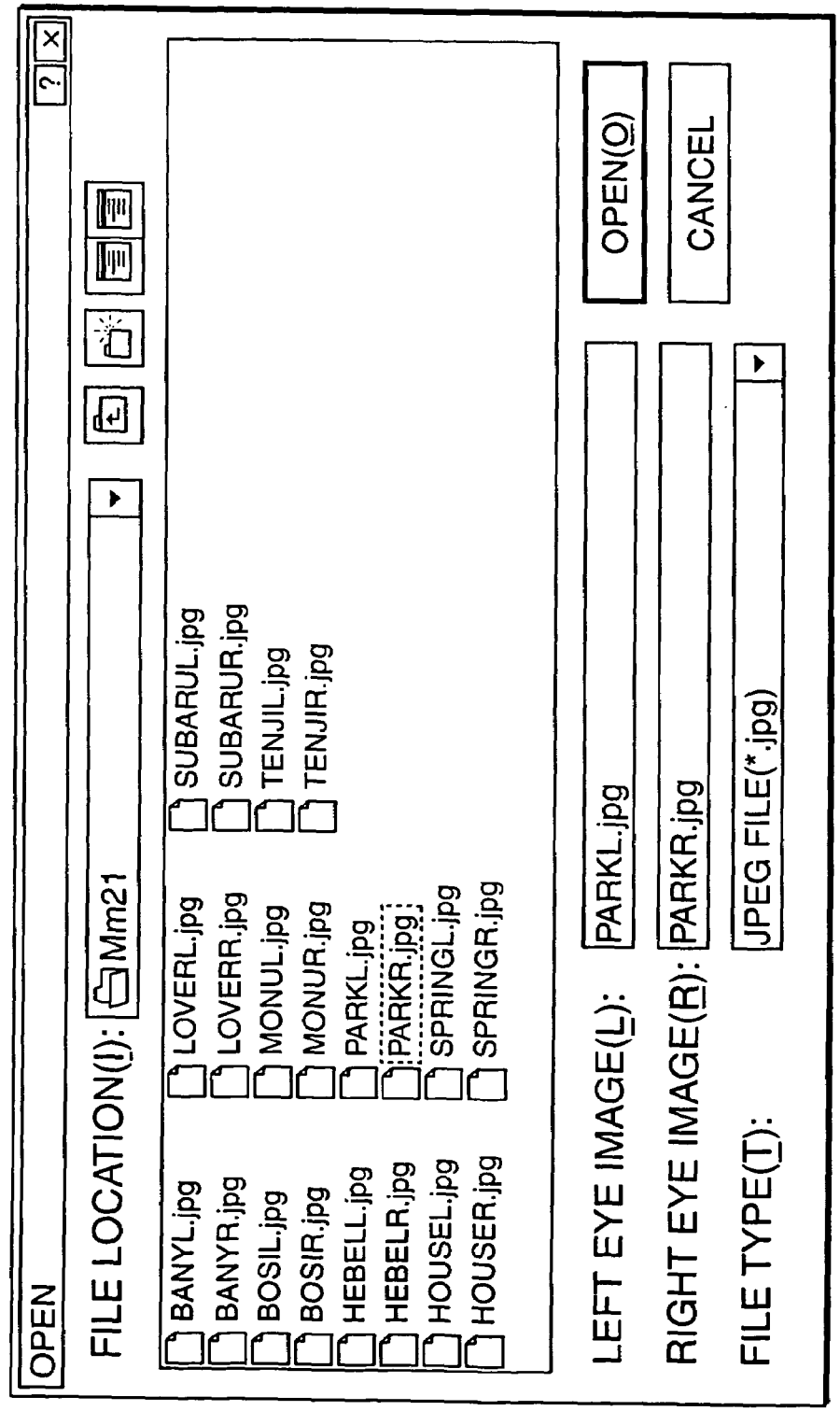
FIG. 16 is a view showing an "open" dialog box.

FIGS. 15 and 16 are views showing the "open" dialog box. In the "open" dialog box, if the user selects "file location" and "file type", then selects "file name" or directly inputs a file name, and finally presses the "open" button, then the "open" dialog box is closed and the designated image file is opened. In the "open" dialog box, if "SSI file", "DICOM file containing plurality of frames" or "raw data file containing plurality of frames" is selected as "file type", then only one "file name" can be inputted as shown in FIG. 15.

If the image file designated by the user using the "open" dialog box was an SSI file, then the stereo pair of files whose names are written first in the SSI file are read, compositing is carried out, and the resulting stereo image is displayed. If the image file designated by the user was a DICOM file containing a plurality of frames or a raw data file containing a plurality of frames, then the first frame in the file and a frame having a predetermined frame spacing from the first frame are read, compositing is carried out, and the resulting stereo image is displayed. The predetermined frame spacing is the value set using a "DICOM/raw frame settings" menu item 1309 (see FIG. 13).

Moreover, in the "open" dialog box, if "BMP file", "JPEG file", "TIFF file", "FlashPix file", "DICOM file containing only 1 frame" or "raw data file containing only 1 frame" is selected as "file type", then one "left image" file name and one "right image" file name can be selected as shown in FIG. 16. In this case, there is only one stereo pair, and hence the stereo pair of files is read, compositing is carried out, and the resulting stereo image is displayed.

An "open rotated series" menu item 1102 corresponds to the "open rotated series" icon 702 shown in FIG. 7, and is selected when the user wishes an SSI file to be created automatically from rotated series files and this SSI file to be opened automatically. Here, "rotated series files" refers to a group of image files that satisfies all of conditions (1) to (4) below.

(1) The image files must be under the same directory (although they may be divided amongst a plurality of subdirectories all at the same depth).

(2) The names of the image files must all have the same extension, or else all must have no extension.

(3) Part of each file name must be a numerical character string having a predetermined number of digits, and the numbers represented by the numerical character strings in the file names must be consecutive.

(4) The contents of the images must change continuously in the same order as the numbers in the file names. (Generally, the images are rotated relative to one another by a constant angular increment in a fixed direction.)

The "open rotated series" menu item 1102 and the "open rotated series" icon 702 are push style and are always selectable (valid).

If the "open rotated series" menu item 1102 is selected or the "open rotated series" icon 702 is clicked upon using the mouse 104, then an "open rotated series" dialog box is displayed.

Figure 17:
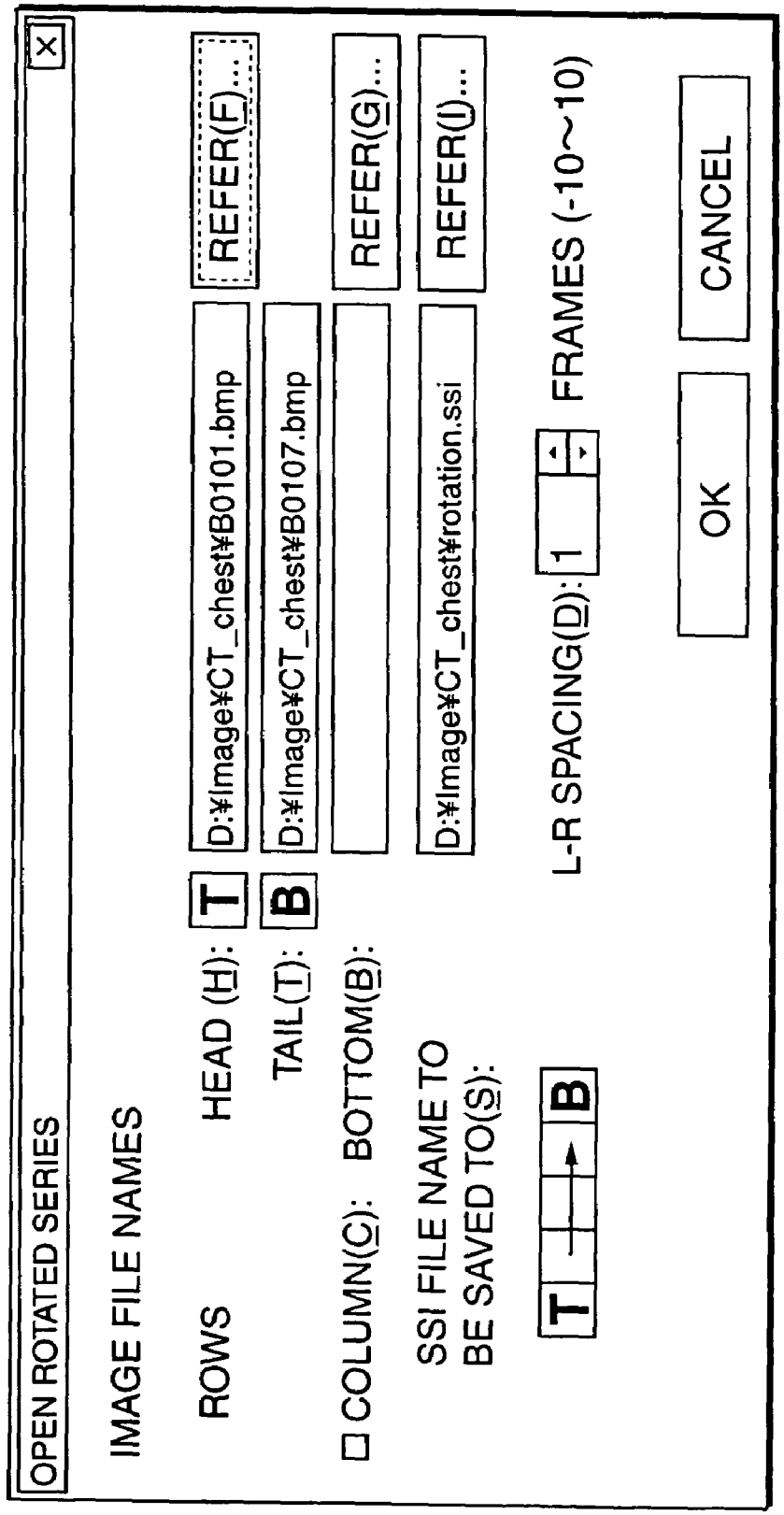
FIG. 17 is a view showing an "open rotated series" dialog box.
Figure 18:
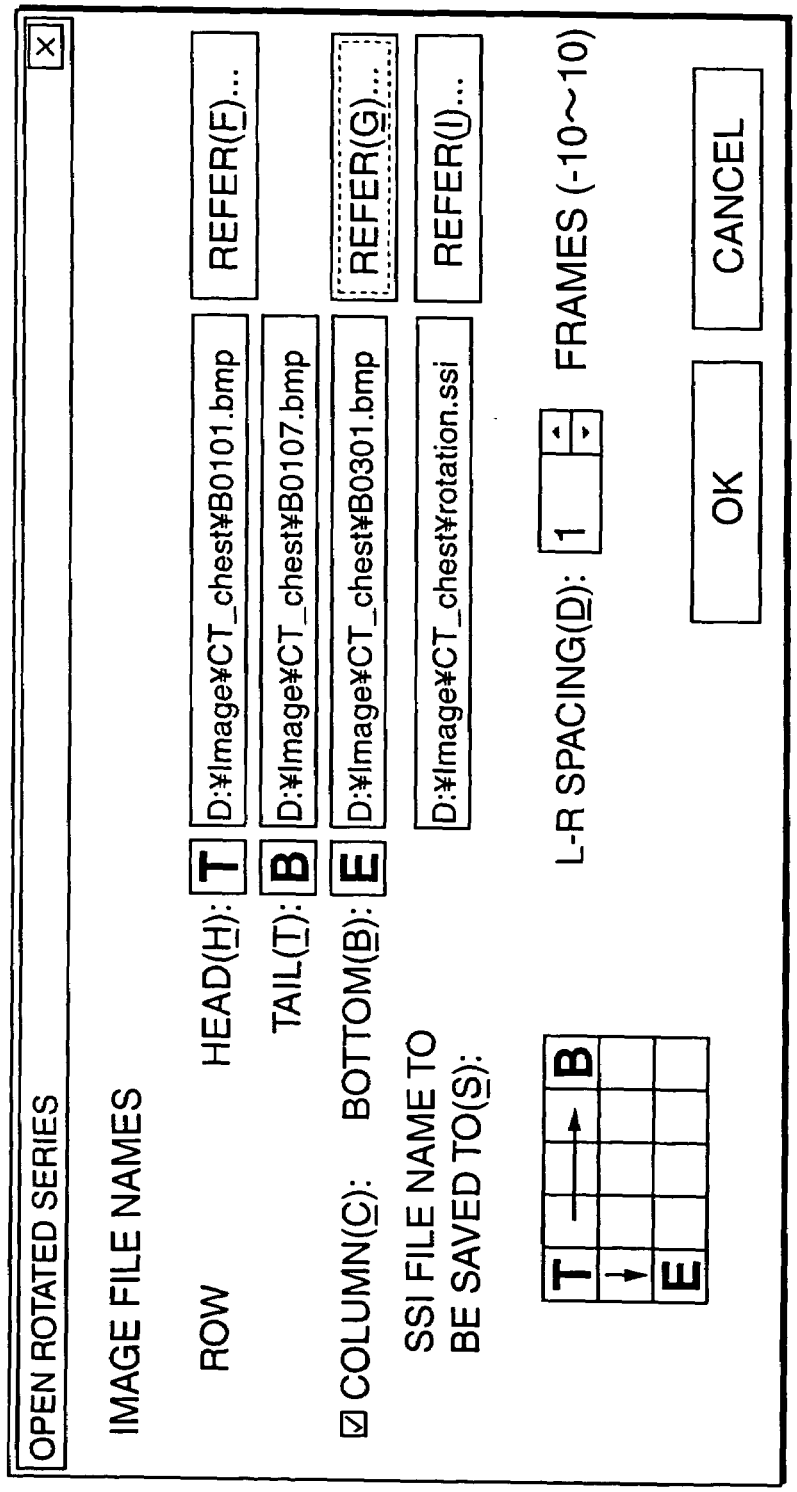
FIG. 18 is a view showing an "open rotated series" dialog box.

FIGS. 17 and 18 are views showing the "open rotated series" dialog box. A description will first be given of the case of opening a 1-D rotated series with reference to FIG. 17. In FIG. 17, the user inputs character strings into "head (T)" and "tail (B)" of "rows" (the horizontal dimension in the 2-D array) and "SSI file name to be saved to" under "image file names", and if necessary changes the number in "L-R spacing", and then finally presses the "OK" button. As a result, the rotated series file names are created automatically from the "head (T)" character string and the "tail (B)" character string, a plurality of stereo file name pairs are created automatically from the rotated series file names and the number in "L-R spacing", the stereo file name pairs are written into the SSI file designated using "SSI file name to be saved to", and then the "open rotated series" dialog box is closed.

If the SSI file has been created properly, then the SSI file is then opened automatically, the stereo pair of files whose names are written first in the SSI file are read, compositing is carried out, and the resulting stereo image is displayed.

The "head (T)" character string and the "tail (B)" character string must each be the name of one file out of a group of rotated series files (a group of files satisfying the above conditions (1) to (4)). The number Nt1 represented by the numerical character string corresponding to the horizontal dimension in the "head (T)" character string, the number Nb1 represented by the numerical character string corresponding to the horizontal dimension in the "tail (B)" character string, and the "L-R spacing" number Nd must satisfy the relationships given by equations (1) and (2).

$$Nt1 < Nb1 \quad (1)$$

$$Nt1 + Nd \leq Nb1 \quad (2)$$

Provided the equation (1) condition is satisfied, the rotated series file names can be created automatically by starting at Nt1 and adding 1 at a time until Nb1 is reached, and converting each number so generated into a character string and substituting this character string into the numerical character string part corresponding to the horizontal dimension in the "head (T)" character string or the "tail (B)" character string.

Moreover, provided the equation (2) condition is satisfied, the plurality of stereo file name pairs can be created automatically by changing the number represented by the numerical character string corresponding to the horizontal dimension in the left eye image file name in the order Nt1, Nt1+1, . . . , Nb1−Nd, and changing the number represented by the numerical character string corresponding to the horizontal dimension in the right eye image file name in the order Nt1+Nd, Nt1+Nd+1, . . . , Nb1.

A description will now be given of the case of opening a 2-D rotated series with reference to FIG. 18. The processing used when opening a 2-D rotated series merely involves adding processing for the columns (the vertical dimension of the 2-D array) to the processing used when opening a 1-D rotated series, and hence a description will only be given of the additional processing.

In FIG. 18, the user puts a check into the "columns" check box, whereupon it becomes possible to input a character string into "bottom (E)" of "columns" and to press the "reference (G)" button to the right of "bottom (E)". The "reference (G)" button will be described later.

The user inputs character strings into "head (T)", "tail (B)", "bottom (E)" and "SSI file name to be saved to", and if necessary changes the number in "L-R spacing", and then finally presses the "OK" button. As a result, the rotated series file names are created automatically from the "head (T)" character string, the "tail (B)" character string and the "bottom (E)" character string, a plurality of stereo file name pairs are created automatically from the rotated series file names and the number in "L-R spacing", the stereo file name pairs are written into the SSI file designated using "SSI file name to be saved to", and then the "open rotated series" dialog box is closed.

The "head (T)" character string and the "tail (B)" character string must each be the name of one of the files in the first row of the 2-D rotated series array. Moreover, the conditions represented by above-mentioned equations (1) and (2) must be satisfied.

The "head (T)" character string and the "bottom (E)" character string must each be the name of one of the files in the first column of the 2-D rotated series array. Moreover, the number Nt2 represented by the numerical character string corresponding to the vertical dimension in the "head (T)" character string and the number Ne2 represented by the numerical character string corresponding to the vertical dimension in the "bottom (E)" character string must satisfy the relationship given by equation (3).

$$Nt2 \leq Ne2 \quad (3)$$

As described above, provided the equation (1) condition is satisfied, the rotated series file names for the horizontal dimension can be created automatically. Moreover, provided the equation (3) condition is satisfied, by starting at Nt2 and adding 1 at a time until Ne2 is reached, and converting each number so generated into a character string and substituting this character string into the numerical character string part corresponding to the vertical dimension in the "head (T)" character string or the "bottom (E)" character string, the rotated series file names for the vertical dimension can be created automatically. Provided the equation (1) and equation (3) conditions are both satisfied, the rotated series file names for both the horizontal and vertical dimensions can thus be created automatically.

Equation (2) only relates to the horizontal dimension, and hence, as in the 1-D case, in the 2-D case the plurality of stereo file name pairs can be created automatically from the rotated series file names and the "L-R spacing" value.

In the "open rotated series" dialog box, if the "reference (F)" button to the right of "head (T)" is pressed, then an "refer to image file name" dialog box is displayed.

Figure 19:
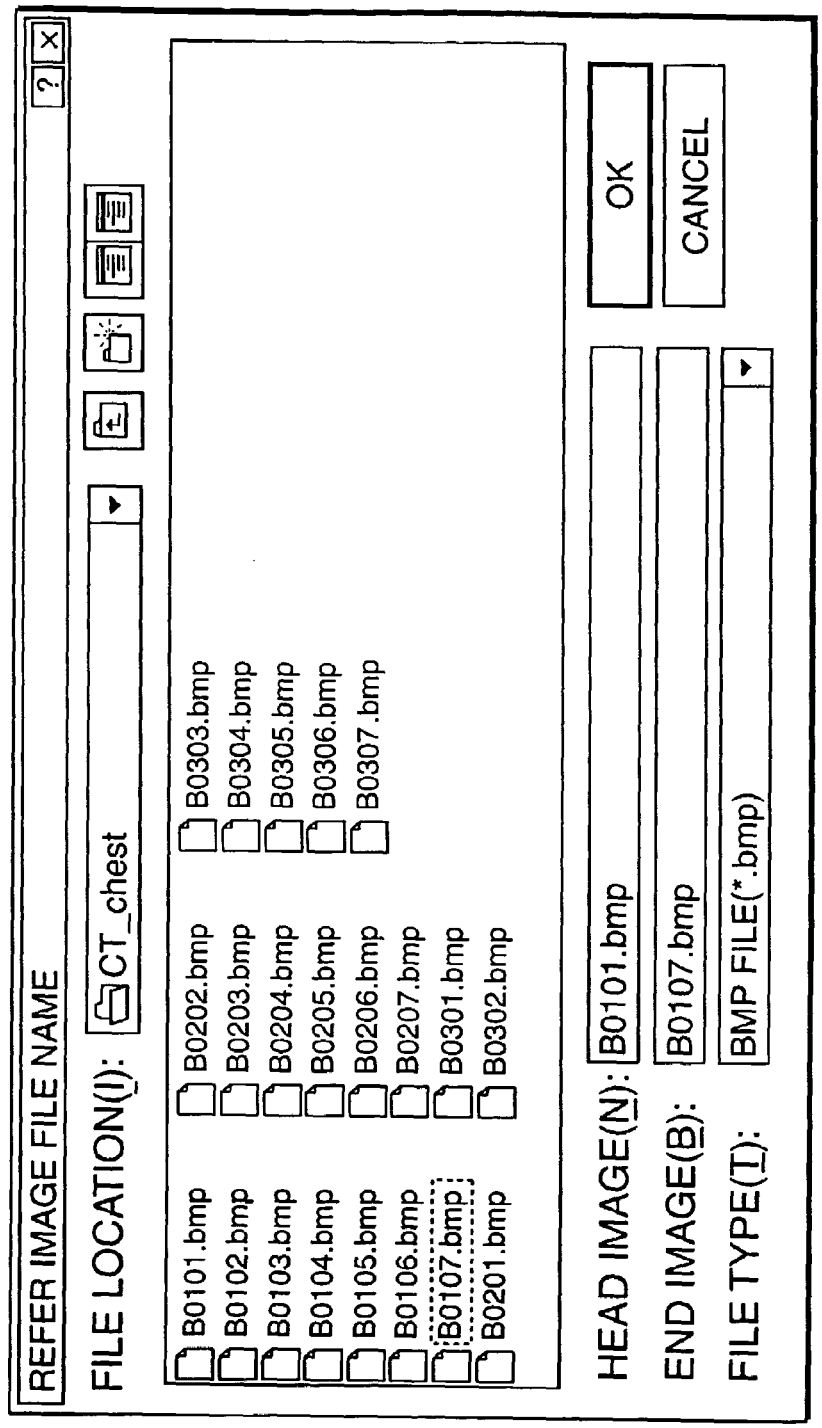
FIG. 19 is a view showing an "refer to image file name" dialog box.

FIG. 19 is a view showing the "refer to image file name" dialog box displayed when the "reference (F)" button is pressed. In FIG. 19, the user selects "file location" and "file type", and then selects any two files from the file list below "file location". The file name selected first is inputted into "head image", and the file name selected second into "end image". After the "head image" and "end image" file names have been entered, the user presses the "OK" button. As a result, the "refer to image file name" dialog box is closed, and then the full path names of the "head image" and "end image" files are automatically inputted into "head (T)" and "tail (B)" respectively in the "open rotated series" dialog box.

Moreover, in the "open rotated series" dialog box, if the "reference (G)" button to the right of "bottom (E)" is pressed after a check has been put into the "columns" check box, then an "refer to image file name" dialog box is displayed.

Figure 20:
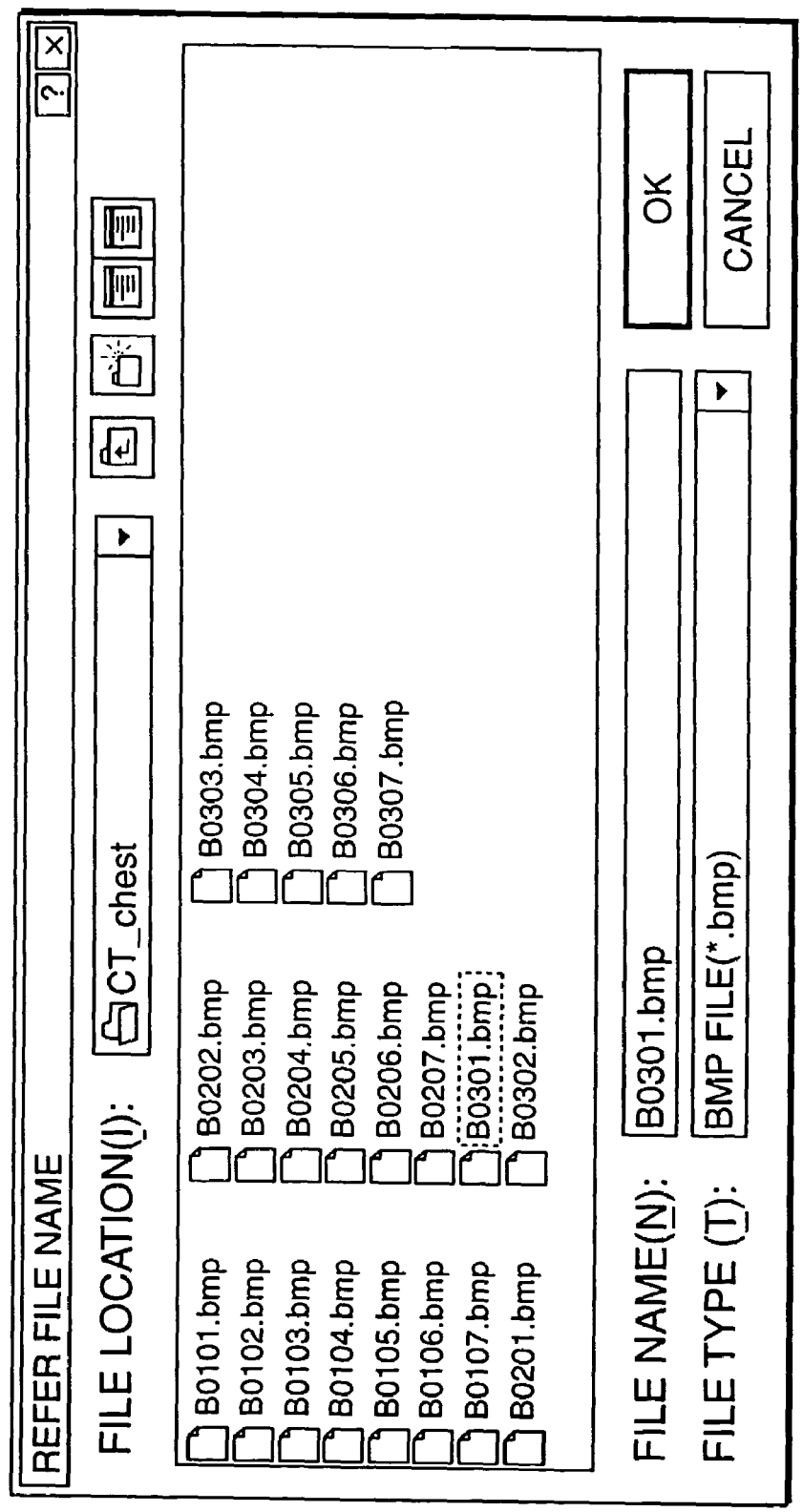
FIG. 20 is a view showing an "refer to image file name" dialog box.

FIG. 20 is a view showing the "refer to image file name" dialog box displayed when the "reference (G)" button is pressed. In FIG. 20, the user inputs "file name", and then presses the "OK" button. As a result, the "refer to image file name" dialog box is closed, and then the full path name of the file designated by the user is automatically inputted into "bottom (E)" in the "open rotated series" dialog box.

Moreover, in the "open rotated series" dialog box, if the "refer (I)" button to the right of "SSI file name to be saved to" is pressed, then an "Refer to SSI file name" dialog box is displayed.

Figure 21:
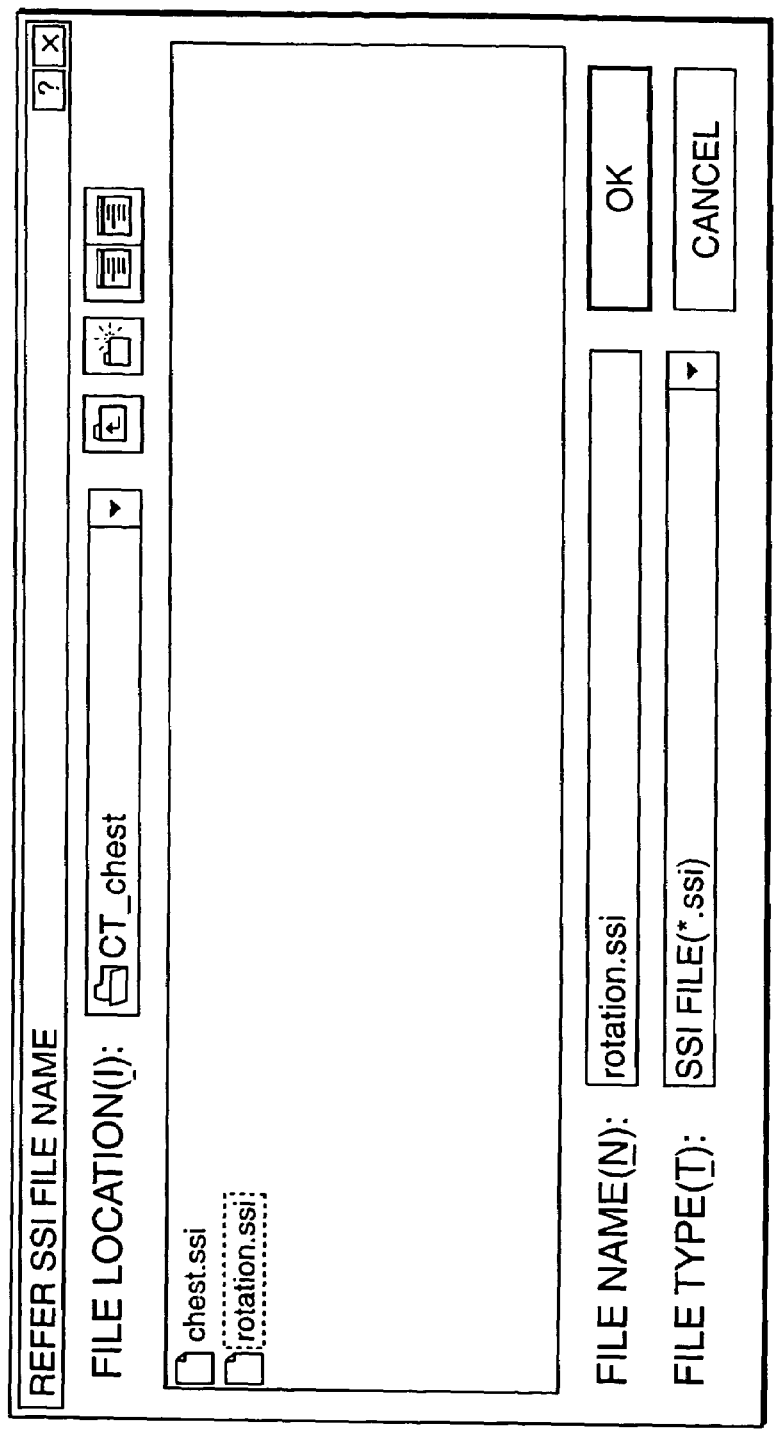
FIG. 21 is a view showing an "Refer to SSI file name" dialog box.

FIG. 21 is a view showing the "refer to SSI file name" dialog box. In FIG. 21, the user inputs "file name", and then presses the "OK" button. As a result, the "refer to SSI file name" dialog box is closed, and then the full path name of the file designated by the user is automatically inputted into "SSI file name to be saved to" in the "open rotated series" dialog box.

A "close" menu item 1103 is selected to close the currently opened image file. The "close" menu item 1103 is push style, and is non-selectable (invalid) when no image file is open and selectable (valid) when an image file is open. If the "close" menu item 1103 is selected, then the currently opened image file is closed, and only a background color is displayed in the main window.

A "how to open unknown file" menu item 1104 is selected by the user to preset the file type that will be assumed if the user attempts to open a file using the "open" menu item 1101 or the "open rotated series" menu item 1102 but the stereo image display program is unable to automatically determine the file type.

The "how to open unknown file" menu item 1104 is push style, and is always selectable (valid).

When a known extension is appended to a file name, the stereo image display program automatically determines the file type from the extension. Even if a known extension is not appended to a file name, if DICOM file meta information can be read from the head of the file, then the stereo image display program automatically determines that the file type is DICOM (for details of DICOM file meta information, see the DICOM file specification mentioned previously).

The stereo image display program thus treats a file as being unidentified only when no extension or an unknown extension is appended to the file name and moreover DICOM file meta information cannot be read from the head of the file.

If the "how to open unknown file" menu item 1104 is selected, then a "how to open unknown file" dialog box is displayed.

Figure 22:
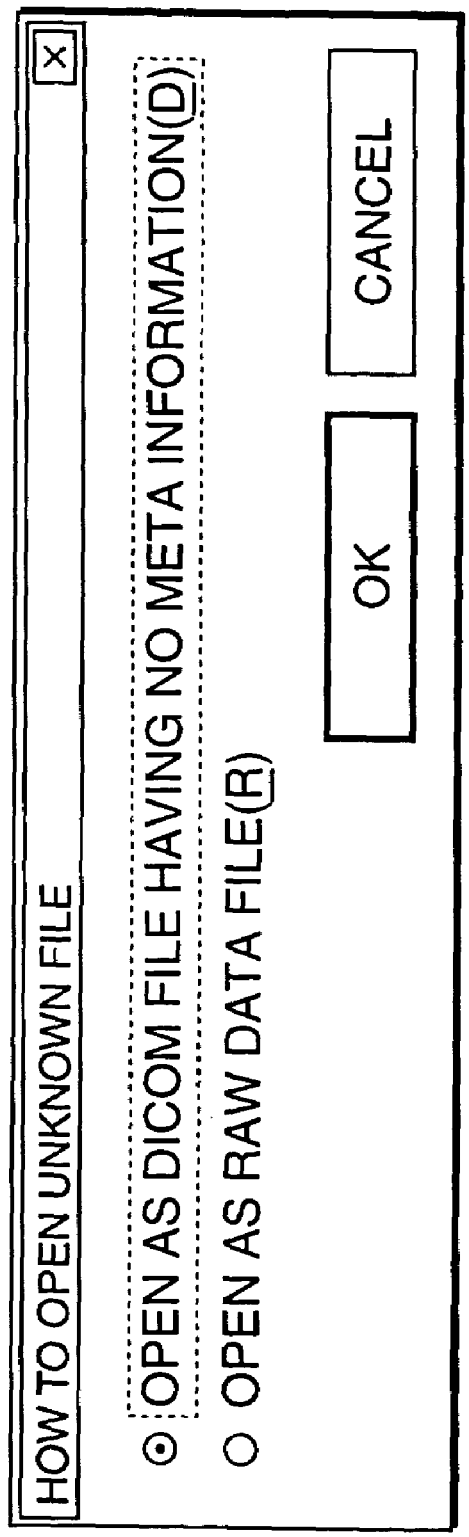
FIG. 22 is a view showing a "how to open unknown file" dialog box.

FIG. 22 is a view showing the "how to open unknown file" dialog box. In FIG. 22, the user selects either the "open as DICOM file having no meta information" radio button or the "open as raw data file" radio button, and then presses the "OK" button. As a result, the "how to open unknown file" dialog box is closed, and the how to open unknown files corresponding to the selected radio button is set. Here, "DICOM file having no meta information" means a DICOM file that contains no DICOM file meta information at the head thereof. Raw data files will be described later.

The value set using the "how to open unknown file" dialog box is stored in the hard disk (HD) 205 of the personal computer (PC) 101 when the stereo image display program is terminated. Next time the program is started up, the set value stored in the hard disk (HD) 205 is read in and set.

A "how to open DICOMDIR file" menu item 1105 is selected by the user to preset what kind of stereo image series should be constructed from the DICOM files when the user tries to open a DICOMDIR file using the "open" menu item 1101 and a plurality of DICOM files are referred to from the DICOMDIR file (for details of DICOMDIR files, see the DICOM file specification mentioned previously). The "how to open DICOMDIR file" menu item 1105 is push style, and is always selectable (valid). If the "how to open DICOMDIR file" menu item 1105 is selected, then a "how to open DICOMDIR file" dialog box is displayed.

Figure 23:
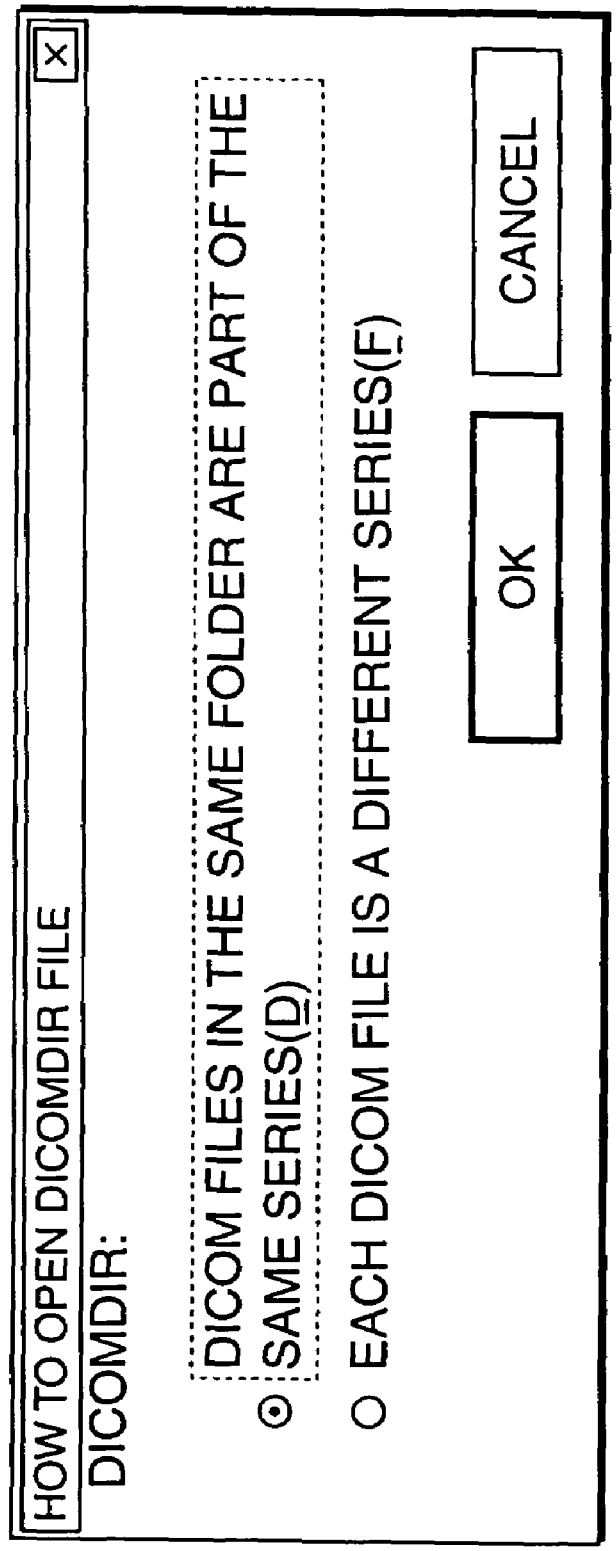
FIG. 23 is a view showing a "how to open DICOMDIR file" dialog box.

FIG. 23 is a view showing the "how to open DICOMDIR file" dialog box. In FIG. 23, the user selects either the "DICOM files in the same folder are part of the same series" radio button or the "each DICOM file is a different series" radio button, and then presses the "OK" button. As a result, the "how to open DICOMDIR file" dialog box is closed, and the how to open DICOMDIR files corresponding to the selected radio button is set.

Here, "DICOM files in the same folder are part of the same series" means that the image frames contained in all of the DICOM files in a particular folder (directory) are arranged in the same row (the same vertical position) in the virtual 2-D array of the stereo image series.

"Each DICOM file is a different series", on the other hand, means that only the image frames contained in one DICOM file are arranged in the same row (the same vertical position) in the virtual 2-D array of the stereo image series. In other words, "Each DICOM file is a different series" means that image frames contained in different DICOM files are arranged in different rows (different vertical positions) in the virtual 2-D array of the stereo image series.

The value set using the "how to open DICOMDIR file" dialog box is stored in the hard disk (HD) 205 of the personal computer (PC) 101 when the stereo image display program is terminated. Next time the program is started up, the set value stored in the hard disk (HD) 205 is read in and set.

A "how to open raw data file" menu item 1106 is selected by the user to preset information necessary for opening raw data files. The "how to open raw data file" menu item 1106 is push style, and is always selectable (valid). If the how to open raw data files has not been set, then the stereo image display program will not be able to open raw data files.

Figure 24:
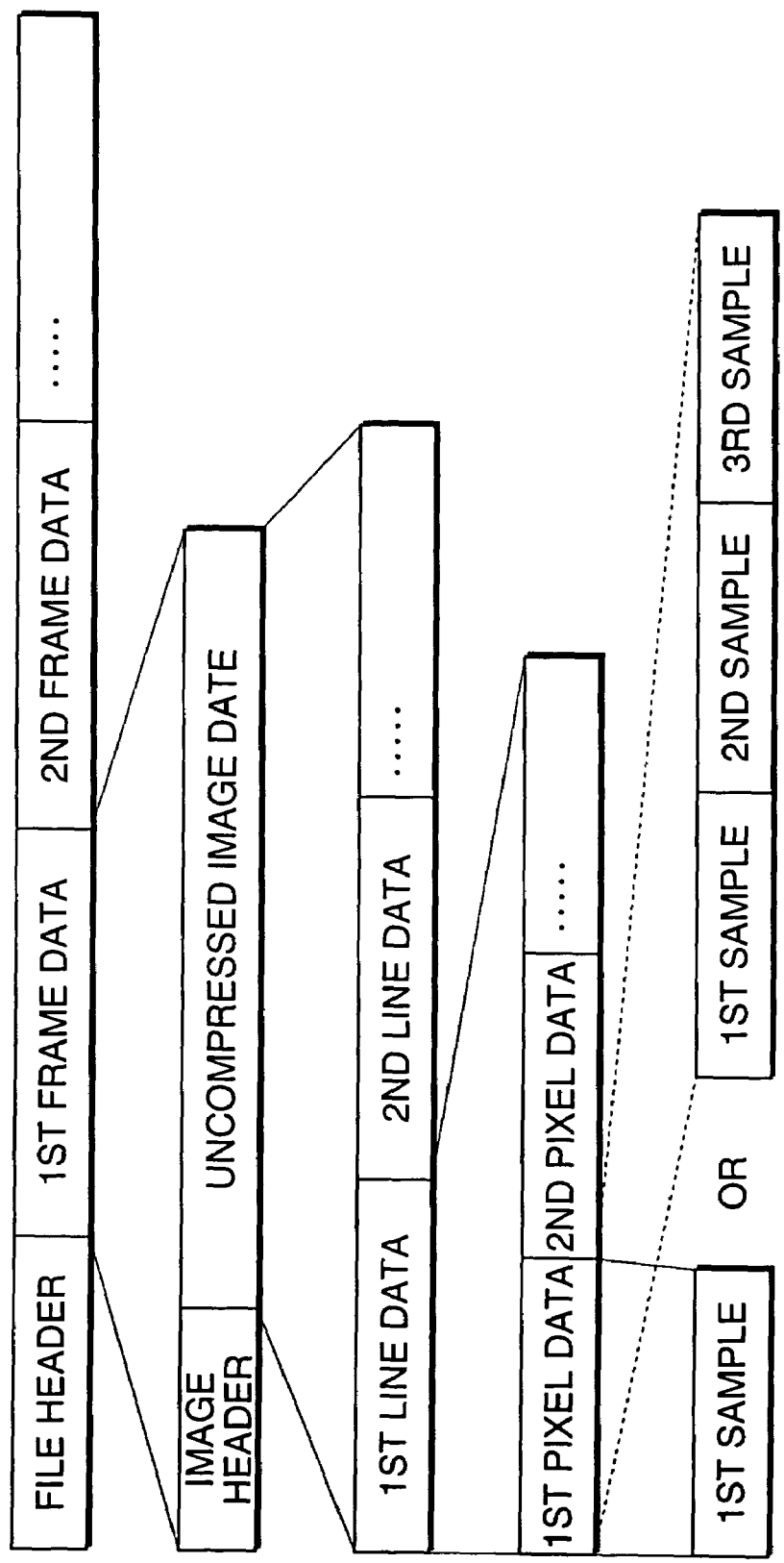
FIG. 24 is a diagram showing the data structure of a raw data file.

In the present embodiment, it is assumed that all raw data files have a data structure shown in FIG. 24. Unidentifiable files having other data structures cannot be opened.

FIG. 24 is a diagram showing the data structure of a raw data file. In FIG. 24, the rectangles in the top row show the overall structure of the raw data file. The file header need not exist, in which case the file header size is taken as being 0. The first frame data is necessary, but data for second and subsequent frames need not exist. The rectangles in the second row show the structure of the frame data. The image header need not exist, in which case the image header size is taken as being 0. The uncompressed image data is necessary. The rectangles in the third row show the structure of the uncompressed image data. Starting with the first line data, there is a number of sets of line data corresponding to the height of the image. The rectangles in the fourth row show the structure of the line data. Starting with the first pixel data, there is a number of sets of pixel data corresponding to the width of the image. The rectangles in the last row show the structure of the pixel data. If the pixel data is monochrome, then only a first sample exists, whereas if the pixel data is RGB color, then first, second and third samples exist.

In the present embodiment, raw data files having a color format other than monochrome or RGB color are not handled, although it is possible to make changes such that raw data files having other color formats can be handled.

If the "how to open raw data file" menu item 1106 is selected, then a "how to open raw data file" dialog box is displayed.

Figure 25:
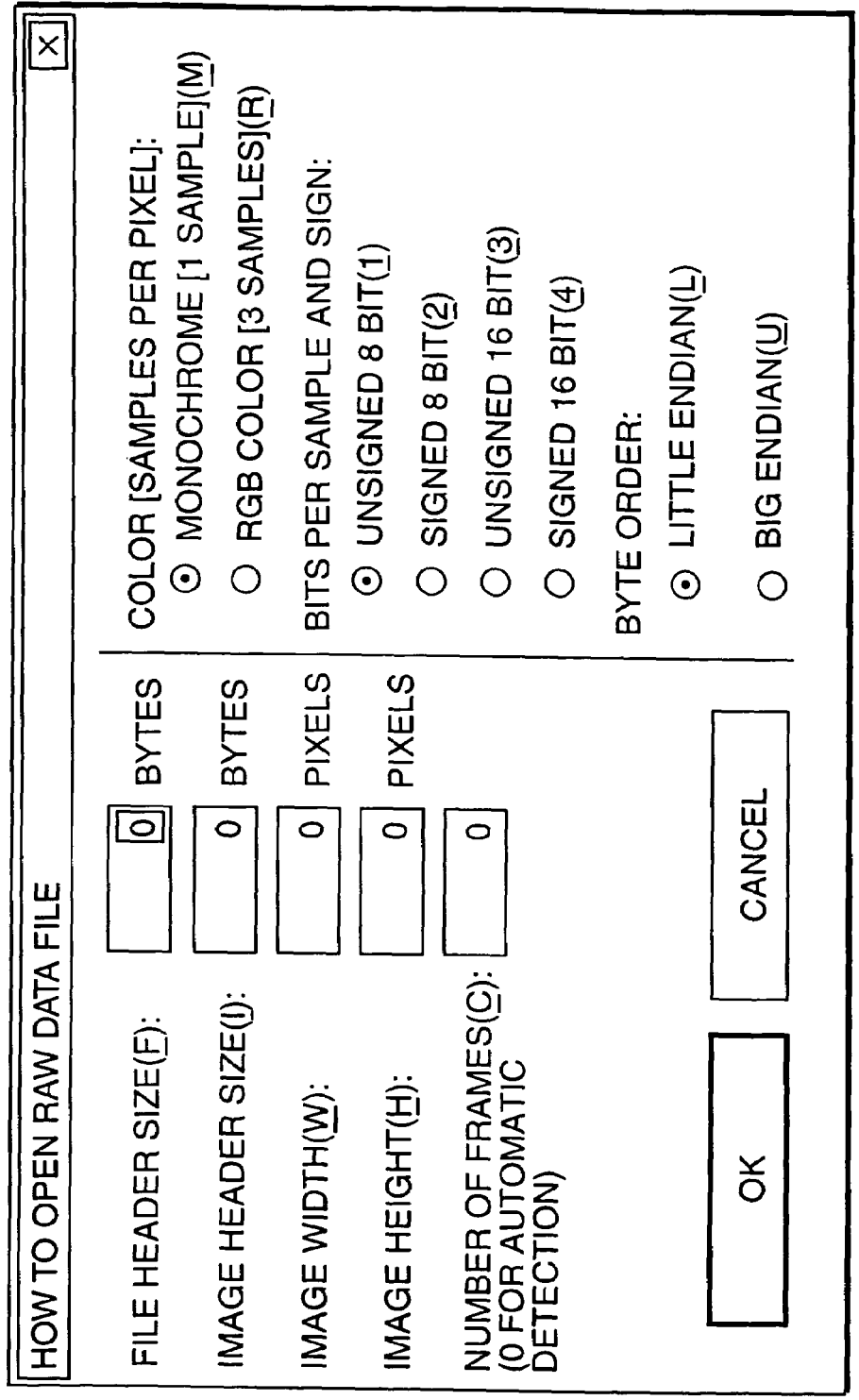
FIG. 25 is a view showing a "how to open raw data file" dialog box.
Figure 26:
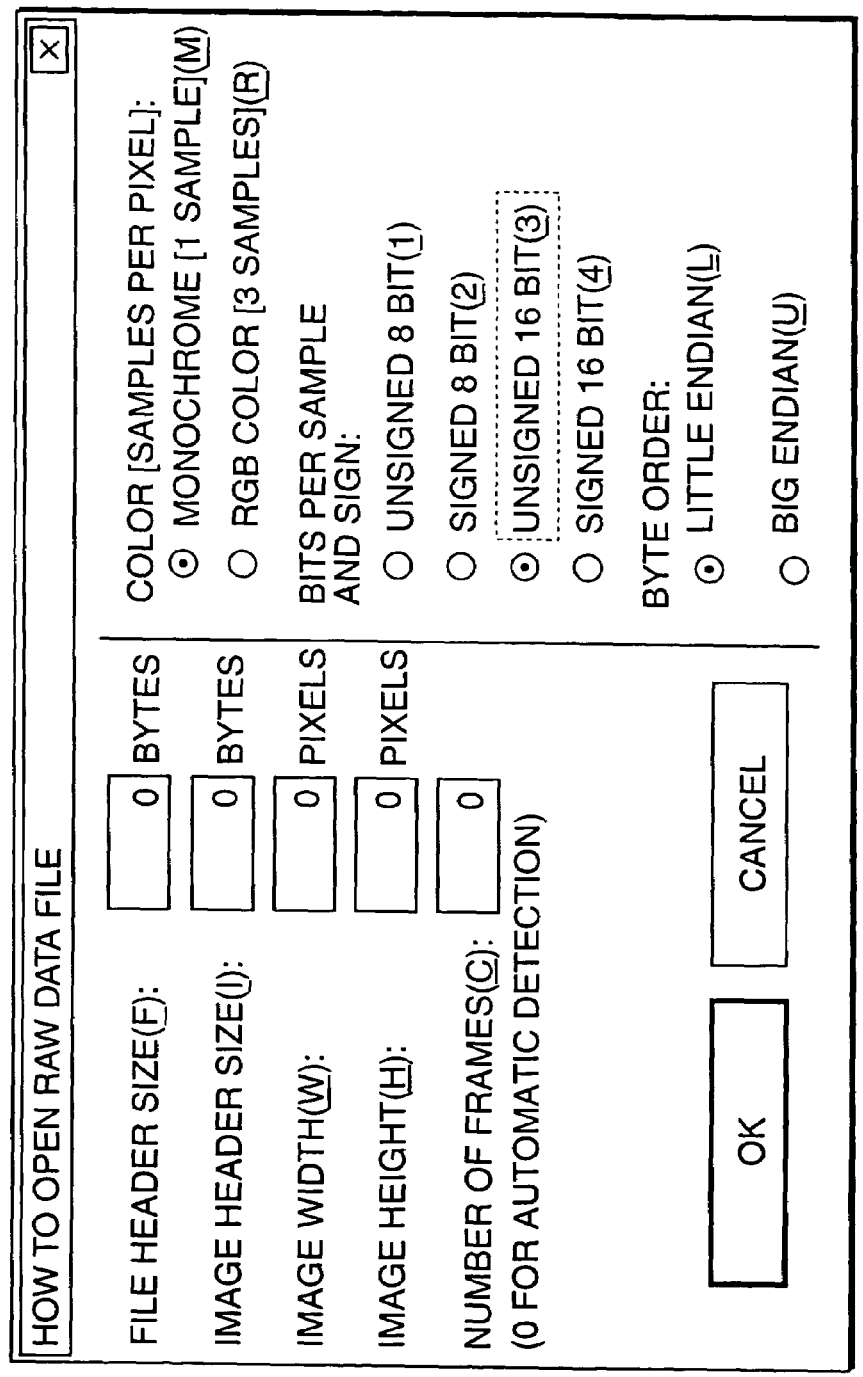
FIG. 26 is a view showing a "how to open raw data file" dialog box.

FIGS. 25 and 26 are views showing the "how to open raw data file" dialog box. The user refers to the data structure of the raw data files to be opened as described above, and then enters suitable values for the undermentioned items and selects radio buttons as described below. The user inputs suitable values into "file header size", "image header size", "image width", "image height" and "number of frames". For the "color (samples per pixel)" item, the user selects either the "monochrome (1 sample)" radio button or the "RGB color (3 samples)" radio button. For the "bits per sample and coding" item, the user selects one out of the "unsigned 8 bit" radio button, the "signed 8 bit" radio button, the "unsigned 16 bit" radio button, and the "signed 16 bit" radio button.

For the "bits per sample and coding" item, if the "unsigned 8 bit" radio button or the "signed 8 bit" radio button is selected, then, as shown in FIG. 25, the "byte order" item is unnecessary and cannot be selected. If, on the other hand, the "unsigned 16 bit" radio button or the "signed 16 bit" radio button is selected, then, as shown in FIG. 26, the "byte order" item is necessary and becomes selectable, and hence the user selects either the "little endian" radio button or the "big endian" radio button.

In the "byte order" item, "little endian" is also known as "little endian", and is a data storage format widely adopted in Intel CPUs. "big endian", on the other hand, is also known as "big endian", and is a data storage format widely adopted in Motorola CPUs.

The values set using the "how to open raw data file" dialog box are stored in the RAM 203 of the personal computer (PC) 101 only while the stereo image display program is operating.

A "most most recently opened file" menu item 1107 is selected to reopen a recently opened image file. The "most most recently opened file" menu item 1107 is not displayed as a single menu item, but rather the names of up to 8 recently opened image files are displayed. The "most recently opened file" menu item 1107 is push style, and when the names of recently opened image files are displayed, all of these file names are selectable (valid).

If the user selects one of the file names, then the corresponding image file is opened. The how to open the image file is the same as that previously described for the "open" menu item 1101, except that when the "most recently opened file" menu item 1107 is selected, because the file name has already been designated, the "open" dialog box is not displayed.

An "exit" menu item 1108 corresponds to the "tail" icon 709 shown in FIG. 7, and is selected to terminate the stereo image display program. The "exit" menu item 1108 and the "tail" icon 709 are push style, and are always selectable (valid).

If the "exit" menu item 1108 is selected or the "tail" icon 709 is clicked upon using the mouse 104, then any image file currently opened is closed, and then the stereo image display program is terminated.

Figure 12:
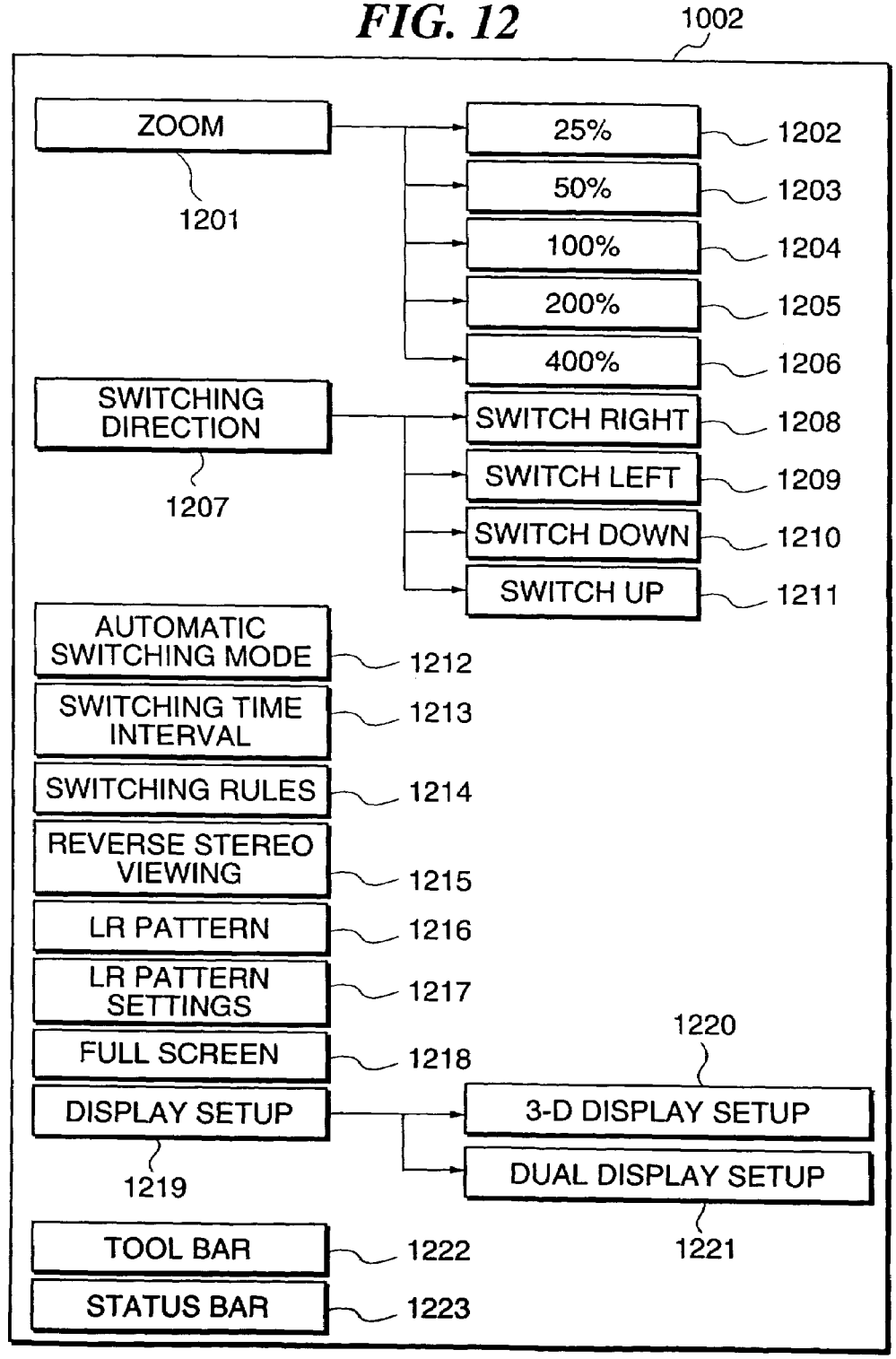
FIG. 12 is a view showing a view menu.

FIG. 12 is a view showing the view menu 1002. The view menu 1002 has the following submenus and menu items.

A "zoom" submenu 1201 has a "25%" menu item 1202, a "50%" menu item 1203, a "100%" menu item 1204, a "200%" menu item 1205, and a "400%" menu item 1206. These menu items correspond to the items listed in the "zoom" combo box 705 shown in FIG. 7.

The menu items of the "zoom" submenu 1201 and the "zoom" combo box 705 are push style, and are non-selectable (invalid) when no image file is open and selectable (valid) when an image file is open. If the "25%" menu item 1202 is selected or "25%" is selected from the items listed in the "zoom" combo box 705, then the size of the stereo image currently displayed in the main window becomes 25% of the original size of the left eye image or the right eye image in both the horizontal and vertical directions. If one of the other menu items is selected or one of the other items listed in the "zoom" combo box 705 is selected, then the size of the stereo image is similarly changed in accordance with the selected magnification.

Regardless of which magnification is selected, it is necessary for a stereo image to be created in a format suited to the display format of the glasses-free type display 102. The operation of creating the stereo image is carried out by the stereo image data processing module 306 shown in FIG. 3. Note that the magnification is initially set to 100% immediately after an image file is newly opened, with the size of the stereo image thus being equal to the original size of the left eye image or the right eye image.

The "zoom mode" icon 704 shown in FIG. 7 provides another method of changing the size of the stereo image different to that described above for the menu items of the "zoom" submenu 1201 and the "zoom" combo box 705. The "zoom mode" icon 704 is check style, and is non-selectable (invalid) when no image file is open and selectable (valid) when an image file is open. Zoom mode is off immediately after an image file has been newly opened.

Every time the "zoom mode" icon 704 is clicked upon using the mouse 104, zoom mode changes between on and off. When zoom mode is on, if the left button of the mouse 104 is clicked at any position in the main window, then the size of the stereo image displayed in the main window is enlarged by a factor of 2, whereas if the right button of the mouse 104 is clicked at any position in the main window, then the size of the stereo image displayed in the main window is reduced to ½.

However, if the size of the stereo image displayed in the main window is already 400%, then the size of the stereo image is not changed (enlarged) even if the left button of the mouse 104 is clicked as described above. Moreover, if the size of the stereo image displayed in the main window is already 25%, then the size of the stereo image is not changed (reduced) even if the right button of the mouse 104 is clicked as described above.

A "switching direction" submenu 1207 has a "switch right" menu item 1208, a "switch left" menu item 1209, a "switch down" menu item 1210, and a "switch up" menu item 1211. The roles fulfilled by these menu items change according to a set value of an automatic switching mode, and hence the automatic switching mode will be described first.

An "automatic switching mode" menu item 1212 corresponds to the "automatic switching mode" icon 703 shown in FIG. 7, and is used to change the automatic switching mode between on and off. The "automatic switching mode" menu item 1212 and the "automatic switching mode" icon 703 are check style, and are non-selectable (invalid) when no image series or files of an image series is open and selectable (valid) when an image series is open. Automatic switching mode is off immediately after an image series has been newly opened.

Every time the "automatic switching mode" menu item 1212 is selected or the "automatic switching mode" icon 703 is clicked upon using the mouse 104, the automatic switching mode changes between on and off. When the automatic switching mode is on, automatic switching can be carried out as described below. If the automatic switching mode is turned off while automatic switching is being carried out, then the automatic switching is stopped.

The "switch right" menu item 1208 corresponds to the "switch right" icon 801 shown in FIG. 8, the "switch left" menu item 1209 corresponds to the "switch left" icon 802 shown in FIG. 8, the "switch down" menu item 1210 corresponds to the "switch down" icon 803 shown in FIG. 8, and the "switch up" menu item 1211 corresponds to the "switch up" icon 804 shown in FIG. 8. Each of these menu items and icons has a similar function, with only the switching direction changing.

The menu items of the "switching direction" submenu 1207 and the icons shown in FIG. 8 are push style when the automatic switching mode is off and check style when the automatic switching mode is on. Immediately after an image series has been newly opened, the automatic switching mode is off, and hence the menu items of the "switching direction" submenu 1207 and the icons shown in FIG. 8 are push style.

The "switch right" menu item 1208, the "switch right" icon 801, the "switch left" menu item 1209 and the "switch left" icon 802 are non-selectable (invalid) when no image series is open, or when the virtual 2-D array of the image series does not have at least two elements in the horizontal direction, and are selectable (valid) when an image series is open and the virtual 2-D array of the image series has two or more elements in the horizontal direction.

The "switch down" menu item 1210, the "switch down" icon 803, the "switch up" menu item 1211 and the "switch up" icon 804 are non-selectable (invalid) when no image series is open, or when the virtual 2-D array of the image series does not have at least two elements in the vertical direction, and are selectable (valid) when an image series is open and the virtual 2-D array of the image series has at least two elements in the vertical direction.

When the automatic switching mode is off, if the "switch right" menu item 1208 is selected or the "switch right" icon 801 is clicked upon using the mouse 104, then the position in the virtual 2-D array of the image series is shifted rightwards in accordance with switching rules described below, and the stereo image in the new position is displayed in the main window. Immediately after an image file has been newly opened, the stereo image at the origin (0,0) of the virtual 2-D array of the image series is displayed.

When the automatic switching mode is on, then every time the "switch right" menu item 1208 is selected or the "switch right" icon 801 is clicked upon using the mouse 104, the "switch right" menu item 1208 and the "switch right" icon 801 (referred to collectively as the "switch right" item hereinafter) are changed between an on state and an off state. When the "switch right" item is on, automatic switching is carried out. If the "switch right" item is turned off during automatic switching then the automatic switching is stopped.

During automatic switching, every time a switching time interval, described below, passes, the position in the virtual 2-D array of the image series is automatically shifted rightwards in accordance with switching rules described below, and the stereo image in the new position is displayed in the main window. The stereo image displayed in the main window is thus automatically switched over every time a fixed time interval passes.

In the above description, if ""switch right" menu item 1208", ""switch right" icon 801" and "rightwards" are replaced respectively with ""switch left" menu item 1209", ""switch left" icon 802" and "leftwards", ""switch down" menu item 1210", ""switch down" icon 803" and "downwards", or ""switch up" menu item 1211", ""switch up" icon 804" and "upwards", then the descriptions for the other menu items of the "switching direction" submenu 1207 and the other icons shown in FIG. 8 are obtained; these descriptions will thus be omitted.

A "switching time interval" menu item 1213 is selected to set a switching time interval. During automatic switching, the stereo image displayed in the main window is automatically switched over every time a fixed time interval passes; this fixed time interval is referred to here as the switching time interval. The "switching time interval" menu item 1213 is push style, and is always selectable (valid). If the "switching time interval" menu item 1213 is selected, then a "switching time interval" dialog box is displayed.

Figure 27:
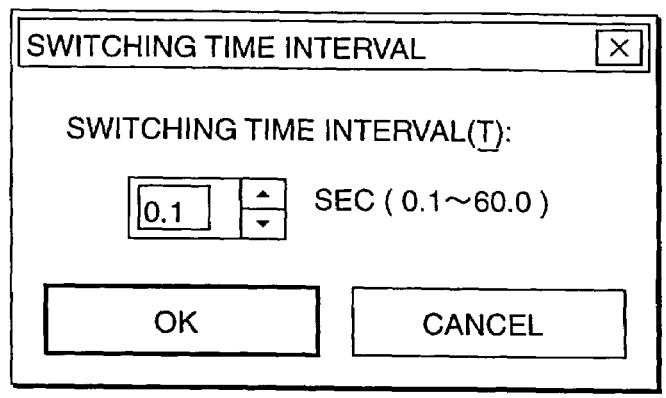
FIG. 27 is a view showing a "switching time interval" dialog box.

FIG. 27 is a view showing the "switching time interval" dialog box. In FIG. 27, the user inputs a number between 0.1 and 60.0 with increments of 0.1 into a "switching time interval" edit box, and then presses the "OK" button. As a result, the "switching time interval" dialog box is closed, and the designated switching time interval is set. The set value of the switching time interval is stored in the hard disk (HD) 205 of the personal computer (PC) 101 when the stereo image display program is terminated. Next time the program is started up, the switching time interval stored in the hard disk (HD) 205 is read in and set.

A "switching rules" menu item 1214 is selected to set the switching rules. The switching rules are applied during both manual switching and automatic switching. The "switching rules" menu item 1214 is push style, and is always selectable (valid). If the "switching rules" menu item 1214 is selected, then a "switching rules" dialog box is displayed.

Figure 28:
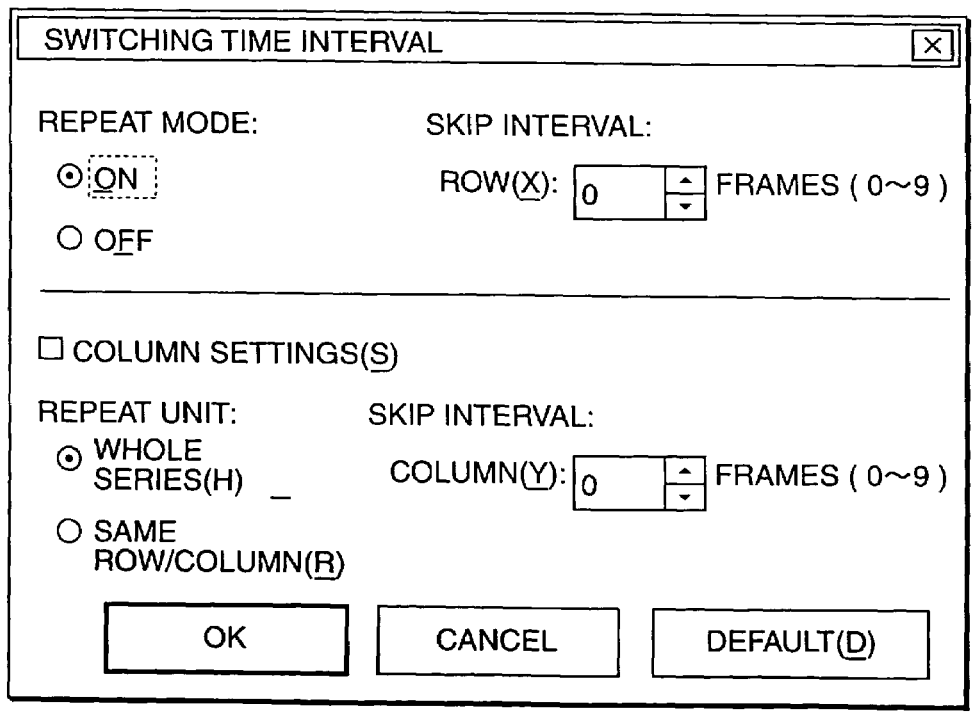
FIG. 28 is a view showing a "switching rules" dialog box.
Figure 29:
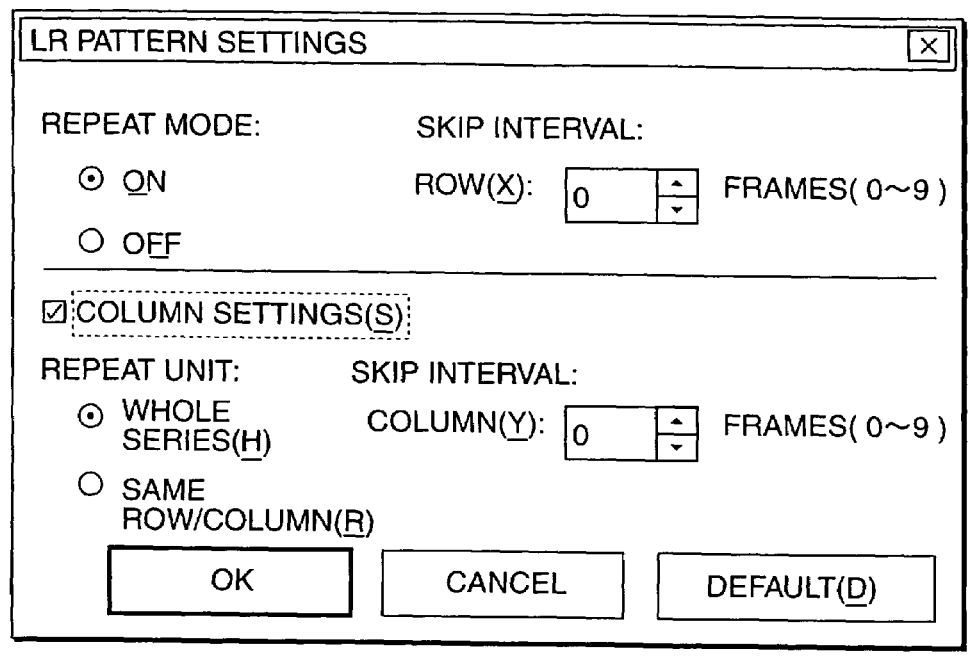
FIG. 29 is a view showing a "switching rules" dialog box.

FIGS. 28 and 29 are views showing the "switching rules" dialog box. FIG. 28 shows the items that should be set when the virtual 2-D array of the image series does not have a vertical dimension, while FIG. 29 shows the items that should be set when the virtual 2-D array of the image series does have a vertical dimension. The difference between FIG. 28 and FIG. 29 is that the "column settings" check box is not checked in FIG. 28 but is checked in FIG. 29.

First, a description will be given of an example in which the virtual 2-D array of the image series has elements from the origin (0,0) to a right end (4,0) (i.e. a 1-D array), using FIG. 28. In FIG. 28, the user selects/inputs the undermentioned items, and then presses the "OK" button. As a result, the "switching rules" dialog box is closed, and the designated switching rules are put into effect. "Repeat mode" is an item that allows the user to preset what will happen when the currently displayed stereo image is positioned at an end (i.e. the right end or the origin) of the virtual 1-D array of the image series and then shifting is carried out such that the position in the 1-D array moves beyond this end (i.e. shifting rightwards in the case of the right end or shifting leftwards in the case of the origin), specifically what will be the position in the 1-D array of the image next displayed.

If the "on" radio button is selected as "repeat mode", then the position in the 1-D array will be switched as follows. If the position is shifted rightwards when the current position is the right end (4,0), then the next position will be the origin (0,0). If the position is shifted leftwards when the current position is the origin (0,0), then the next position will be the right end (4,0).

If the "off" radio button is selected as "repeat mode", then the position in the 1-D array will be switched as follows. If the position is shifted rightwards when the current position is the right end (4,0), then the position will stay at the right end (4,0). If the position is shifted leftwards when the current position is the origin (0,0), then the position will stay at the origin (0,0).

An integer between 0 and 9 inclusive can be inputted into the "skip interval" "rows" edit box. If a value Nx is inputted into the "skip interval" "rows" edit box, then when the position in the virtual 2-D (or 1-D) array of the image series is switched leftwards or rightwards, the position will not move 1 element to the left or right, but rather Nx+1 elements to the left or right.

A description will now be given using FIG. 29 of an example in which the virtual 2-D array of the image series has elements from the origin (0,0) to a bottom right corner (4,2) as shown in FIG. 5B. In FIG. 29, the user selects/inputs the undermentioned items, and then presses the "OK" button. As a result, the "switching rules" dialog box is closed, and the designated switching are put into effect.

"Repeat mode" and "repeat unit" are items that allow the user to preset what will happen when the currently displayed stereo image is positioned at an end (i.e. the left end (Mr. Pearson以下edge をendに直しました), right end, top end or bottom end) of the virtual 2-D array of the image series and then shifting is carried out such that the position in the 2-D array moves beyond this end (i.e. shifting leftwards in the case of the left end, shifting rightwards in the case of the right end, shifting upwards in the case of the top end or shifting downwards in the case of the bottom end), specifically what will be the position in the 2-D array of the image next displayed.

If the "on" radio button is selected as "repeat mode" and the "whole series" radio button is selected as "repeat unit", then the position in the 2-D array will be switched as follows. If the position is shifted rightwards or downwards when the current position is the bottom right corner (4,2), then the next position will be the origin (0,0). If the position is shifted leftwards or upwards when the current position is the origin (0,0), then the next position will be the bottom right corner (4,2). If the position is shifted rightwards when the current position is at the right end (4,0), then the next position will be at the left end one row down (0,1). If the position is shifted leftwards when the current position is at the left end (0,1), then the next position will be at the right end one row up (4,0). If the position is shifted downwards when the current position is at the bottom end (1,2), then the next position will be at the top end one column to the right (2,0). If the position is shifted upwards when the current position is at the top end (2,0), then the next position will be at the bottom end one column to the left (1,2).

If the "on" radio button is selected as "repeat mode" and the "same row/column" radio button is selected as "repeat unit", then the position in the 2-D array will be switched as follows. If the position is shifted rightwards when the current position is at the right end (4,0), then the next position will be at the left end in the same row (0,0). If the position is shifted leftwards when the current position is at the left end (0,0), then the next position will be at the right end in the same row (4,0). If the position is shifted downwards when the current position is at the bottom end (1,2), then the next position will be at the top end in the same column (1,0). If the position is shifted upwards when the current position is at the top end (1,0), then the next position will be at the bottom end in the same column (1,2).

If the "off" radio button is selected as "repeat mode" and the "whole series" radio button is selected as "repeat unit", then the position in the 2-D array will be switched as follows. If the position is shifted rightwards or downwards when the current position is the bottom right corner (4,2), then the position will stay at the bottom right corner (4,2). If the position is shifted leftwards or upwards when the current position is the origin (0,0), then the position will stay at the origin (0,0). If the position is shifted rightwards when the current position is at the right end (4,0), then the next position will be at the left end one row down (0,1). If the position is shifted leftwards when the current position is at the left end (0,1), then the next position will be at the right end one row up (4,0). If the position is shifted downwards when the current position is at the bottom end (1,2), then the next position will be at the top end one column to the right (2,0). If the position is shifted upwards when the current position is at the top end (2,0), then the next position will be at the bottom end one column to the left (1,2).

If the "off" radio button is selected as "repeat mode" and the "same row/column" radio button is selected as "repeat unit", then the position in the 2-D array will be switched as follows. If the position is shifted rightwards when the current position is at the right end (4,0), then the position will stay at the right end (4,0). If the position is shifted leftwards when the current position is at the left end (0,0), then the position will stay at the left end (0,0). If the position is shifted downwards when the current position is at the bottom end (1,2), then the position will stay at the bottom end (1,2). If the position is shifted upwards when the current position is at the top end (1,0), then the position will stay at the top end (1,0).

An integer between 0 and 9 inclusive can be inputted into each of the "skip interval" "rows" edit box and the "skip interval" "columns" edit box. If the value Nx is inputted into the "skip interval" "rows" edit box, then when the position in the virtual array of the image series is switched leftwards or rightwards, the position will not move 1 element to the left or right, but rather Nx+1 elements to the left or right. Moreover, if a value Ny is inputted into the "skip interval" "columns" edit box, then when the position in the virtual array of the image series is switched upwards or downwards, the position will not move 1 element up or down, but rather Ny+1 elements up or down.

In FIG. 28 or FIG. 29, if the "default" button is pressed, then the "on" radio button is selected as "repeat mode", the "whole series" radio button is selected as "repeat unit", and 0 is inputted into both the skip interval" "rows" edit box and the "skip interval" "columns" edit box. The state of the "column settings" check box (i.e. checked or not checked) is not changed.

The switching rules are stored in the hard disk (HD) 205 of the personal computer (PC) 101 when the stereo image display program is terminated. Next time the program is started up, the switching rules stored in the hard disk (HD) 205 are read in and put into effect.

A "reverse stereo viewing" menu item 1215 corresponds to the "reverse stereo viewing" icon 707 shown in FIG. 7, and is selected to change reverse stereo viewing between on and off. In the present embodiment, the phenomenon in which the left and right images are displayed reversed, i.e. into the user's right and left eyes respectively, is termed reverse stereo viewing. The "reverse stereo viewing" menu item 1215 and the "reverse stereo viewing" icon 707 are check style, and are non-selectable (invalid) when no stereo image file is open and selectable (valid) when a stereo image file is open. Reverse stereo viewing is off immediately after a stereo image file has been newly opened.

Every time the "reverse stereo viewing" menu item 1215 is selected or the "reverse stereo viewing" icon 707 is clicked upon using the mouse 104, reverse stereo viewing switches between on and off. When reverse stereo viewing is on, the stereo image currently displayed is displayed in a position shifted by either 1 pixel or 1 line depending on the characteristics of the glasses-free type display 102, and as a result the left and right images are displayed reversed, i.e. into the user's right and left eyes respectively.

The glasses-free type display 102 is designed such that light path from each pixel or line is oriented such that the first pixel or line is seen by only the left eye, the next pixel or line is seen by only the right eye, the next pixel or line is seen by only the left eye, and so on. If the display position of the stereo image is shifted by 1 pixel or 1 line, the left and right images that make up the stereo image are thus reversed, with the image previously seen by the left eye now being seen by the right eye and the image previously seen by the right eye now being seen by the left eye. When reverse stereo viewing is turned off, the display position of the stereo image currently displayed is returned to the original position, and hence the left and right images are displayed into the user's eyes without being reversed.

A "LR pattern" menu item 1216 corresponds to the "LR pattern" icon 708 shown in FIG. 7, and is selected to display a suitable viewing position verification image (LR pattern)

in the main window. The "LR pattern" menu item 1216 and the "LR pattern" icon 708 are check style, and are always selectable (valid).

Every time the "LR pattern" menu item 1216 is selected or the "LR pattern" icon 708 is clicked upon using the mouse 104, LR pattern display is changed between on and off. When no image file is open and LR pattern display is on, an LR pattern is displayed throughout the main window, and an LR identification image is displayed in each of the four corners of the main window.

Figure 30:
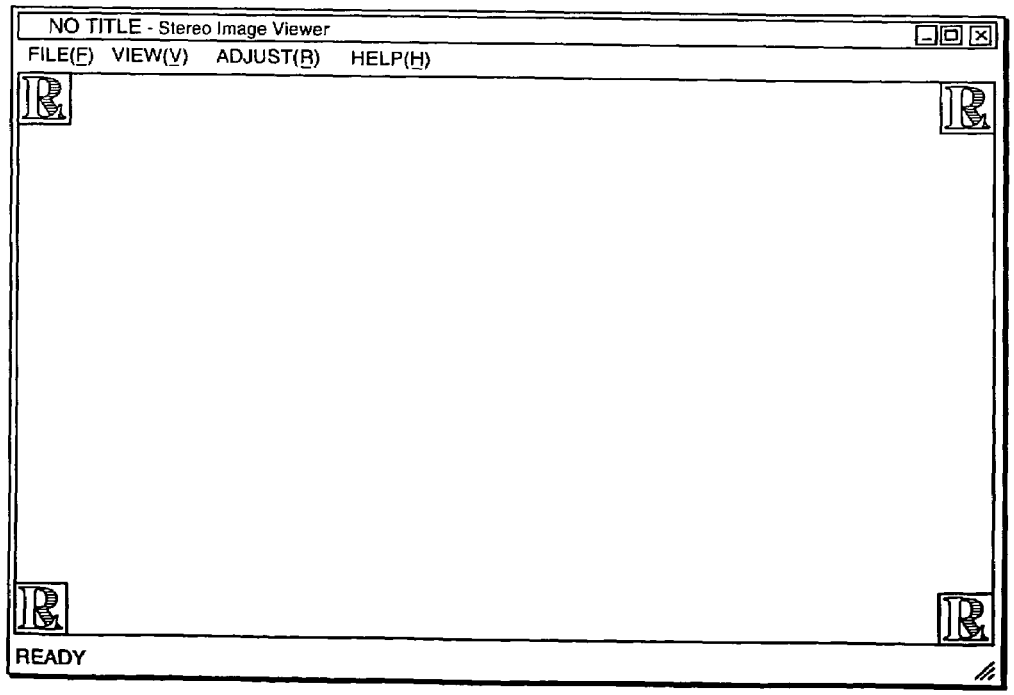
FIG. 30 is a view showing an LR pattern displayed when no image is open.

FIG. 30 is a view showing the LR pattern displayed when no image is open. In FIG. 30, none of the tool bars are displayed. The LR pattern is comprised of a left eye pattern (for example a white color) drawn in a particular region in pixel positions only seen by the left eye, and a right eye pattern (for example a black color) drawn in the same region in pixel positions only seen by the right eye, with this being done in accordance with the characteristics of the glasses-free type display 102. Moreover, the LR identification image is comprised of a left eye image (for example a letter "L") disposed in a particular region in pixel positions only seen by the left eye, and a right eye image (for example a letter "R") disposed in the same region in pixel positions only seen by the right eye, with this again being done in accordance with the characteristics of the glasses-free type display 102.

It is only when the user views the glasses-free type display 102 from a suitable viewing position that the left eye pattern and images are seen only by the left eye and the right eye pattern and images are seen only by the right eye. If the user views the glasses-free type display 102 from an incorrect viewing position, then the left eye pattern and images and the right eye pattern and images are seen mixed together by both the left and right eyes, and hence the user can tell where the suitable viewing position is.

If LR pattern display is turned on when an image file is open, then the LR pattern is displayed in a part of the main window as set using an "LR pattern settings" menu item 1217 described below, and the LR identification image is displayed in the four corners or two corners of the main window.

Figure 32:
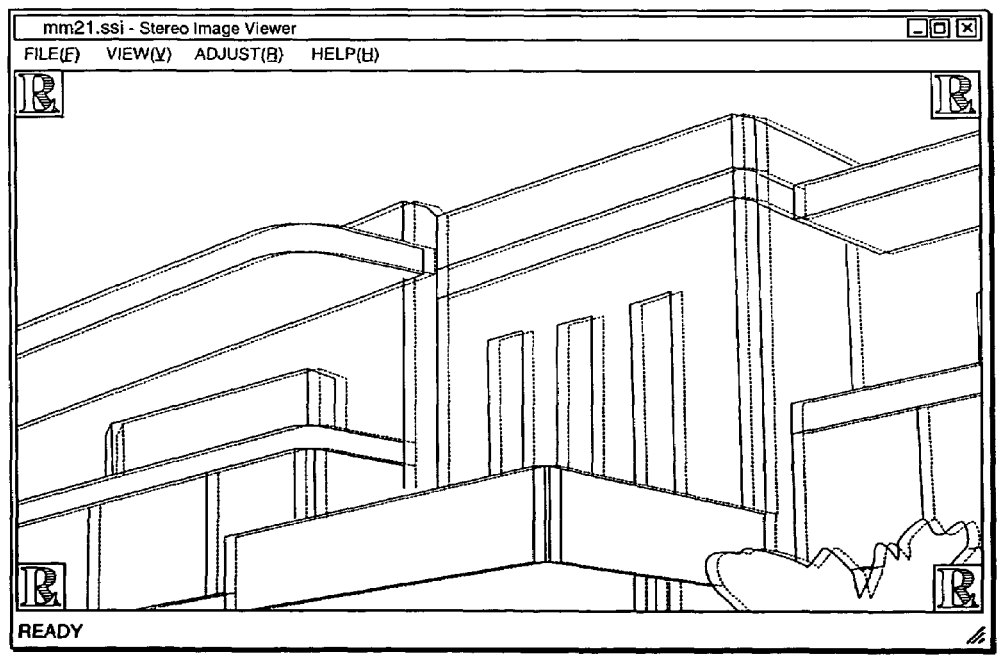
FIG. 32 is a view showing an LR pattern displayed when an image is open.
Figure 33:
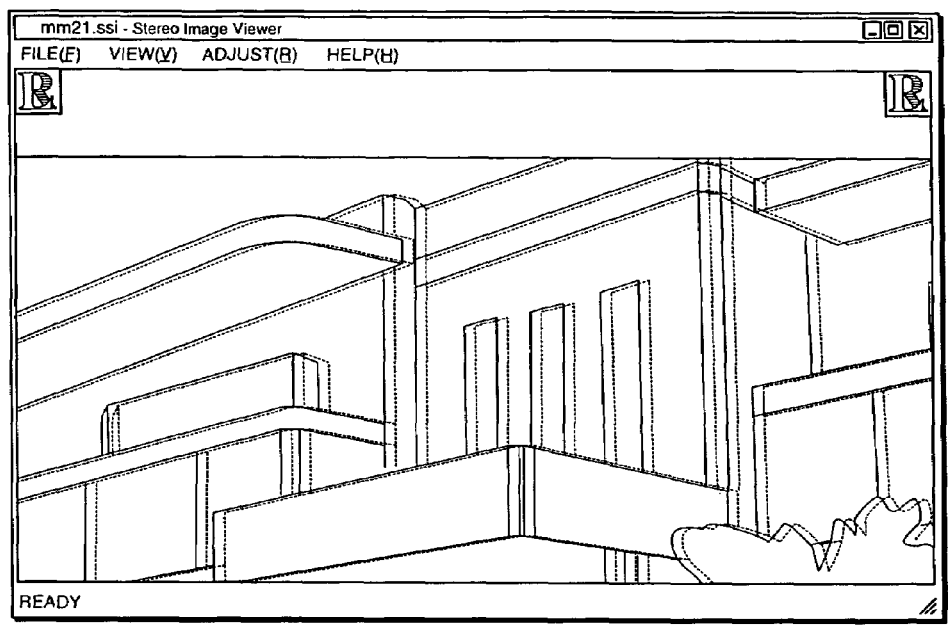
FIG. 33 is a view showing an LR pattern displayed when an image is open.
Figure 34:
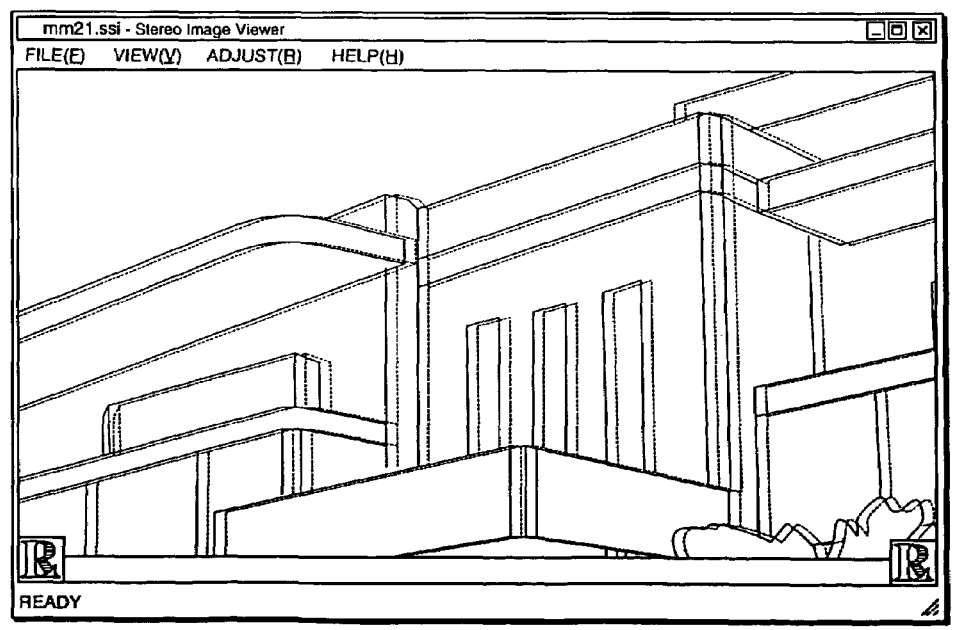
FIG. 34 is a view showing an LR pattern displayed when an image is open.

FIGS. 32, 33 and 34 are views each showing an LR pattern displayed when an image is open. These figures will be described later.

If LR pattern display is turned off, then the LR pattern and the LR identification images are erased.

The LR pattern display state (i.e. on or off) is stored in the RAM 203 of the personal computer (PC) 101 only while the stereo image display program is operating. Immediately after the stereo image display program is started up, LR pattern (suitable viewing position verification image) display is off.

The "LR pattern settings" menu item 1217 is selected to set the LR pattern display method. The "LR pattern settings" menu item 1217 is push style, and is always selectable (valid). If the "LR pattern settings" menu item 1217 is selected, then an "LR pattern settings" dialog box is displayed.

Figure 31:
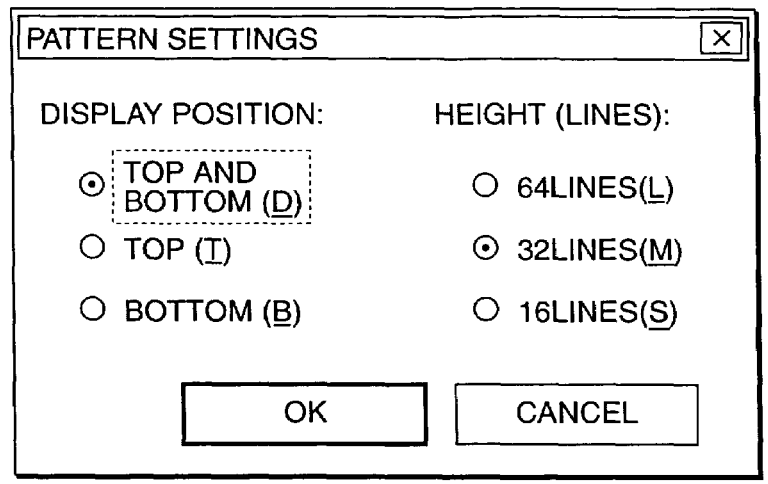
FIG. 31 is a view showing an "LR pattern settings" dialog box.

FIG. 31 is a view showing the "LR pattern settings" dialog box. In FIG. 31, the user selects "display position" and "height (no. of lines)", and then presses the "OK" button. As a result, the "LR pattern settings" dialog box is closed, and the designated LR pattern settings are put into effect. The choices for "display position" are a "top end and bottom end" radio button, a "top end" radio button, and a "bottom end" radio button, with these indicating the LR pattern display position in the main window. The choices for "height (no. of lines)" are a "64 lines" radio button, a "32 lines" radio button, and a "16 lines" radio button, with these indicating the height (number of lines) of the LR pattern displayed.

The values set using the "LR pattern settings" dialog box are stored in the hard disk (HD) 205 of the personal computer (PC) 101 when the stereo image display program is terminated. Next time the program is started up, the set values stored in the hard disk (HD) 205 are read in and set.

FIG. 32 is a view showing the LR pattern displayed when an image is open in the case that the "top end and bottom end" radio button has been selected as "display position" and the "32 lines" radio button as "height (no. of lines)" in the "LR pattern settings" dialog box. FIG. 33 is a view showing the LR pattern displayed when an image is open in the case that the "top end" radio button has been selected as "display position" and the "64 lines" radio button as "height (no. of lines)" in the "LR pattern settings" dialog box. FIG. 34 is a view showing the LR pattern displayed when an image is open in the case that the "bottom end" radio button has been selected as "display position" and the "16 lines" radio button as "height (no. of lines)" in the "LR pattern settings" dialog box. In FIGS. 32, 33 and 34, none of the tool bars are displayed. It should be noted that any combination of "display position" and "height (no. of lines)" can be selected, not only the combinations shown in FIGS. 32, 33 and 34.

A "full screen" menu item 1218 corresponds to the "full screen" icon 706, and is selected to display the main window over the whole screen. The "full screen" menu item 1218 and the "full screen" icon 706 are check style, and are always selectable (valid).

Every time the "full screen" menu item 1218 is selected or the "full screen" icon 706 is clicked upon using the mouse 104, full screen is changed between on and off. Here, full screen refers to a state in which the main window is enlarged so as to cover the whole of the screen of the glasses-free type display 102, and the title bar, menu bar and status bar are not displayed.

When full screen is turned on, the main window is displayed over the whole screen, and when full screen is turned off, the main window returns to the state (non-full screen) immediately before full screen was turned on.

As will be described later, if the glasses-free type display 102 which carries out 3-D display and a normal display which carries out 2-D display are simultaneously connected to the personal computer (PC) 101, then full screen is always carried out on the glasses-free type display 102 which carries out 3-D display. If non-full screen were being carried out on the normal display which carries out 2-D display and then full screen were turned on, the application window would thus move from the normal display to the glasses-free type display 102. If full screen were subsequently turned off, the application window would return from the glasses-free type display 102 to the normal display. If non-full screen were being carried out on the glasses-free type display 102 and then full screen were turned on, the application window would stay on the glasses-free type display 102 but would become full screen.

The on/off state of full screen is stored in the hard disk (HD) 205 of the personal computer (PC) 101 when the stereo image display program is terminated. Next time the program is started up, the full screen on/off state stored in the hard disk (HD) 205 is read in and set.

A "display setup" submenu 1219 has a "3-D display setup" menu item 1220 and a "dual display setup" menu item 1221. The "3-D display setup" menu item 1220 is selected to set which pixel positions or line positions the left or right images should be displayed in on the glasses-free type display 102. The "3-D display setup" menu item 1220 is push style, and is always selectable (valid). If the "3-D display setup" menu item 1220 is selected, then a "3-D display setup" dialog box is displayed.

Figure 35:
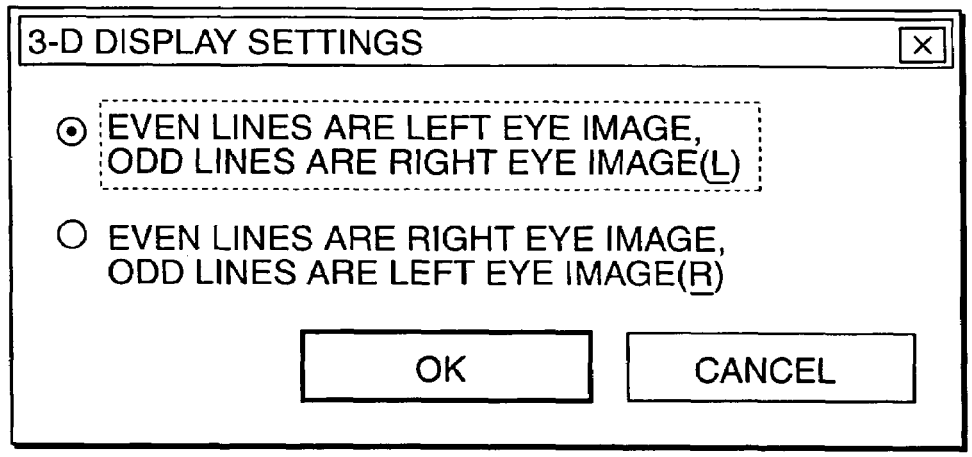
FIG. 35 is a view showing a "3-D display setup" dialog box.

FIG. 35 is a view showing the "3-D display setup" dialog box. In FIG. 35, the user selects one of the two radio buttons, and then presses the "OK" button. As a result, the "3-D display setup" dialog box is closed, and the designated 3-D display setting is put into effect.

In the example in FIG. 35, it has been assumed that the glasses-free type display 102 is designed such that the left eye and right eye images are displayed on alternate lines. In the "3-D display setup" dialog box, the "even lines are left eye image, odd lines are right eye image" radio button and the "even lines are right eye image, odd lines are left eye image" radio button indicate the positional relationship between the left and right images and the lines as stated.

The value set using the "3-D display setup" dialog box is passed to the stereo image data processing module 306 shown in FIG. 3. The stereo image data processing module 306 composites left and right images into a stereo image in accordance with the 3-D display set value. Moreover, the 3-D display set value is stored in the hard disk (HD) 205 of the personal computer (PC) 101 when the stereo image display program is terminated. Next time the program is started up, the left/right image basic settings (which include this set value) stored in the hard disk (HD) 205 are read in and passed to the stereo image data processing module 306.

It is possible to connect two displays to the personal computer (PC) 101 shown in FIG. 1. The "dual display setup" menu item 1221 is selected to set whether it is the first display or the second display that is the glasses-free type display 102 when the glasses-free type display 102 and another display (not shown in FIG. 1) are connected to the personal computer (PC) 101. The "dual display setup" menu item 1221 is push style, and is always selectable (valid). If the "dual display setup" menu item 1221 is selected, then a "dual display setup" dialog box is displayed.

Figure 36:
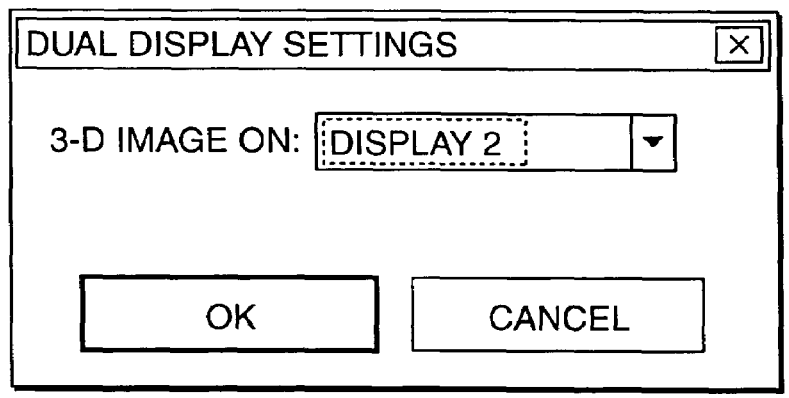
FIG. 36 is a view showing a "dual display setup" dialog box.
Figure 37:
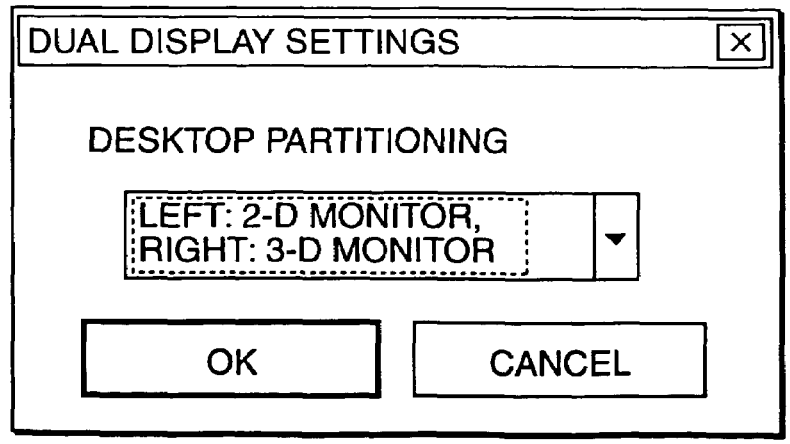
FIG. 37 is a view showing a "dual display setup" dialog box.

FIGS. 36 and 37 are views showing "dual display setup" dialog boxes.

To connect two displays to the personal computer (PC) 101, it is necessary for a display card (not shown in FIG. 1) accommodating dual display to be installed in the personal computer (PC) 101. There are two types of such a display card, which differ in the method of accommodating dual display.

The first type (type 1) is capable of managing the characteristics of the two displays individually, and is capable of informing the OS (operating system) that two displays are connected. The second type (type 2) is not capable of managing the characteristics of the two displays individually, and is not capable of informing the OS even if two displays are connected.

When a type 1 display card is installed in the personal computer (PC) 101, the stereo image display program can use OS functions to automatically detect whether or not two displays are connected to the personal computer (PC) 101.

If it is detected that two displays are connected to the personal computer (PC) 101, then the "dual display setup" dialog box shown in FIG. 36 is displayed. In FIG. 36, there are two choices "display 1" and "display 2" listed in the "3-D display destination" combo box. The user selects one of the two choices, and then presses the "OK" button. As a result, the "dual display setup" dialog box is closed, and the selected display is set to be the glasses-free type display 102.

When a type 2 display card is installed in the personal computer (PC) 101, on the other hand, the stereo image display program cannot automatically detect whether or not two displays are connected to the personal computer (PC) 101.

If it cannot be detected whether or not two displays are connected to the personal computer (PC) 101, then the "dual display setup" dialog box shown in FIG. 37 is displayed. In FIG. 37, there are 5 choices listed in the "desktop partitioning" combo box, namely "none", "left: 2-D monitor, right: 3-D monitor", "left: 3-D monitor, right: 2-D monitor", "top: 2-D monitor, bottom: 3-D monitor" and "top: 3-D monitor, bottom: 2-D monitor". The user selects one of the 5 choices, and then presses the "OK" button. As a result, the "dual display setup" dialog box is closed, and the designated dual display setting is put into effect as described below.

In FIG. 37, if "none" is selected in the "desktop partitioning" combo box, then this means that only one display (the glasses-free type display 102) is connected to the personal computer (PC) 101. If one of the other choices is selected in the "desktop partitioning" combo box, then this means that two displays (the glasses-free type display 102 which carries out 3-D display, and a normal display which carries out 2-D display) are connected to the personal computer (PC) 101, and the particular choice selected indicates whether the desktop area managed by the OS should be partitioned in a logical left/right or top/bottom fashion, and which of the two partitioned areas should be displayed on the glasses-free type display 102 and which should be displayed on the normal display.

Specifically, if "left: 2-D monitor, right: 3-D monitor" is selected, then this means that the left half of the desktop area is displayed on the normal display and the right half is displayed on the glasses-free type display 102. If "left: 3-D monitor, right: 2-D monitor" is selected, then this means that the left half of the desktop area is displayed on the glasses-free type display 102 and the right half is displayed on the normal display. If "top: 2-D monitor, bottom: 3-D monitor" is selected, then this means that the top half of the desktop area is displayed on the normal display and the bottom half is displayed on the glasses-free type display 102. If "top: 3-D monitor, bottom: 2-D monitor" is selected, then this means that the top half of the desktop area is displayed on the glasses-free type display 102 and the bottom half is displayed on the normal display.

A "tool bars" menu item 1222 is selected to switch the display of all of the tool bars, namely the main tool bar shown in FIG. 7, the switching direction tool bar shown in FIG. 8 and the shift correction tool bar shown in FIG. 9, between on and off. The "tool bars" menu item 1222 is check style, and is always selectable (valid).

A "status bar" menu item 1223 is selected to switch the display of the status bar between on and off. The "status bar" menu item 1223 is check style, and is always selectable (valid).

The display states (display on or off) and display positions of the tool bars and the status bar are stored in the hard disk (HD) 205 of the personal computer (PC) 101 when the stereo image display program is terminated. Next time the program is started up, the display states and display positions of the tool bars and the status bar stored in the hard disk (HD) 205 are read in and reproduced.

Figure 13:
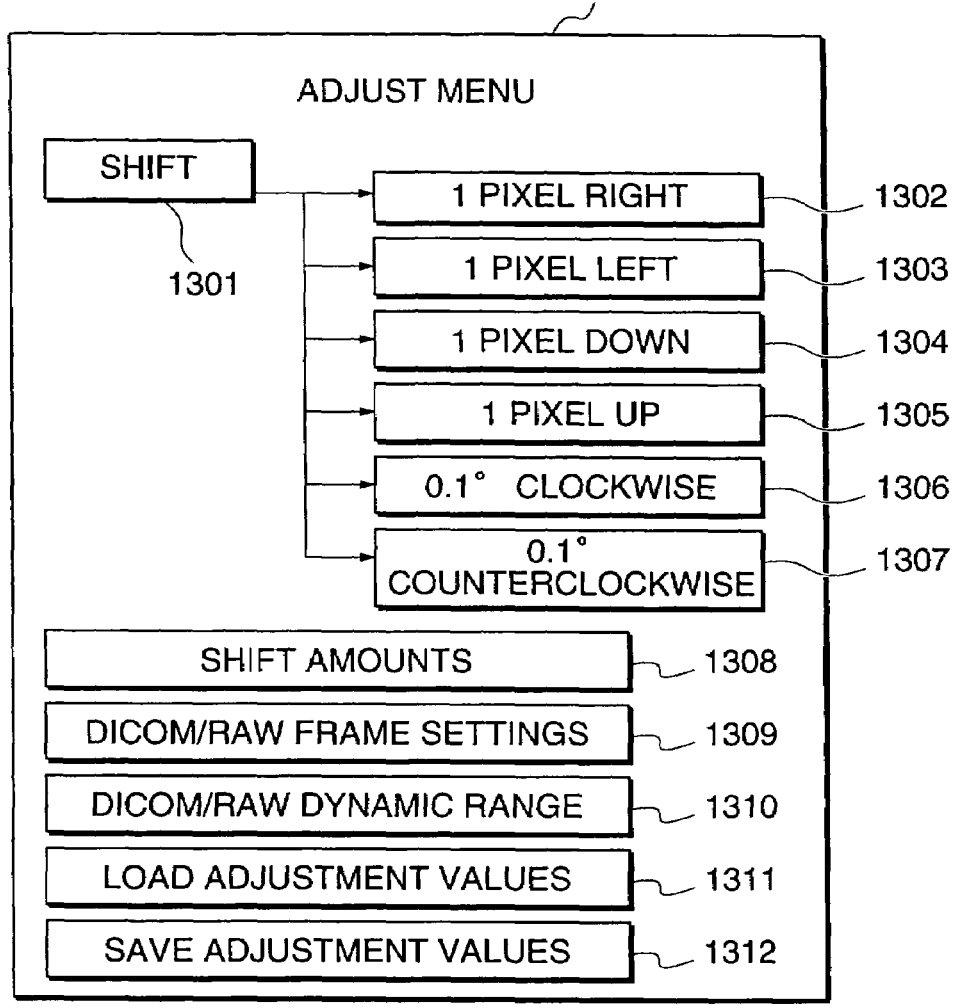
FIG. 13 is a view showing a adjustment menu.

FIG. 13 is a view showing the adjustment menu 1003. The adjustment menu 1003 has the following submenus and menu items. An "shift" submenu 1301 has a "1 pixel right" menu item 1302, a "1 pixel left" menu item 1303, a "1 pixel down" menu item 1304, a "1 pixel up" menu item 1305, a "0.1° clockwise" menu item 1306, and a "0.1° counterclockwise" menu item 1307. Here "shift" means that when compositing left and right images to create a stereo image, the position of the right image relative to the left image is shifted by a predetermined amount in a predetermined direction before compositing to create the stereo image.

The "1 pixel right" menu item 1302 corresponds to the "1 pixel right" icon 901 shown in FIG. 9, the "1 pixel left" menu item 1303 corresponds to the "1 pixel left" icon 902 shown in FIG. 9, the "1 pixel down" menu item 1304 corresponds to the "1 pixel down" icon 903 shown in FIG. 9, the "1 pixel up" menu item 1305 corresponds to the "1 pixel up" icon 904 shown in FIG. 9, the "0.1° clockwise" menu item 1306 corresponds to the "0.1° clockwise" icon 905 shown in FIG. 9, and the "0.1° counterclockwise" menu item 1307 corresponds to the "0.1° counterclockwise" icon 906 shown in FIG. 9. These menu items and icons are push style, and are non-selectable (invalid) when no stereo image file is open and selectable (valid) when a stereo image file is open.

If the "1 pixel right" menu item 1302 is selected or the "1 pixel right" icon 901 is clicked upon using the mouse 104, then a horizontal is increased by 1 and then the currently displayed stereo image is redisplayed (the shift amounts will be described below). Similarly, if the "1 pixel left" menu item 1303 is selected or the "1 pixel left" icon 902 is clicked upon using the mouse 104, then the horizontal is decreased by 1 and then the currently displayed stereo image is redisplayed. If the "1 pixel down" menu item 1304 is selected or the "1 pixel down" icon 903 is clicked upon using the mouse 104, then an vertical is increased by 1 and then the currently displayed stereo image is redisplayed. If the "1 pixel up" menu item 1305 is selected or the "1 pixel up" icon 904 is clicked upon using the mouse 104, then the vertical is decreased by 1 and then the currently displayed stereo image is redisplayed.

If the "0.1° clockwise" menu item 1306 is selected or the "0.1° clockwise" icon 905 is clicked upon using the mouse 104, then a rotation angle is increased by 0.1° and then the currently displayed stereo image is redisplayed (the rotation angle will be described below). If the "0.1° counterclockwise" menu item 1307 is selected or the "0.1° counterclockwise" icon 906 is clicked upon using the mouse 104, then the rotation angle is decreased by 0.1° and then the currently displayed stereo image is redisplayed.

A "shift amounts" menu item 1308 is selected when the user wishes to input the shift amounts directly. The "shift amounts" menu item 1308 is push style, and is non-selectable (invalid) when no stereo image file is open and selectable (valid) when a stereo image file is open. Here, the "shift amounts" are the "horizontal", the "vertical" and the "rotation angle". The "horizontal" is the amount of shift in the left/right direction, with rightwards being the positive direction. The "vertical" is the amount of shift in the up/down direction, with downwards being the positive direction. The "rotation angle" is the amount of rotational shift, with the center of rotation being the center of the right eye image and clockwise being the positive direction.

If the "shift amounts" menu item 1308 is selected, then a "shift amounts" dialog box is opened.

Figure 38:
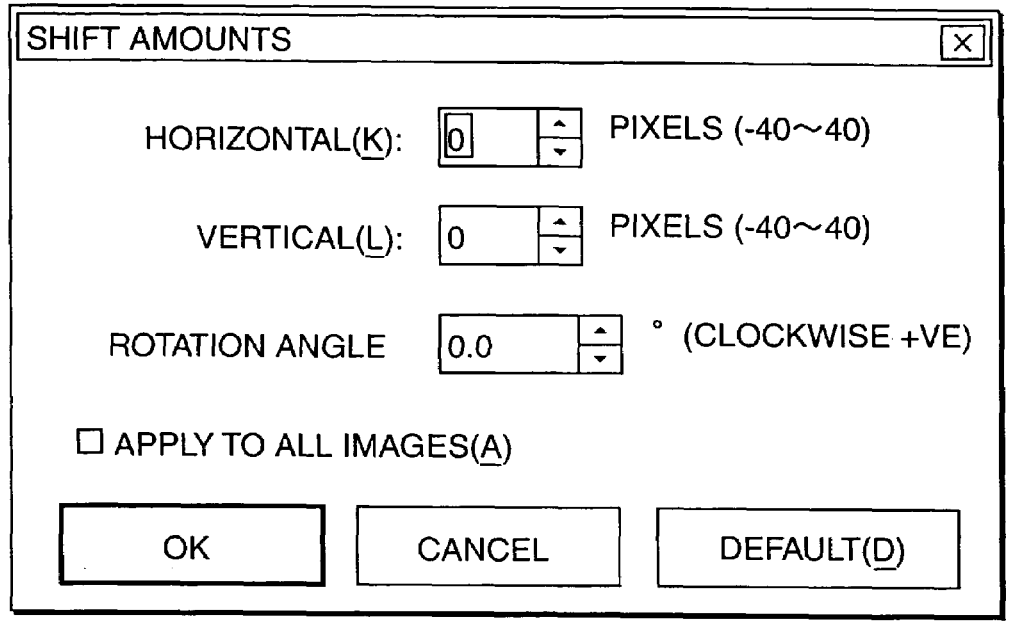
FIG. 38 is a view showing a "shift amounts" dialog box.

FIG. 38 is a view showing the "shift amounts" dialog box. In FIG. 38, the user inputs a value between −40 and 40 inclusive into each of the "horizontal" edit box and the "vertical" edit box, inputs a value between −360.0 and +360.0 inclusive into the "rotation angle" edit box, puts a check into the "apply to all images" check box if necessary, and then presses the "OK" button. As a result, the "shift amounts" dialog box is closed, the designated shift amounts are put into effect, and the currently displayed stereo image is redisplayed.

If the "apply to all images" check box was not checked, then the values set using the "shift amounts" dialog box are applied only to the currently displayed stereo image, whereas if the "apply to all images" check box was checked, then the values set using the "shift amounts" dialog box are applied to all of the stereo images in the currently opened image series.

Moreover, in the "shift amounts" dialog box, if the "default" button is pressed, then 0 is inputted into each of the "horizontal" edit box and the "vertical" edit box, and 0.0 is inputted into the "rotation angle" edit box.

Immediately after a stereo pair of image files has been newly opened, the horizontal and the vertical are each initialized to 0 pixels, and the rotation angle is initialized to 0.0°. Moreover, immediately after an image series has been newly opened, the horizontal and the vertical are each initialized to 0 pixels and the rotation angle is initialized to 0.0° for all of the stereo pairs of images contained in the image series. However, these shift amounts can be saved as correction values into a display adjustment file, described later, and when the correction values are read out from the display adjustment file, the shift amounts are reinitialized in accordance with the correction values.

A "DICOM/raw frame settings" menu item 1309 is selected to set how many frames each right eye image is before or after the corresponding left eye image (L-R spacing) and which of the frames should be used in the case that a plurality of frames are stored in a single DICOM file or raw data file. The "DICOM/raw frame settings" menu item 1309 is push style, and is non-selectable (invalid) when no DICOM file or raw data file containing a plurality of frames is open, and selectable (valid) when a DICOM file or raw data file containing a plurality of frames is open.

If the "DICOM/raw frame settings" menu item 1309 is selected, then a "DICOM/raw frame settings" dialog box is displayed.

Figure 39:
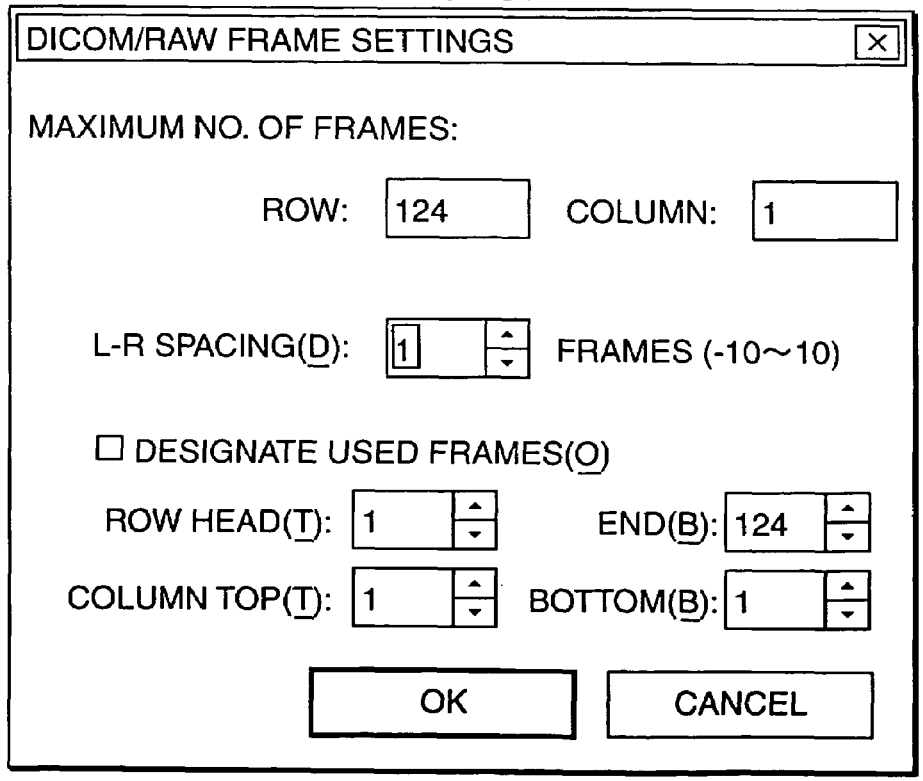
FIG. 39 is a view showing a "DICOM/raw frame settings" dialog box.
Figure 40:
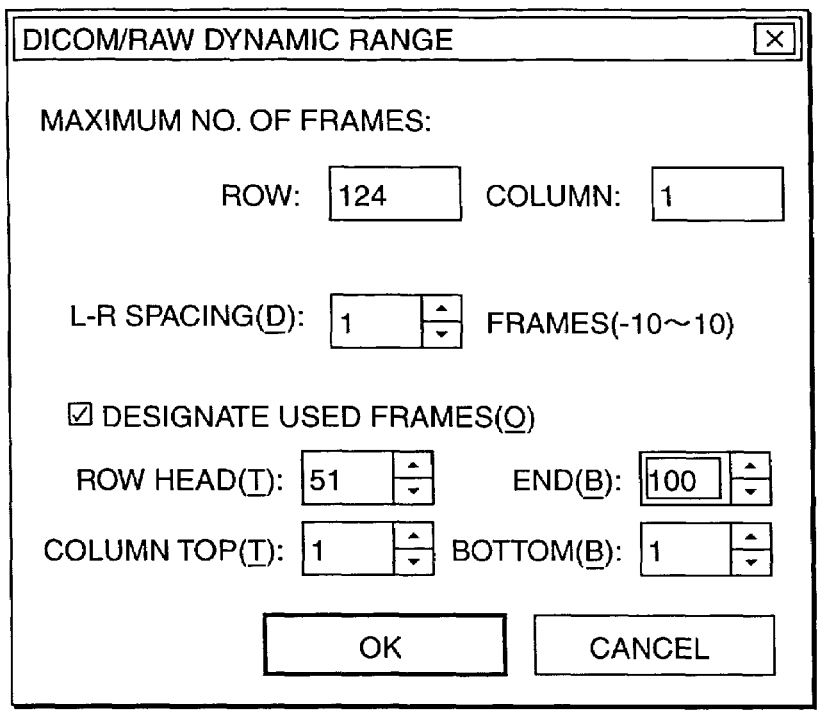
FIG. 40 is a view showing a "DICOM/raw frame settings dialog box.

FIGS. 39 and 40 are views showing the "DICOM/raw frame settings" dialog box. In FIGS. 39 and 40, the numbers of frames in the horizontal and vertical directions contained in the DICOM file or raw data file currently open are displayed in the "rows" and "columns" edit boxes respectively under "maximum.no. of frames". The "rows" and "columns" edit boxes are read only, with it not being possible for the user to input values.

In FIGS. 39 and 40, the user inputs a value between −10 and 10 inclusive into the "L-R spacing" edit box (this value must also be less than the value displayed in the "maximum no. of frames" "rows" edit box), inputs values for the items described below relating to the used frames if necessary, and then presses the "OK" button. As a result, the "DICOM/raw frame settings" dialog box is closed, and then, in accordance with the designated L-R spacing and used frames items, a left eye image and right eye image are read out from the file and composited, and the resulting stereo image is displayed.

The items relating to the used frames are a "designate used frames" check box, a "rows" "head" edit box, a "rows" "tail" edit box, a "columns" "head" edit box, and a "columns" "tail" edit box.

If the "designate used frames" check box is not checked, then all of the frames contained in the currently opened DICOM file or raw data file are read out, whereas if the "designate used frames" check box is checked, then only the frames designated using the edit boxes are read out as described below.

A value at least 1 but less than the value displayed in the "maximum no. of frames" "rows" edit box is inputted into the "rows" "head" edit box as the number of the first frame to be used in the horizontal direction. A value at least the value inputted into the "rows" "head" edit box plus the value inputted into the "L-R spacing" edit box but no more than the value displayed in the "maximum no. of frames" "rows" edit box is inputted into the "rows" "tail" edit box as the number of the last frame to be used in the horizontal direction.

Values can only be inputted into the "columns" "head" edit box and the "columns" "tail" edit box if the DICOM file or raw data file currently opened contains at least two frames in the vertical direction, i.e. if the value displayed in the "maximum no. of frames" "columns" edit box is 2 or more.

A value at least 1 but no more than the value displayed in the "maximum no. of frames" "columns" edit box is inputted into the "columns" "head" edit box as the number of the first frame to be used in the vertical direction. A value at least the value inputted into the "columns" "head" edit box but no more than the value displayed in the "maximum no. of frames" "rows" edit box is inputted into the "columns" "tail" edit box as the number of the last frame to be used in the vertical direction.

Immediately after a DICOM file or raw data file containing a plurality of frames has been opened, the L-R spacing is initialized to 1, and the used frames are initialized to be all of the frames contained in the file. The L-R spacing and the used frames items can be saved as correction values into a display adjustment file as described later; when the correction values are read out from the display adjustment file, the L-R spacing and the used frames items are reinitialized in accordance with these correction values.

A "DICOM/raw dynamic range" menu item 1310 is used to set a method (brightness range setting method) for converting into image data having 8 bits per sample displayable by the glasses-free type display 102 in the case that the image data contained in a DICOM file or raw data file has 9 or more bits per sample (1 sample contains data on 1 color for 1 pixel).

The "DICOM/raw dynamic range" menu item 1310 is push style, and is non-selectable (invalid) when no DICOM file or raw data file is open or when the number of bits per sample in the image data contained in a DICOM file or raw data file is 8 or less, and is selectable (valid) when a DICOM file or raw data file is open and the number of bits per sample in the image data contained in the DICOM file or raw data file is 9 or more. If the "DICOM/raw dynamic range" menu item 1310 is selected, then a "DICOM/raw dynamic range" dialog box is displayed.

Figure 41:
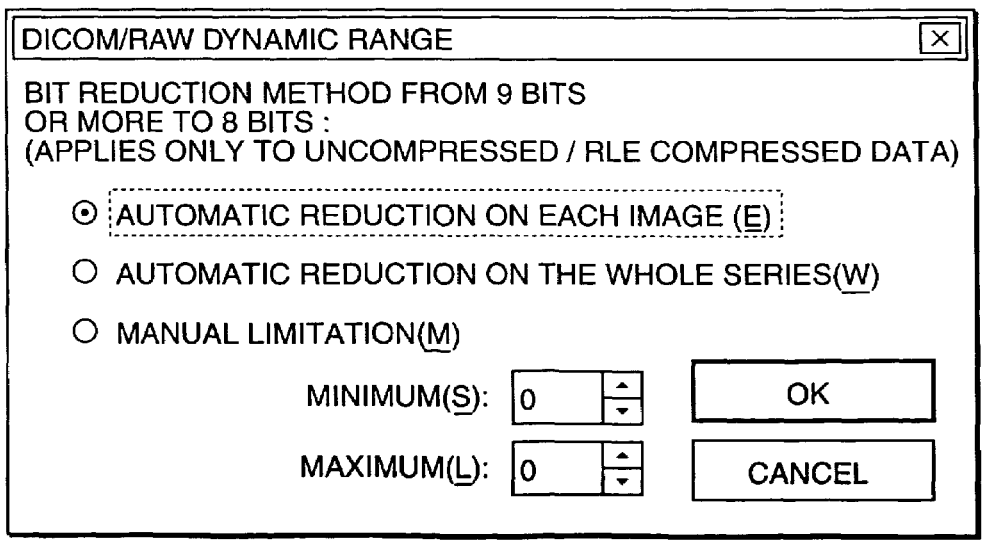
FIG. 41 is a view showing a "DICOM/raw dynamic range" dialog box.
Figure 42:
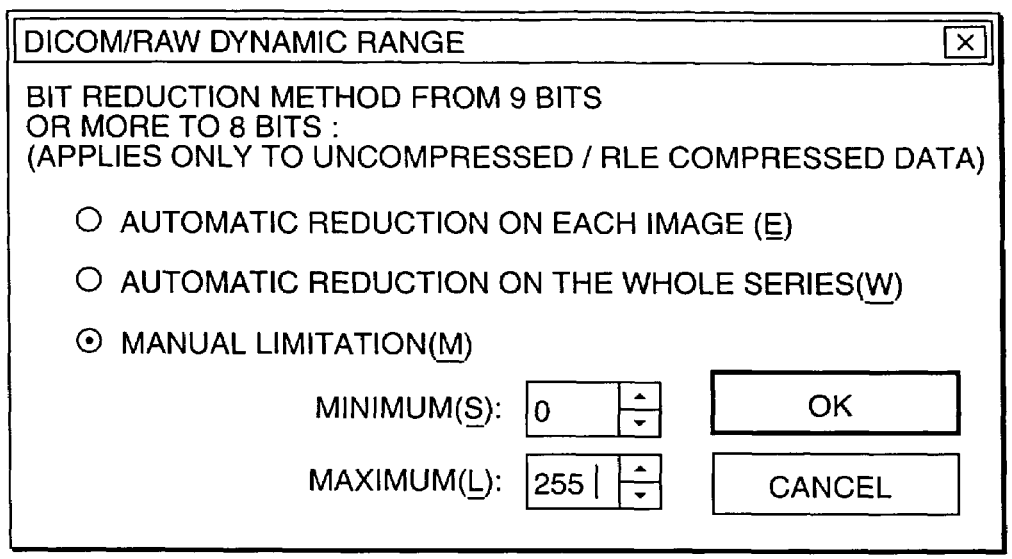
FIG. 42 is a view showing a "DICOM/raw dynamic range" dialog box.

FIGS. 41 and 42 are views showing the "DICOM/raw dynamic range" dialog box. In FIG. 41, the user selects the "automatic reduction on each image individually" radio button, or selects the "automatic reduction on the whole series" radio button, or selects the "manual limitation" radio button and then inputs suitable values into the "minimum value" and "maximum value" edit boxes (see FIG. 42). The user then presses the "OK" button. As a result, the "DICOM/raw dynamic range" dialog box is closed, and the designated brightness range setting method is put into effect.

If the user selects the "automatic reduction on each image individually" radio button, then all of the sample values of the stereo image displayed on the screen are examined, and the minimum and maximum sample values are automatically obtained. The sample values are then linearly transformed such that the range from the minimum sample value to the maximum sample value becomes 0 to 255.

If the user selects the "automatic reduction on the whole series" radio button, then all of the sample values of all of the stereo images contained in the image series are examined, and the minimum and maximum sample values are automatically obtained. The sample values are then linearly transformed such that the range from the minimum sample value to the maximum sample value becomes 0 to 255.

Moreover, if the user selects the "manual limitation" radio button and then inputs suitable values into the "minimum value" and "maximum value" edit boxes, then the stereo image sample values are transformed according to the following rules. Sample values that are less than the designated minimum value are transformed to 0. Sample values that are greater than the designated maximum value are transformed to 255. Sample values within a range from the designated minimum value to the designated maximum value are linearly transformed such that the range from the designated minimum value to the designated maximum value becomes 0 to 255.

Immediately after a DICOM file or raw data file has been opened, the brightness range setting method is initialized to "automatic reduction on each image individually". However, the brightness range setting method can be saved as correction values into a display adjustment file, described below, in which case when the correction values are read out from the display adjustment file, the brightness range setting method is reinitialized in accordance with the correction values.

A "load adjustment values" menu item 1311 is selected to open a display adjustment file and read out therefrom set values (correction values) relating to stereo image display correction. The "read correction values" menu item 1311 is push style, and is non-selectable (invalid) when no stereo image file is open and selectable (valid) when a stereo image file is open. "Correction values" is a general term for the shift amounts set using the menu items of the "shift" submenu 1301 or the "shift amounts" dialog box (see FIG. 38), the L-R spacing and the set values relating to the used frames set using the "DICOM/raw frame settings" dialog box (see FIGS. 39 and 40), and the brightness range setting method set using the "DICOM/raw dynamic range" dialog box (see FIGS. 41 and 42).

If the "load adjustment values" menu item 1311 is selected, then a "load adjustment values" dialog box is displayed.

Figure 43:
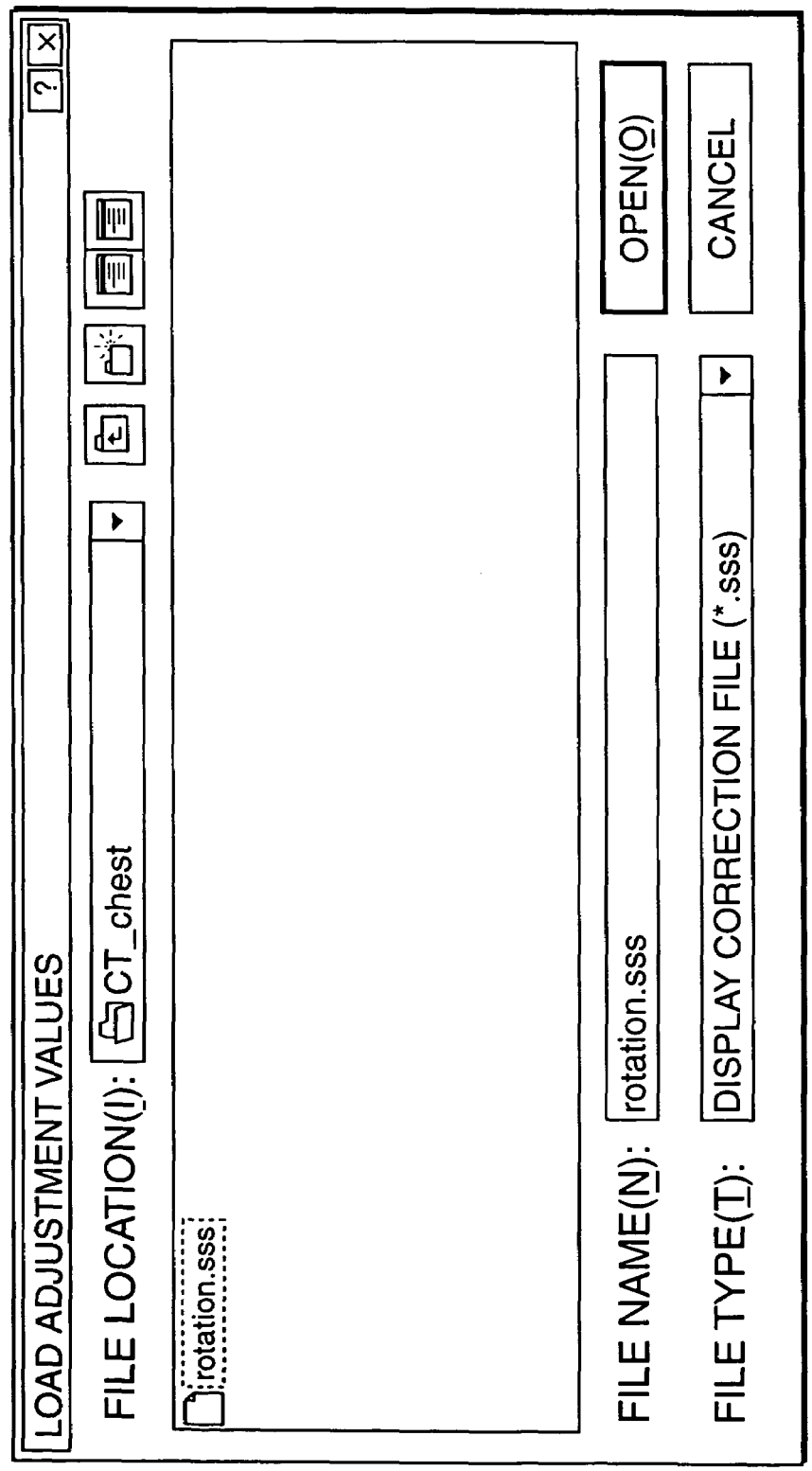
FIG. 43 is a view showing a "load adjustment values" dialog box.

FIG. 43 is a view showing the "load adjustment values" dialog box. In FIG. 43, the user selects "file location" and inputs the name of a display adjustment file into the "file name" edit box, and then presses the "open" button. As a result, the "load adjustment values" dialog box is closed, the designated display adjustment file is opened, and the above correction values are read out.

After the display adjustment file processing module 305 (see FIG. 3) has opened the display adjustment file and read out the correction values, the correction values are sent to the stereo image data processing module 306 via the data processing module 302. The stereo image data processing module 306 amends the form of the display of the stereo image based on the correction values. The amended stereo image is sent to the display control module 303 via the data processing module 302, and is displayed on the glasses-free type display 102.

A "load adjustment values" menu item 1312 is selected to save the above correction values into a display adjustment file. The "load adjustment values" menu item 1312 is push style, and is non-selectable (invalid) when no stereo image file is open and selectable (valid) when a stereo image file is open. If the "load adjustment values" menu item 1312 is selected, then a "load adjustment values" dialog box is displayed.

Figure 44:
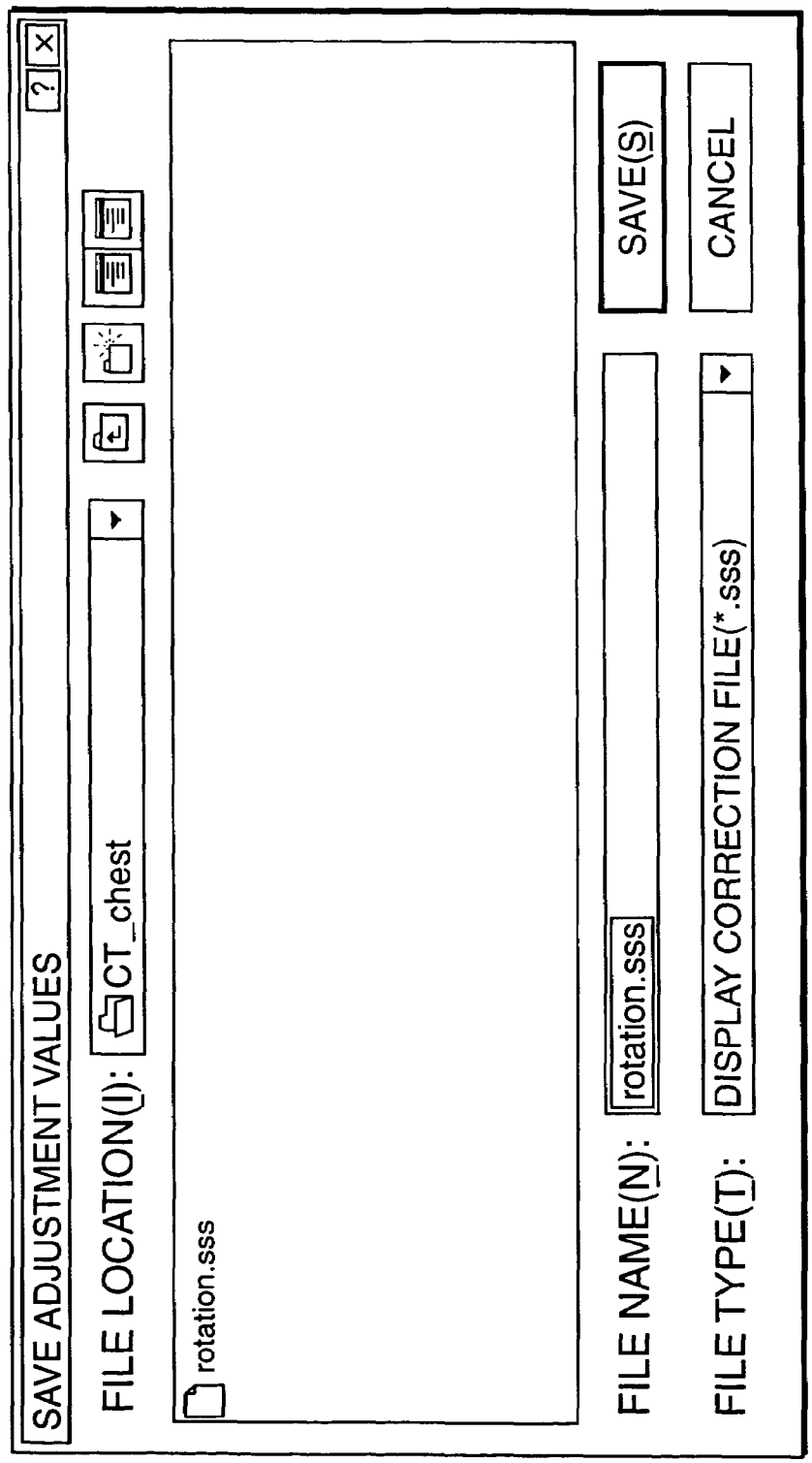
FIG. 44 is a view showing a "load adjustment values" dialog box.

FIG. 44 is a view showing the "load adjustment values" dialog box. In FIG. 44, the user selects "saving location" and inputs the name of a display adjustment file into the "file name" edit box, and then presses the "save" button. As a result, the "load adjustment values" dialog box is closed, and the above correction values are saved into the designated display adjustment file.

Correction values set by the user are inputted into the display control module 303, and are then sent to the stereo image data processing module 306 via the data processing module 302. When the display adjustment file processing module 305 is to carry out saving to a display adjustment file, the correction values are sent from the stereo image data processing module 306 to the display adjustment file processing module 305 via the data processing module 302.

Figure 14:
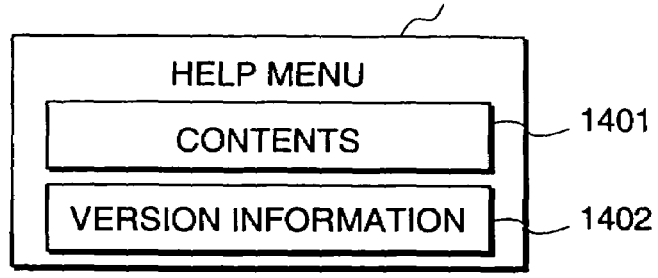
FIG. 14 is a view showing a help menu.
Figure 45:
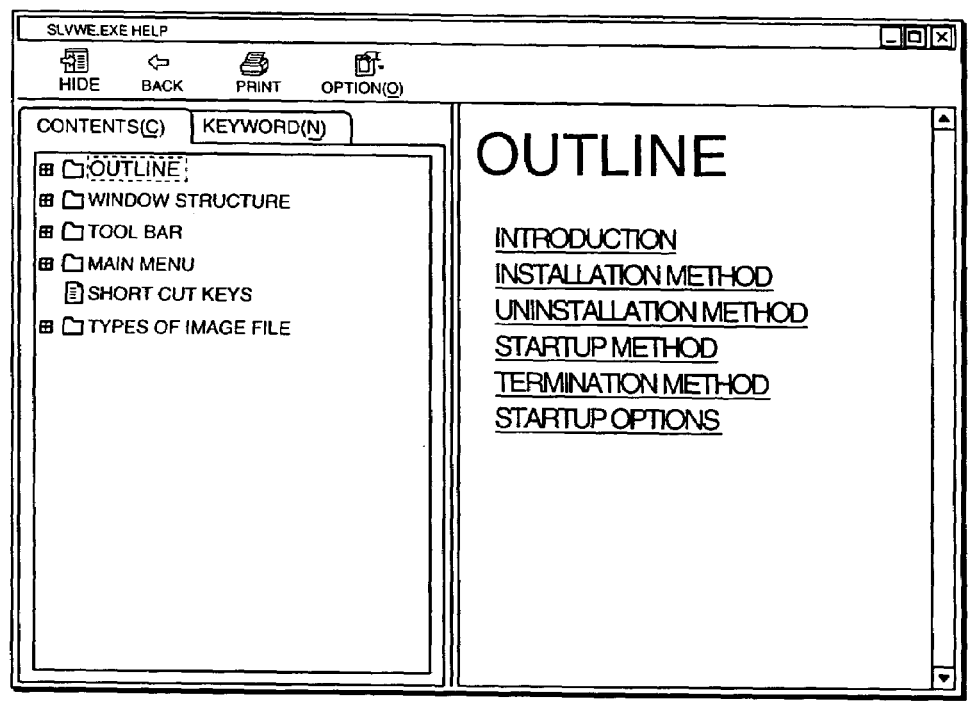
FIG. 45 is a view showing a help window.

FIG. 14 is a view showing the help menu 1004. The help menu 1004 has the following menu items. A "contents" menu item 1401 is selected to display a help window. The "contents" menu item 1401 is push style, and is always selectable (valid). If the "contents" menu item 1401 is selected, then the help window shown in FIG. 45 is displayed. The user can then use the mouse 104 to click through items displayed on the "contents" tab in order to find a desired help screen (for details, refer to Windows manual). FIG. 45 is a view showing the help window.

Moreover, in the help window, if the user clicks upon the "keyword" tab, then an edit box (not shown) appears. By inputting a suitable keyword into the edit box and then pressing a "display" button (not shown), a desired help screen can be found.

A "version information" menu item 1402 is selected to display information on the version of the stereo image display program. The "version information" menu item 1402 is push style, and is always selectable (valid). If the "version information" menu item 1402 is selected, then a "version information" dialog box is displayed.

Figure 46:
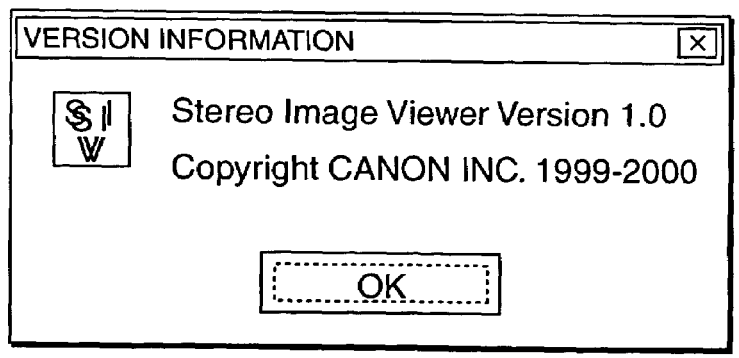
FIG. 46 is a view showing a "version information" dialog box.

FIG. 46 is a view showing the "version information" dialog box. The product name of the stereo image display program, a copyright message and the like are displayed in the "version information" dialog box.

Figure 47:
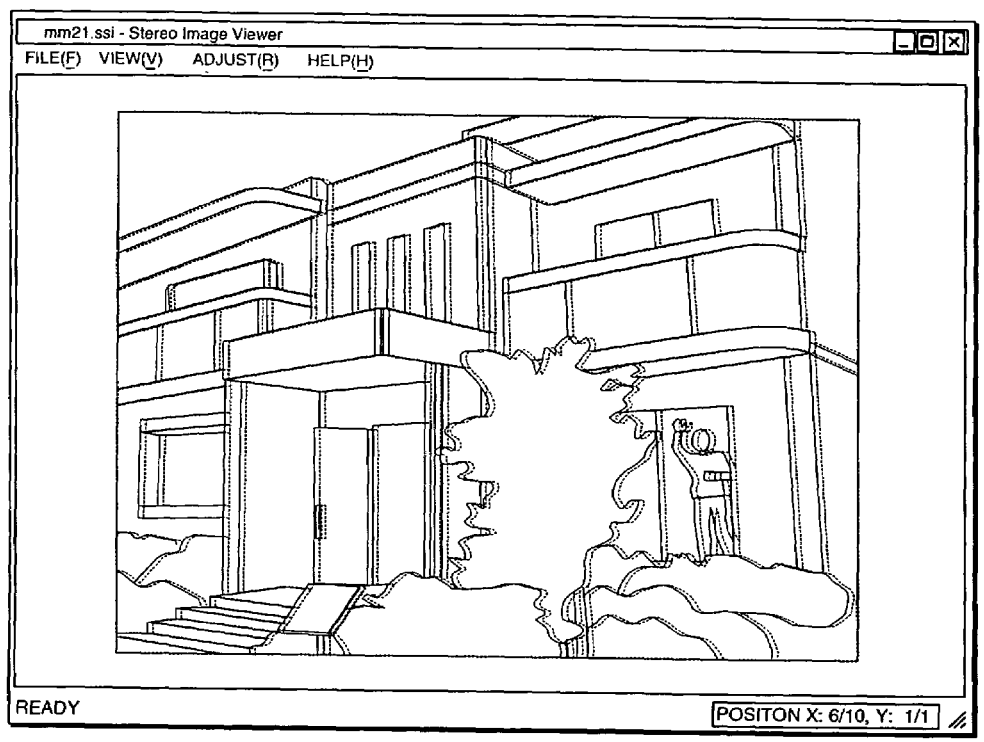
FIG. 47 is a view showing a display state of a stereo image when the stereo image display size is smaller than the main window size.
Figure 48:
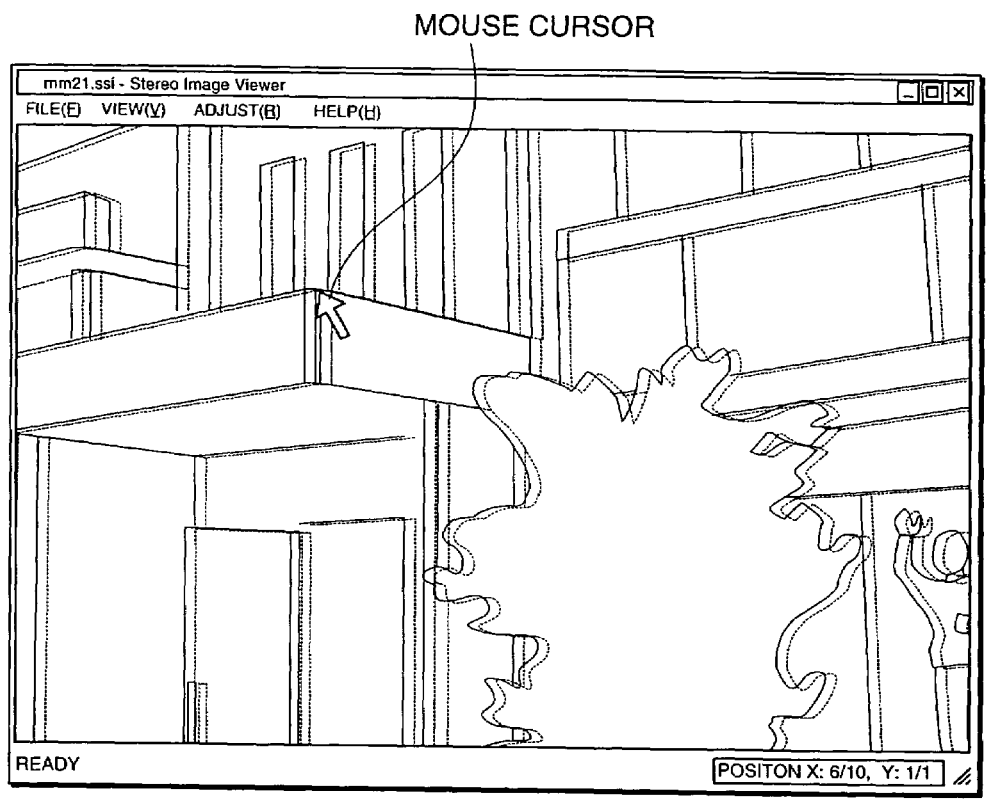
FIG. 48 is a view showing a display state of a stereo image when the stereo image display size is larger than the main window size.
Figure 49:
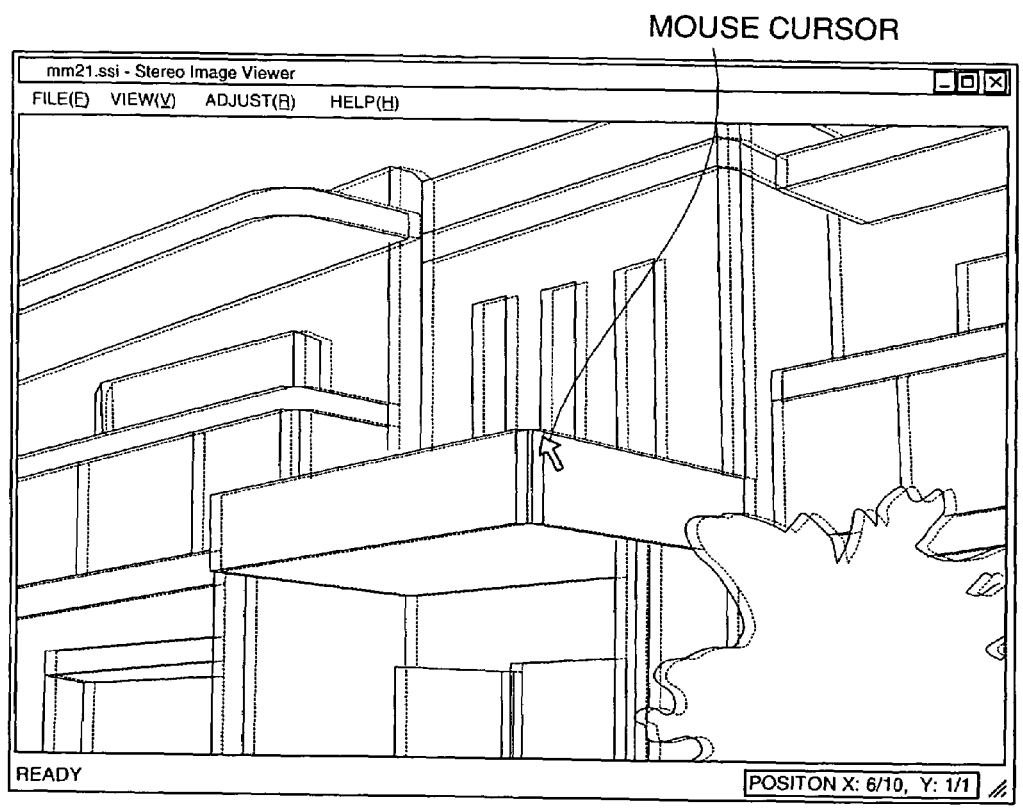
FIG. 49 is a view showing a display state of a stereo image when the stereo image display size is larger than the main window size.

FIGS. 47, 48 and 49 are views showing the method of displaying a stereo image in the main window according to the stereo image display program. In FIGS. 47, 48 and 49, none of the tool bars are displayed. Moreover, in the following description, XY coordinates are used, with the top left corner of the desktop window (the whole of the display screen) being taken as the origin, the positive X axis being taken as being in a rightwards direction, and the positive Y axis being taken as being in a downwards direction. The X- and Y-coordinates of the top left corner of the main window are referred to as $Xm$ and $Ym$ respectively, and the X- and Y-coordinates of the top left corner of the stereo image displayed in the main window are referred to as $Xs$ and $Ys$ respectively. The width and height of the main window are referred to as $Wm$ and $Hm$ respectively, and the width and height of the stereo image are referred to as $Ws$ and $Hs$ respectively.

Moreover, in the following description, it is assumed that the glasses-free type display 102 is designed such that the left eye image is displayed on the even lines and the right eye image on the odd lines. It is assumed that the stereo image data processing module 306 shown in FIG. 3 creates a stereo image by inserting the left eye image onto the even lines and the right eye image onto the odd lines.

FIG. 47 is a view showing a display state of the stereo image when the stereo image display size is smaller than the main window size. When the stereo image display size is smaller than the main window size, the stereo image is positioned in the center of the main window. The stereo image display program calculates the X-coordinate of the top left corner of the stereo image in accordance with equation (4), and the Y-coordinate in accordance with equations (5) and (6).

$$Xs=(Wm-Ws)/2+Xm \quad (4)$$

$$Ys'=(Hm-Hs)/2+Ym \quad (5)$$

$$Ys=Ys'+(Ys'\%2) \quad (6)$$

In equation (6), ($Ys'\%2$) represents the remainder when $Ys'$ is divided by 2 using integer arithmetic, and thus takes a value of either 0 or 1. By carrying out this calculation, even lines of the stereo image are always displayed on even lines of the desktop window, and hence the stereo image will never appear reversed (i.e. the left and right eye images will never be displayed to the right and left eyes respectively) even if the display position of the main window is moved up or down.

FIGS. 48 and 49 are views showing display states of the stereo image when the stereo image display size is larger than the main window size. When the stereo image display size is larger than the main window size, in an initial state, the stereo image is positioned such that the center of the stereo image is in the center of the main window. The stereo image display program thus calculates the X-coordinate of the top left corner of the stereo-image in accordance with equation (4), and the Y-coordinate in accordance with equations (5) and (6). When the stereo image display size is larger than the main window size, $Ys'$ in equation (5) will however take a negative value, ($Ys'\%2$) in equation (6) will take a value of 0 or −1, and $Ys$ in equation (6) will take a negative value.

In FIG. 48, if the mouse cursor is moved to any chosen position on the stereo image and then the left button of the mouse 104 is clicked at that position, then, as shown in FIG. 49, the display position of the stereo image is changed such that the clicked position moves to the center of the main window. At the same time, the position of the mouse cursor is also moved in accordance with the movement of the display position of the stereo image. The stereo image display program recalculates the display position of the stereo image and the position of the mouse cursor using the following procedure.

Let the X- and Y-coordinates of the mouse cursor when the left button of the mouse 104 is clicked be represented by $Xc$ and $Yc$ respectively, and the amount of movement of the display position of the stereo image in the X and Y directions be represented by $\delta x$ and $\delta y$ respectively. Provisional values $\delta x'$ and $\delta y'$ of $\delta x$ and $\delta y$ can be calculated from equations (7) and (8) respectively.

$$\delta x'=Wm/2+Xm-Xc \quad (7)$$

$$\delta y'=Hm/2+Ym-Yc \quad (8)$$

Moreover, letting the X- and Y-coordinates of the display position (the top left corner) of the stereo image after the movement be represented by $Xns$ and $Yns$ respectively, provisional values Xns' and Yns' of Xns and Yns can be calculated from equations (9) and (10) respectively.

$$Xns' = Xs + \delta x' \quad (9)$$

$$Yns' = Ys + \delta y' \quad (10)$$

If Xns' is greater than Xm, then Xns' is recalculated using equation (11), and if Xns' is smaller than Xm+Wm−Ws, then Xns' is recalculated using equation (12). Moreover, if Yns' is greater than Ym, then Yns' is recalculated using equation (13), and if Yns' is smaller than Ym+Hm−Hs, then Yns' is recalculated using equation (14).

$$Xns' = Xm \quad (11)$$

$$Xns' = Xm + W - Ws \quad (12)$$

$$Yns' = Ym \quad (13)$$

$$Yns' = Ym + Hm - Hs \quad (14)$$

Through these calculations, even though the stereo image display size is greater than the main window size, the situation in which the amount of movement of the stereo image is too large and hence part of the main window becomes blank (i.e. only the background color is displayed) can be avoided.

After the above calculations have been carried out, the display position of the stereo image after the movement can be determined from equations (15) and (16).

$$Xns = Xns' \quad (15)$$

$$Yns = Yns' + (Yns'\%2) \quad (16)$$

The movement amount of the display position of the stereo image can then be calculated from equations (17) and (18).

$$\delta x = Xns - Xs \quad (17)$$

$$\delta y = Yns - Ys \quad (18)$$

Letting the X- and Y-coordinates of the mouse cursor after the movement be represented by Xnc and Ync respectively, Xnc and Ync can be calculated from equations (19) and (20) respectively.

$$Xnc = Xc + \delta x \quad (19)$$

$$Ync = Yc + \delta y \quad (20)$$

By using the above equations, the position clicked upon on the stereo image can be moved to the center of the main window, and the position of the mouse cursor can be moved in accordance with the movement of the display position of the stereo image. The user will usually be looking at the mouse cursor when clicking the left button of the mouse 104, and hence because the mouse cursor moves in accordance with the movement of the display position of the stereo image, the movement of the display position of the stereo image can be sensed directly.

In the above description relating to FIGS. 47 to 49, to ease understanding the calculations for the X-coordinate and the calculations for the Y-coordinate were shown side by side. However, the calculations for the X-coordinate and the calculations for the Y-coordinate are completely independent of one another, and hence other cases such as a case in which the width of the stereo image is less than the width of the main window but the height of the stereo image is greater than the height of the main window, or vice versa, can also be handled by combining the above description for the X-coordinate and the above description for the Y-coordinate suitably.

As described above, according to the first embodiment of the present invention, in a stereo image display apparatus allowing proper viewing from a suitable viewing position of a stereo image in which are composited a left eye image and a right eye image on a glasses-free type display 102, the CPU 201 of the PC 101 that constitutes the stereo image display apparatus carries out control in accordance with a stereo image display program such that a suitable viewing position verification image that appears different when the glasses-free type display 102 is viewed from the suitable viewing position to when the glasses-free type display 102 is viewed from elsewhere is displayed on the glasses-free type display 102 in accordance with a user's instructions. As a result, the following effect is produced.

By displaying the suitable viewing position verification image (an LR pattern) in the main window of the glasses-free type display 102 in accordance with the user's operations, the user can verify the suitable viewing position whenever so desired, regardless of the type of the 3-D display.

It should be noted that the present invention may either be applied to a system composed of a plurality of apparatuses (for example, in a distributed type computer environment, a host computer, data communication apparatuses, data input/output terminals, displays etc.) or to a single apparatus (for example, a note PC in which a keyboard, a pointing device and a display etc. are all integrated together).

Moreover, it goes without saying that the objects of the present invention can also be achieved by supplying a system or apparatus with a storage medium or the like storing program code of a software program that realizes the functions of the embodiment described above, and then causing a computer (or CPU, MPU or the like) of the system or apparatus to read and execute the program code stored on the storage medium or the like.

In this case, the program code itself read from the storage medium or the like realizes the functions of the embodiment described above, and hence the storage medium or the like on which the program code is stored constitutes the present invention. Examples of the storage medium for supplying the program code include a floppy disk, a hard disk, a PC card, an optical disk, a magnetic-optical disk, a CD-ROM, a CD-R, a CD-RW, a DVD-ROM, a DVD-R, a DVD-RW, a magnetic tape, a nonvolatile memory card, and a ROM. Alternatively, the program code may be downloaded from a network.

Moreover, it also goes without saying that the functions of the embodiment described above may be realized not necessarily by causing the computer to read and execute the program code, but alternatively by causing an operating system (OS) running on the computer to perform part or all of the actual processing based on instructions in the program code.

Furthermore, it also goes without saying that the functions of the embodiment described above may be realized by writing the program code read from the storage medium or the like into a memory provided on a function expansion board inserted into the computer or in a function expansion unit connected to the computer, and then causing a CPU or the like provided on the function expansion board or in the function expansion unit to perform part or all of the actual processing based on instructions in the program code.

Figure 51:
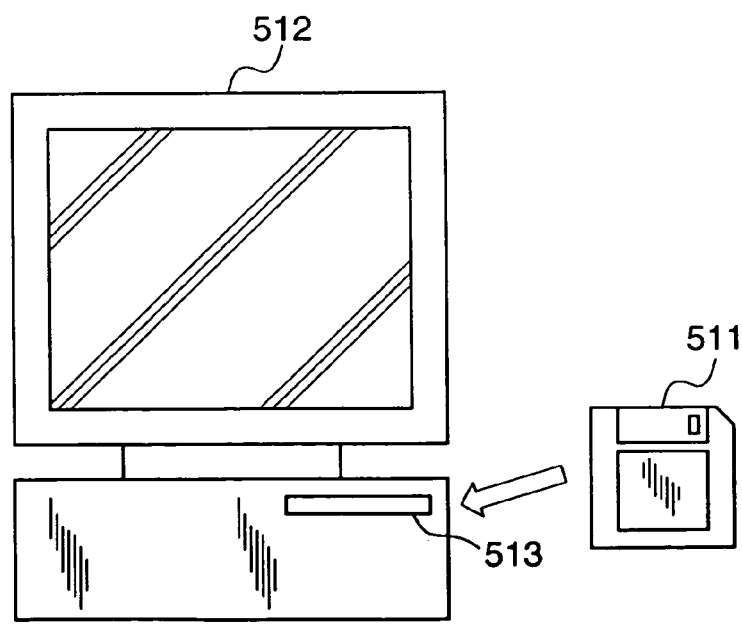
FIG. 51 is a view showing an example of supplying a program that implements the stereo image display method according to the present invention using the stereo image display apparatus according to the first embodiment and related data from a storage medium to an apparatus.

FIG. 51 is a view showing an example of supplying the program that implements the stereo image display method according to the first embodiment of the present invention and related data from a storage medium to an apparatus. The program that implements the stereo image display method according to the present invention and the related data are supplied by first inserting a storage medium 511 such as a floppy disk or a CD-ROM into a storage medium drive insertion port 513 of an apparatus 512 such as a computer. The program that implements the stereo image display method according to the present invention and the related data are then first installed from the storage medium 511 into a hard disk and then loaded from the hard disk into a RAM, or are loaded directly into the RAM without installing into the hard disk. The program and the related data can then be executed.

When the program that implements the stereo image display method according to the present invention is executed in the stereo image display apparatus according to the embodiment of the present invention described above, the program and the related data are either stored in the stereo image display apparatus in advance, or else are supplied to the stereo image display apparatus following, for example, the procedure described above with reference to FIG. 51. As a result, the program becomes executable.

Figure 50:
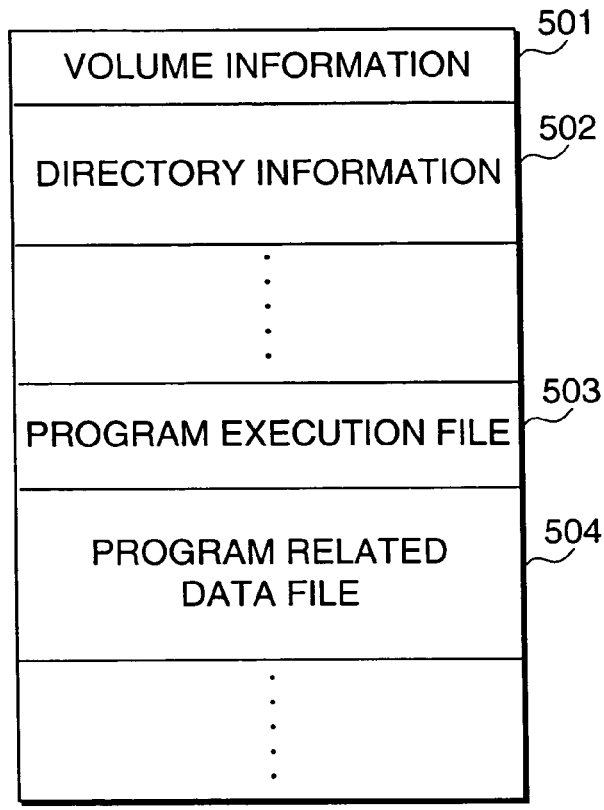
FIG. 50 is a diagram showing an example of the constitution of the storage contents of a storage medium storing a program that implements a stereo image display method according to the present invention using the stereo image display apparatus according to the first embodiment and related data.

FIG. 50 is a diagram showing an example of the constitution of the storage contents of a storage medium storing the program that implements the stereo image display method according to the first embodiment and related data. The storage contents are composed, for example, of volume information 501, directory information 502, a program execution file 503, a program related data file 504, and the like. The program code of the program that implements the stereo image display method according to the present invention is written in accordance with the control procedure described above.

As described above, according to the first embodiment of the present invention, in a stereo image display apparatus allowing proper viewing from a suitable viewing position of a stereo image in which are composited a left eye image and a right eye image on a display, control is carried out such that a suitable viewing position verification image that appears different when the display is viewed from the suitable viewing position to when the display is viewed from elsewhere is displayed on the display in accordance with external input, i.e. a user's operations. As a result, an effect is produced that the user can verify the suitable viewing position whenever so desired, regardless of the type of the 3-D display.

Second Embodiment

A description will now be given of a second embodiment of the present invention.

Because a glasses-free type 3-D display simultaneously displays a left eye image and a right eye image on the same screen, the spatial resolution per eye is half of that for a 2-D display, and hence it may be extremely difficult to see any small characters or detailed patterns that are displayed. In the present embodiment, this problem is resolved.

A description will first be given of background art. 3-D data is handled in fields such as CG (computer graphics), medical image processing such as CT image processing and MRI image processing, molecular modeling, 3-D CAD, and scientific visualization. A 3-D image display apparatus can be used to display such 3-D data. Currently available 3-D image display apparatuses use the principle of stereo vision, displaying respectively into the left eye and right eye of a user a left eye image and a right eye image that differ from one another only in a way corresponding to binocular parallax. The user perceives parallax from the differences between the left eye image and the right eye image, and thus sees an image that appears 3-dimensional in accordance with the amount of parallax. That is, how far away objects appear depends on the amount of parallax.

FIG. 69 is a view showing the principle of stereo vision. In FIG. 69, objects 5301 and 5302 are each in the field of view of both the left eye 5304 and the right eye 5305 of a user. If it is assumed that a transparent screen 5303 is placed in front of the user, then projecting the image seen by the user's left eye onto the screen 5303 gives a projected image 5306. Similarly, projecting the image seen by the user's right eye onto the screen 5303 gives a projected image 5307. Now assume that only a 3-D image display apparatus is placed in front of the user. If the image 5306 is displayed to the user's left eye and the image 5307 is displayed to the user's right eye, then it will appear to the user that the objects 5301 and 5302 exist and have depth.

Combining two such images 5306 and 5307 results in what is called a stereo image, and such stereo images can be obtained through photography or CG. In the case of photography, images are taken from a left eye position and a right eye position either simultaneously or at different times. In the case of CG, 3-D data that represents the shapes, reflectivities and the like of objects, a left eye position, a right eye position, the position of a virtual screen onto which the objects are projected, light source attribute data and the like are used, and projected images on the virtual screen for the left and right eyes are obtained through calculations.

Various 3-D image display apparatuses that use the principle of stereo vision as described above have been proposed. For example, there is a polarized spectacles type 3-D image display apparatus (3-D display) in which left and right images are displayed using polarized light having one plane of polarization for the left image and polarized light having a plane of polarization orthogonal thereto for the right image, and the user wears polarized spectacles such that the left and right images are separated and enter the left and right eyes respectively. There is also a liquid crystal shutter spectacles type 3-D display in which a left eye image and a right eye image are displayed alternately with a short period of about 1/60 s, and the user wears liquid crystal shutter spectacles in which the left and right lenses are alternately made transparent with the same period, resulting in the left and right images being displayed alternately to the left and right eyes respectively. The polarized spectacles method and the liquid crystal shutter spectacles method can also be realized with a setup that uses a liquid crystal projector and screen, with this being referred to as a 3-D screen.

Moreover, there is also a parallax barrier type 3-D display in which a regular slit pattern having a repeat unit length of 1 pixel is stuck onto a display, and the user looks at the display from a specific distance and a specific direction, resulting in left and right images being separated and entering the left and right eyes respectively. There is also a lenticular lens type 3-D display in which lenticular lenses having a regular pattern with a repeat unit length of 1 pixel are stuck onto a display, and the user looks at the display from a specific distance and a specific direction, resulting in left and right images being separated and entering the left and right eyes respectively. With the parallax barrier type and lenticular lens type 3-D displays, there is no need for the user to wear spectacles, and hence these types of display are collectively referred to as glasses-free type 3-D displays.

Moreover, there is also a HMD (head mounted displays) that has two display screens in a spectacles-like arrangement, and in which a left eye image is displayed on the left display screen and a right eye image is displayed on the right display screen.

The polarized spectacles type or liquid crystal shutter spectacles type 3-D display or 3-D screen is suitable for use in a demonstration or presentation to a large number of people, since a large number of people can view a 3-D image simultaneously. The HMD is suitable for use in a situation in which it is envisaged that the user will move around, since an installation site is not needed and the user can turn his/her head at will. The glasses-free type 3-D display does not require the use of spectacles, and hence can be used with about 1 or 2 users in a variety of applications as is the case with a 2-D image display apparatus (2-D display). However, there has been a problem that, because the glasses-free type 3-D display simultaneously displays a left eye image and a right eye image on a single screen, the spatial resolution per eye is half of that for the 2-D display, and hence it may be extremely difficult to see any small characters or detailed patterns that are displayed on the glasses-free type 3-D display.

Specifically, in the case of a general purpose 3-D image display apparatus composed of a computer and a 3-D display, not only 3-D images but also user interfaces such as menus and operation buttons for controlling the display method are displayed on the display screen. These user interfaces are displayed using functions provided by an OS (operating system) running on the computer. However, the characters in the menus displayed by the OS are displayed at a size such as to be easily viewable when displayed on a 2-D display, and thus may be extremely difficult to see when displayed on a 3-D display having half the spatial resolution of a 2-D display.

To resolve this problem, the present embodiment provides an image display apparatus and image display method in which only user interfaces are displayed on a 2-D image display unit, and only 3-D images are displayed on a 3-D image display unit, thus allowing easily viewable user interfaces and 3-D images to be displayed simultaneously, and a storage medium storing a program for implementing the image display method. The image display apparatus is comprised of a 2-D image display unit, a 3-D image display unit, and display control means for displaying user interfaces on the 2-D image display unit and 3-D images on the 3-D image display unit.

Figure 52:
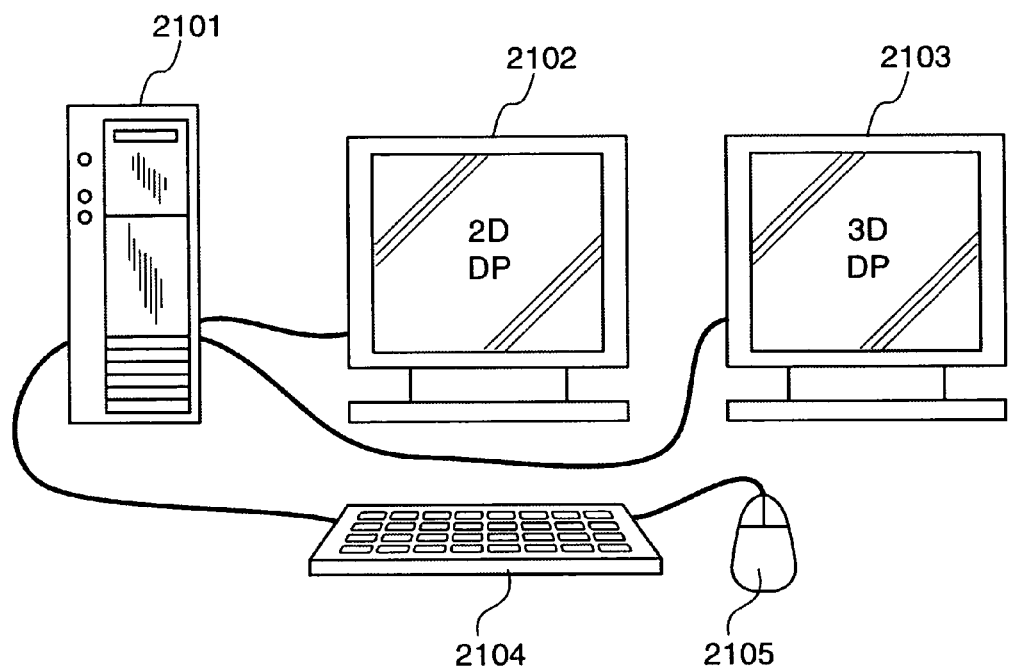
FIG. 52 is an external view showing the constitution of an image display apparatus according to second to fourth embodiments of the present invention.

FIG. 52 is an external view showing the constitution of the image display apparatus according to the second embodiment. The image display apparatus according to the second embodiment is comprised of a personal computer (PC) 2101, a 2-D display (2DDP) 2102 (2-D image display unit), a glasses-free type 3-D display (3DDP) 2103 (3-D image display unit), a keyboard (KB) 2104, and a mouse (MS) 2105.

The personal computer (PC) 2101, which is capable of executing 3-D image display software (a 3-D image display program) according to the present invention, is connected to the 2-D display 2102, the glasses-free type 3-D display 2103, the keyboard (KB) 2104 and the mouse (MS) 2105. A conventional parallax barrier type 3-D display or lenticular type 3-D display as referred to before as prior art may be used as the glasses-free type 3-D display 2103.

Figure 53:
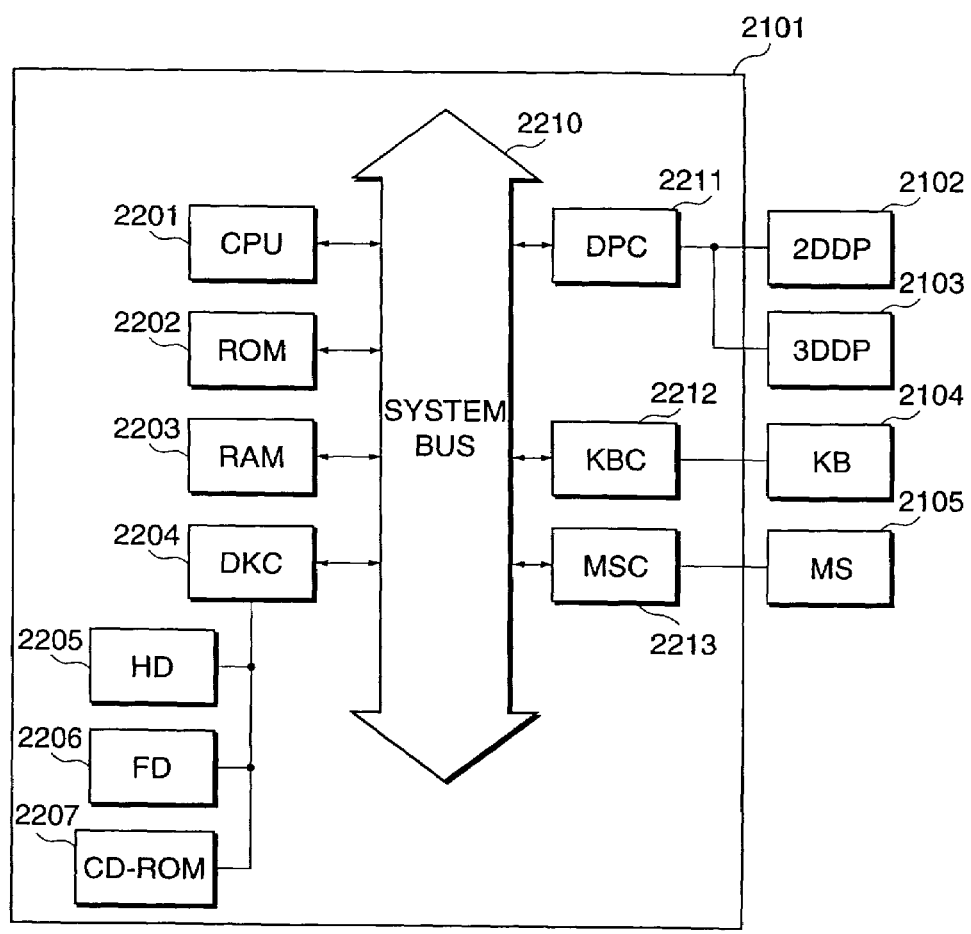
FIG. 53 is a block diagram showing the constitution of a personal computer capable of executing a 3-D image display program according to the second to fourth embodiments.

FIG. 53 is a block diagram showing the constitution of the personal computer 2101 capable of executing the 3-D image display program (display control means) within the image display apparatus according to the second embodiment. The PC 2101 has a CPU 2201 (display control means), a ROM 2202, a RAM 2203, a disk controller (DKC) 2204, a hard disk (HD) 2205, a floppy disk controller (FD) 2206, a CD-ROM drive (CD-ROM) 2207, a system bus 2210, a display controller (DPC) 2211, a keyboard controller (KBC) 2212, and a mouse controller (MSC) 2213.

The CPU 2201 executes a 3-D image display program stored in the ROM 2202 or the hard disk (HD) 2205, or a 3-D image display program supplied from the floppy disk controller (FD) 2206 or the CD-ROM drive (CD-ROM) 2207. The CPU 2201 also carries out overall control of the various devices connected to the system bus 2210. The ROM 2202 may store the 3-D image display program and the like. The RAM 2203 functions as a main memory, a work area or the like of the CPU 2201.

The disk controller (DKC) 2204 controls access to the hard disk (HD) 2205, which stores a boot program, an OS (operating system), various applications, edited files, user files, possibly the 3-D image display program, and the like, the floppy disk controller (FD) 2206, and the CD-ROM drive (CD-ROM) 2207. The display controller (DPC) 2211 controls the displays on the 2-D display 2102 and the glasses-free type 3-D display 2103. The keyboard controller (KBC) 2212 controls command input from the keyboard (KB) 2104. The mouse controller (MSC) 2213 controls command input from a pointing device such as the mouse (MS) 2105.

In the present embodiment, the image display apparatus is realized using a PC having the same constitution in terms of hardware as an ordinary PC; the image display apparatus is characterized by software control described below. Moreover, the image display apparatus can be realized using another computer having a similar constitution to the PC capable of realizing the image display apparatus shown in FIG. 52.

In the present embodiment, the 3-D image display program is stored in the hard disk (HD) 2205. Running of the hardware is carried out mainly by the CPU 2201, while software control is carried out mainly by the 3-D image display program stored in the hard disk (HD) 2205.

It should also be noted that the 3-D image display program may be stored on a storage medium such as a floppy disk or a CD-ROM and then supplied therefrom. In this case, the program is read from the storage medium using, for example, the floppy disk controller (FD) 2206 or the CD-ROM drive (CD-ROM) 2207 shown in FIG. 53, and is installed into the hard disk (HD) 2205.

Figure 54:
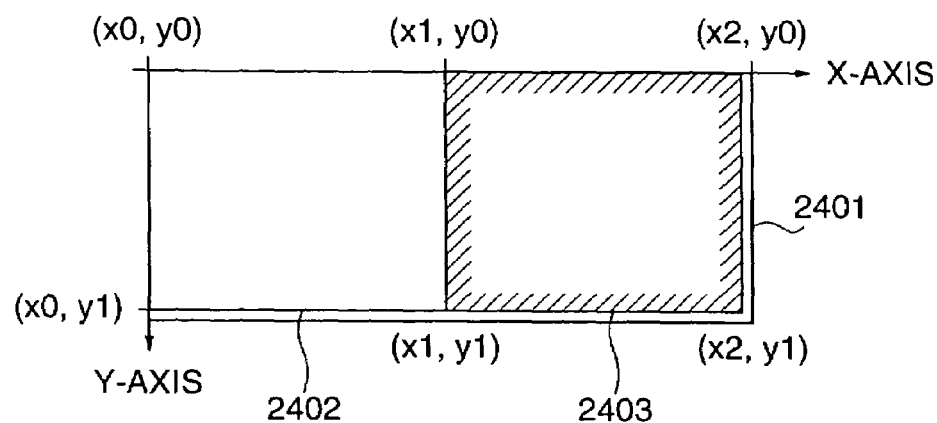
FIG. 54 is a diagram showing the correspondence between a virtual screen managed by an OS and screens displayed on displays, according to the second to fourth embodiments.

FIG. 54 is a diagram showing the correspondence between a virtual screen managed by the OS and screens displayed on the displays, according to the second embodiment. A virtual screen 2401 managed by the OS has a range including a screen 2402 displayed on the 2-D display 2102 and a screen 2403 displayed on the glasses-free type 3-D display 2103. In FIG. 54, the screen 2402 occupies a region of the virtual screen 2401 from coordinates (x0,y0) to coordinates (x1,y1), and the screen 2403 occupies a region of the virtual screen 2401 from coordinates (x1,y0) to coordinates (x2,y1). It should be noted that the screen 2402 and the screen 2403 do not necessarily have to be arranged as shown in FIG. 54; other arrangements are possible in accordance with the OS specifications.

Operating systems capable of screen control as shown in FIG. 54 include Windows 98 and Windows 2000 made by Microsoft. However, the 3-D image display program is not limited to being run on a particular OS. Any OS capable of outputting different screens to two displays may be used.

The OS displays images drawn in the screen 2402 region on the 2-D display 2102 and images drawn in the screen 2403 region on the glasses-free type 3-D display 2103, this being done via the display controller (DPC) 2211. By calling up OS functions, the 3-D image display program can obtain the coordinates indicating the screen 2402 region and the coordinates indicating the screen 2403 region.

The 3-D image display program can thus achieve the objects of the present invention by drawing user interfaces in the region between the coordinates (x0,y0) and the coordinates (x1,y1) obtained from the OS, and drawing 3-D images in the region between the coordinates (x1,y0) and the coordinates (x2,y1) obtained from the OS.

Figure 55:
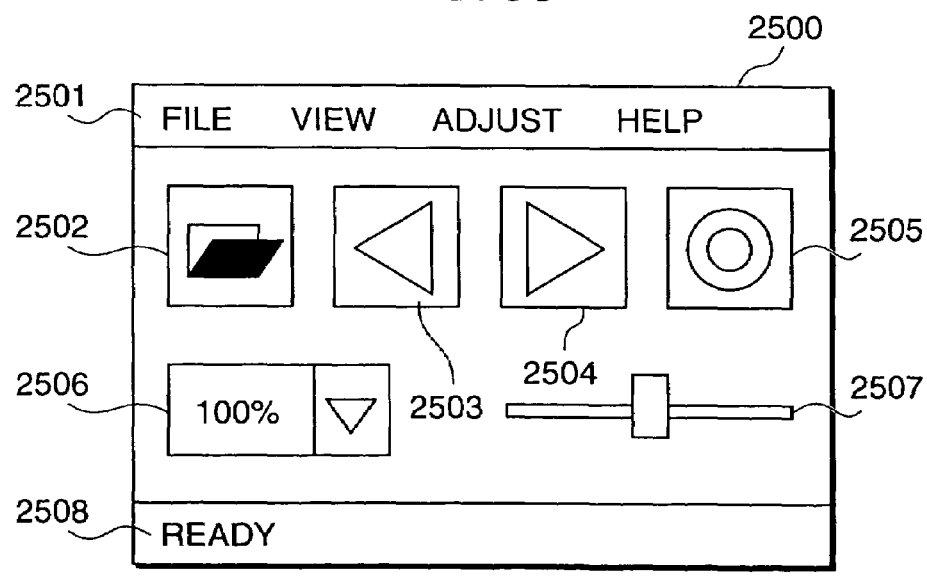
FIG. 55 is a view showing user interfaces drawn by the 3-D image display program according to the second embodiment.

FIG. 55 is a view showing user interfaces drawn by the 3-D image display program according to the present embodiment. Here, the user interfaces shown in FIG. 55 will be described using terms used with Microsoft Windows 98. An application window 2500 contains a menu bar 2501, operation buttons 2502 to 2505, a combo box 2506, a slide bar 2507, and a status bar 2508. It should be noted, however, that these user interfaces are only examples used to show how the application window 2500 might look, and detailed description is omitted here. Any types of user interface can be adopted in the present invention, with the types not being limited to those shown in FIG. 55.

Figure 56:
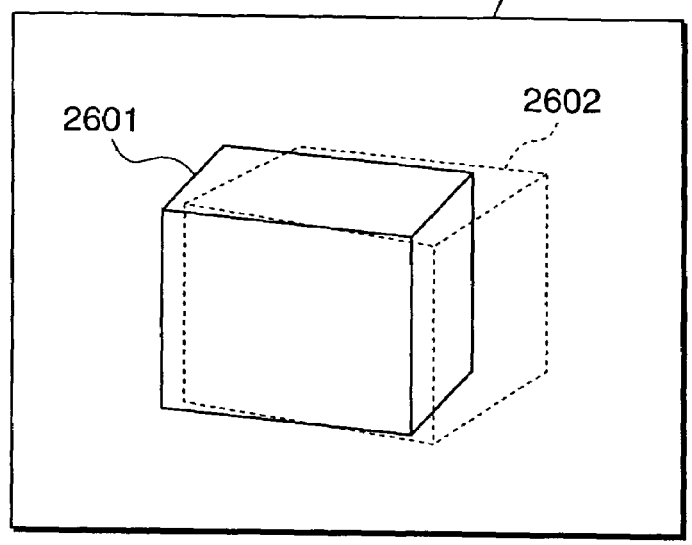
FIG. 56 is a view showing a 3-D image drawn by the 3-D image display program according to the second embodiment.

FIG. 56 is a view showing a 3-D image drawn by the 3-D image display program according to the present embodiment. A left eye image 2601 and a right eye image 2602 are drawn in a 3-D image drawing window 2600. Here, it is assumed that the glasses-free type 3-D display 2103 shown in FIG. 52 is designed such that a left eye image is displayed on even lines thereof and a right eye image on odd lines thereof. In this case, the 3-D image display program draws the left eye image 2601 on only even lines and the right eye image 2602 on only odd lines. As a result, a 3-D image can be displayed on the glasses-free type 3-D display 2103.

As described above, according to the image display apparatus of the present embodiment, the CPU 2201 of the PC 2101 carries out display control in accordance with the 3-D image display program such that only user interfaces are displayed on the 2-D image display unit (the 2-D display 2102) and only 3-D images are displayed on the 3-D image display unit (the glasses-free type 3-D display 2103). As a result, the following effect is produced.

By displaying only user interfaces on the 2-D image display unit (2-D display 2102) and only 3-D images on the 3-D image display unit (glasses-free type 3-D display 2103), it is possible to simultaneously display easily viewable user interfaces and a 3-D image.

Third Embodiment

In recent years, informed consent has come to be viewed with importance in the medical field, and there has been an increase in the number of occasions that a doctor explains a medical condition to a patient while showing the patient medical images such as CT images or MRI images. By showing the patient 3-D medical images using a 3-D display, the patient can gain a direct understanding of the medical condition. A glasses-free type 3-D display that does not require the use of spectacles is suited to such a usage.

Moreover, when a doctor shows a patient a 3-D image using a 3-D image display apparatus, the doctor (user 1) must look at both display control means (user interfaces) for the 3-D image and the display control results (the 3-D image). The patient (user 2), on the other hand, need look only at the display control results (the 3-D image), and need not look at the display control means (the user interfaces). However, if the user interfaces and the 3-D image are displayed on the same screen, then both the user 1 and the user 2 always have to look at the same screen, and hence there is a drawback that the user interfaces are also displayed to the user 2, who does not need to look at the user interfaces. Alternatively, if the user interfaces are not displayed for the sake of the user 2, then the user 1 can no longer see the user interfaces, and hence visual control means is lost.

In the second embodiment of the present invention described above, an image display apparatus and image display method in which the user interfaces are displayed on a 2-D image display unit and the 3-D image is displayed on a 3-D image display unit were thus proposed, along with a storage medium storing a program for implementing the image display method. According to this proposal, the user 2 is able to look at only the 3-D image. However, to see both the user interfaces and the 3-D image, the user 1 must look at both the 2-D image display unit and the 3-D image display unit. As a result, if the 2-D image display unit and the 3-D image display unit are placed far apart or facing in different directions, it may be difficult for the user 1 to see the user interfaces and the 3-D image simultaneously.

To improve this situation, the third embodiment provides an image display apparatus capable of displaying display control means (user interfaces) for a 3-D image and display control results (a 2-D image corresponding to the 3-D image) to one user, and displaying only display control results (the 3-D image) to another user.

As in the second embodiment described above, the image display apparatus according to the present embodiment is comprised of a personal computer (PC) 2101, a 2-D display (2DDP) 2102, a glasses-free type 3-D display (3DDP) 2103, a keyboard (KB) 2104, and a mouse (MS) 2105 (see FIG. 52). The constitutions of these parts were described in detail with respect to the second embodiment, and hence description is omitted here.

As in the second embodiment, the PC 2101, which is capable of executing a 3-D image display program (display control means, display control linking means) within the image display apparatus according to the third embodiment, has a CPU 2201 (display control means, display control linking means), a ROM 2202, a RAM 2203, a disk controller (DKC) 2204, a hard disk (HD) 2205, a floppy disk controller (FD) 2206, a CD-ROM drive (CD-ROM) 2207, a system bus 2210, a display controller (DPC) 2211, a keyboard controller (KBC) 2212, and a mouse controller (MSC) 2213 (see FIG. 53). The constitutions of these parts were described in detail with respect to the second embodiment, and hence description is omitted here.

Moreover, regarding the correspondence between a virtual screen managed by the OS and screens displayed on the displays in the third embodiment, as in the second embodiment, the virtual screen 2401 managed by the OS has a range including a screen 2402 displayed on the 2-D display 2102 and a screen 2403 displayed on the glasses-free type 3-D display 2103 (see FIG. 54). In FIG. 54, the screen 2402 occupies a region of the virtual screen 2401 from coordinates (x0,y0) to coordinates (x1,y1), and the screen 2403 occupies a region of the virtual screen 2401 from coordinates (x1,y0) to coordinates (x2,y1). It should be noted that the screen 2402 and the screen 2403 do not necessarily have to be arranged as shown in FIG. 54; other arrangements are possible in accordance with the OS specifications.

Operating systems capable of screen control as shown in FIG. 54 include Windows 98 and Windows 2000 made by Microsoft. However, the 3-D image display program is not limited to being run on a particular OS. Any OS capable of outputting different screens to two displays may be used.

The OS displays images drawn in the screen 2402 region on the 2-D display 2102 and images drawn in the screen 2403 region on the glasses-free type 3-D display 2103, this being done via the display controller (DPC) 2211. By calling up OS functions, the 3-D image display program can obtain the coordinates indicating the screen 2402 region and the coordinates indicating the screen 2403 region.

The 3-D image display program can thus display the user interfaces on the 2-D display 2102 by drawing the user interfaces in the region between the coordinates (x0,y0) and the coordinates (x1,y1) obtained from the OS, and can display the 3-D image on the glasses-free type 3-D display 2103 by drawing the 3-D image in the region between the coordinates (x1,y0) and the coordinates (x2,y1) obtained from the OS.

Figure 57:
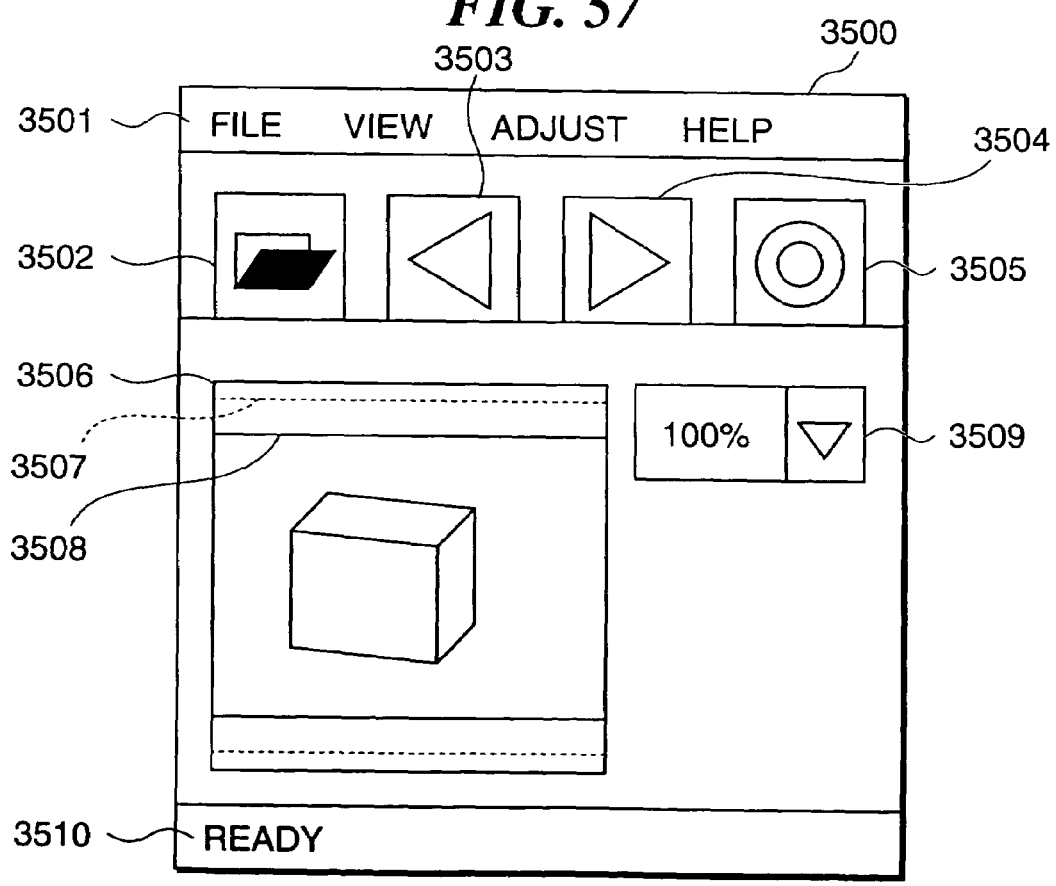
FIG. 57 is a view showing user interfaces displayed on a 2-D display by the 3-D image display program according to the third embodiment of the present invention.
Figure 58:
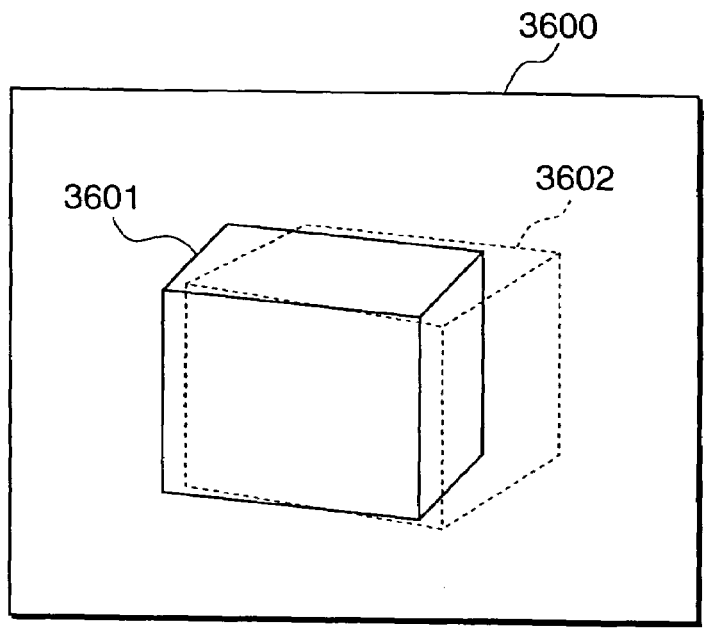
FIG. 58 is a view showing a 3-D image displayed on a glasses-free type 3-D display by the 3-D image display program according to the third embodiment.
Figure 59:
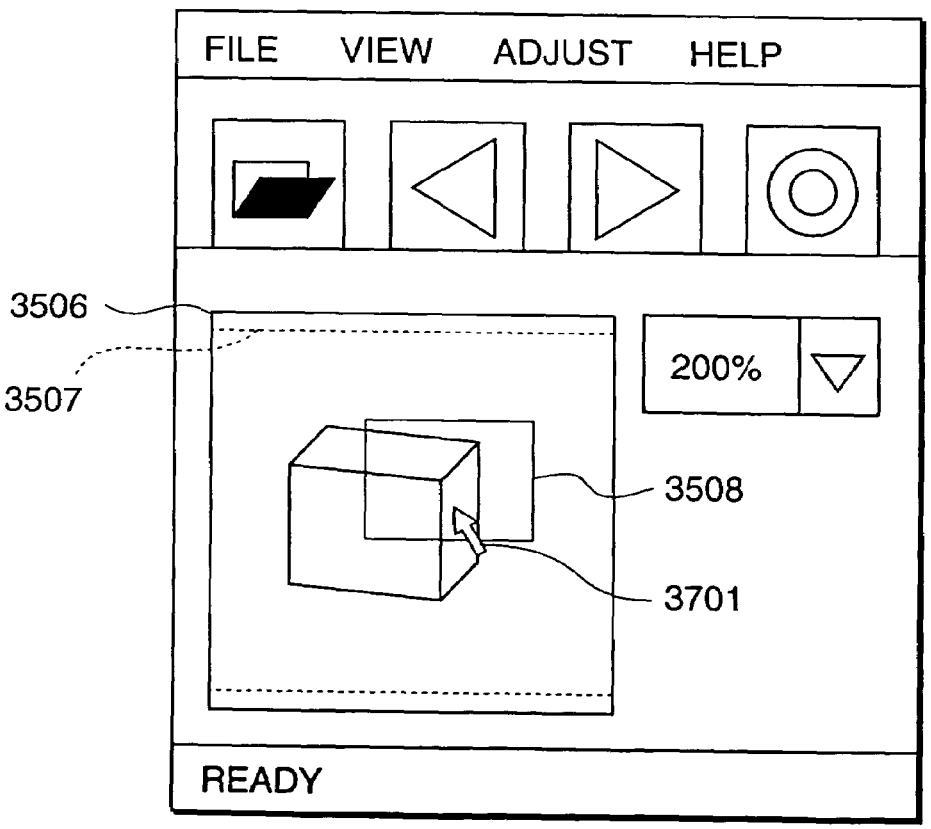
FIG. 59 is a view showing user interfaces displayed on the 2-D display by the 3-D image display program according to the third embodiment.
Figure 60:
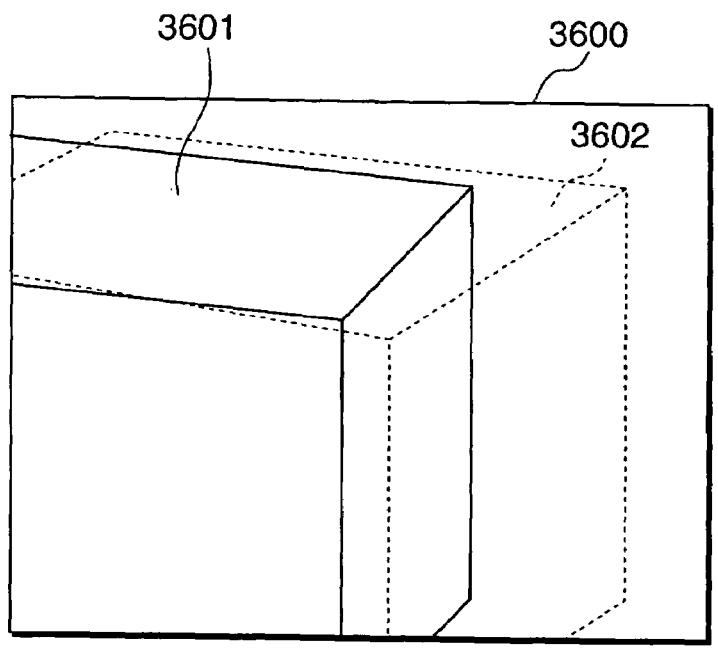
FIG. 60 is a view showing a 3-D image displayed on the glasses-free type 3-D display by the 3-D image display program according to the third embodiment.

FIGS. 57 and 59 are views showing user interfaces displayed on the 2-D display 2102 by the 3-D image display program according to the third embodiment. FIGS. 58 and 60 are views showing 3-D images displayed on the glasses-free type 3-D display 2103 by the 3-D image display program according to the third embodiment.

First, a description will be given of the user interfaces shown in FIG. 57 using terms used with Microsoft Windows 98. An application window 3500 contains a menu bar 3501, push buttons 3502 to 3505, a reduced image display window 3506, a magnification combo box 3509, and a status bar 3510. The only user interfaces directly related to the description of the present invention are the reduced image display window 3506 and the magnification combo box 3509, and hence detailed description of the other user interfaces is omitted. Moreover, it should be noted that the user interfaces used in the present invention are not limited to those shown in FIG. 57.

In the third embodiment, a left eye image and a right eye image that constitute a 3-D image, or a 3-D image series composed of a plurality of such pairs of a left eye image and a right eye image, can be read in using the menu bar 3501 or the push button 3502. The push buttons 3503 to 3505 are for switching the 3-D image displayed on the glasses-free type 3-D display 2103 after a 3-D image series has been read in (i.e. are for selecting a 3-D image from the 3-D image series).

A 2-D image 3507 corresponding to the 3-D image and a rectangular region 3508 indicating the display range of the 3-D image are drawn in the reduced image display window 3506. The 2-D image 3507 corresponding to the 3-D image is obtained by taking one of the left eye image and the right eye image that constitute the 3-D image and reducing to a certain size while keeping the aspect ratio fixed.

The rectangular region 3508 indicating the display range of the 3-D image indicates what region of the 3-D image is displayed on the glasses-free type 3-D display 2103. In the third embodiment, the rectangular region 3508 indicating the display range of the 3-D image is displayed by carrying out masking on part of the display contents of the reduced image display window 3506. Here, masking refers to any of various types of processing in which, for example, a discrete fixed pattern is drawn on an image by inverting the brightness or color of a specific part of the image, or adding an offset value to or subtracting an offset value from the brightness or color of the part of the image. Alternatively, the rectangular region 3508 indicating the display range of the 3-D image may be displayed simply by drawing a rectangular frame.

The magnification combo box 3509 is used to set and display the display magnification of the 3-D image displayed on the glasses-free type 3-D display 2103. If the mouse cursor is moved onto the magnification combo box 3509 and then the left button of the mouse 2105 is clicked, then a display magnification list is displayed. The user then selects a display magnification from the display magnification list, whereupon the display magnification of the 3-D image displayed on the glasses-free type 3-D display 2103 is changed accordingly, and at the same time the size and display position of the rectangular region 3508 indicating the display range of the 3-D image is changed. This will be explained in more detail later.

FIG. 58 is a view showing a 3-D image displayed on the glasses-free type 3-D display 2103 by the 3-D image display program according to the third embodiment. A left eye image 3601 and a right eye image 3602 are displayed in a 3-D image display window 3600. Here, it is assumed that the glasses-free type 3-D display 2103 is designed such that the left eye image is displayed on even lines thereof and the right eye image on odd lines thereof. In this case, the 3-D image display program draws the left eye image 3601 on only even lines and the right eye image 3602 on only odd lines. As a result, a 3-D image can be displayed on the glasses-free type 3-D display 2103.

"100%" has been selected in the magnification combo box 3509 shown in FIG. 57, and hence the 3-D image is displayed at a display magnification of 100% in FIG. 58. If "200%" is selected in the magnification combo box 3509 as shown in FIG. 59, then the rectangular region 3508 indicating the display range of the 3-D image is halved in size in both the horizontal and vertical directions, and in accordance with this the display magnification of the 3-D image displayed on the glasses-free type 3-D display 2103 becomes 200%. Moreover, if the mouse cursor 3701 is moved to any chosen position on the 2-D image 3507 corresponding to the 3-D image and then the left button of the mouse 2105 is clicked, then the center of the rectangular region 3508 indicating the display range of the 3-D image moves to the clicked position, and in accordance with this the display position of the 3-D image displayed on the glasses-free type 3-D display 2103 moves as shown in FIG. 60.

At this time, the 3-D image display program calculates the size and display position of the rectangular region 3508 indicating the display range of the 3-D image and the size and display position of the 3-D image displayed on the glasses-free type 3-D display 2103 using the following procedure.

Figure 61:
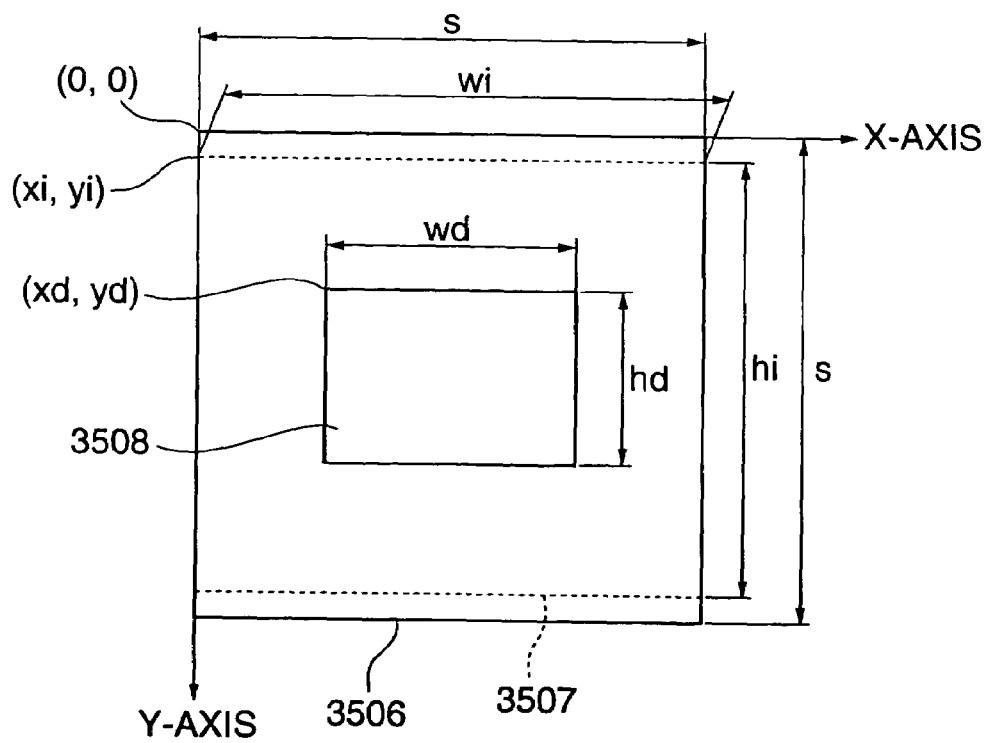
FIG. 61 is a diagram showing the positional relationship between a reduced image display window, a 2-D image corresponding to a 3-D image, and a rectangular region showing the display range of the 3-D image, according to the third embodiment.

FIG. 61 is a diagram showing the positional relationship between the reduced image display window 3506, the 2-D image 3507 corresponding to the 3-D image, and the rectangular region 3508 showing the display range of the 3-D image, according to the third embodiment. In FIG. 61, the reduced image display window 3506 has a predetermined size, and here it is assumed that both the width and height have the same value s. Moreover, the top left corner of the reduced image display window 3506 is taken as the origin (0,0) of the XY coordinates in FIG. 61.

The image sizes of the left and right eye images that constitute the 3-D image are equal; let the width and height of these images be represented by Wi and Hi respectively. The 2-D image 3507 corresponding to the 3-D image is obtained by taking one of the left and right eye images that constitute the 3-D image and then reducing the size such that the larger of the width and the height becomes the value s, with the aspect ratio being held constant.

Figure 62:
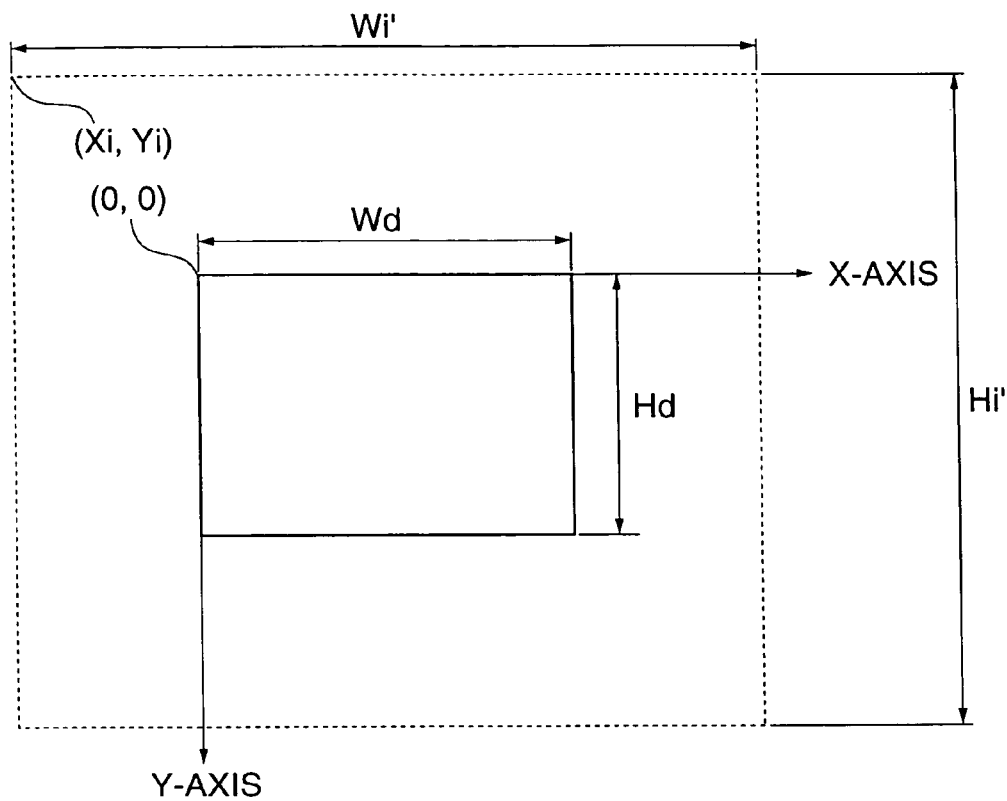
FIG. 62 is a diagram showing the positional relationship between a screen of the glasses-free type 3-D display and a 3-D image displayed thereon, according to the third embodiment.

For convenience, FIG. 62 will now be partially described. FIG. 62 is a diagram showing the positional relationship between the screen of the glasses-free type 3-D display 2103 and the 3-D image displayed thereon, according to the third embodiment. The screen of the glasses-free type 3-D display 2103 has a predetermined size; let the width and height thereof be represented by Wd and Hd respectively. Moreover, the top left corner of the screen of the glasses-free type 3-D display 2103 is taken as the origin (0,0) of the XY coordinates in FIG. 62.

Let the magnification selected using the magnification combo box 3509 shown in FIG. 57 or FIG. 59 be represented by Z. When "100%" is selected in the magnification combo box 3509, Z=100. Letting the width and height of the whole of the 3-D image (including any part not displayed on the screen of the glasses-free type 3-D display 2103) enlarged or reduced in accordance with the value Z be represented by Wi' and Hi' respectively, Wi' and Hi' can be calculated from equations (21) and (22).

$$Wi'=Wi \times Z/100 \quad (21)$$

$$Hi'=Hi \times Z/100 \quad (22)$$

A value L used in subsequent equations will now be defined. The value L is calculated from equation (23) or equation (24) depending on the relationship between the values Wi and Hi.

If Wi≧Hi, then:

$$L=Wi' \quad (23)$$

If Wi<Hi, then:

$$L=Hi' \quad (24)$$

In FIG. 61, letting the width and height of the 2-D image 3507 corresponding to the 3-D image be represented by wi and hi respectively, the values wi and hi can be calculated from equations (25) and (26) respectively or equations (27) and (28) respectively depending on the relationship between the values Wi and Hi.

If Wi≧Hi, then:

$$wi=s \quad (25)$$

$$hi=Hi \times s/Wi \quad (26)$$

If Wi<Hi, then:

$$wi=Wi \times s/Hi \quad (27)$$

$$hi=s \quad (28)$$

Letting the X- and Y-coordinates of the top left corner of the 2-D image 3507 corresponding to the 3-D image be represented by xi and yi respectively in an initial state, i.e. in a state in which the left button of the mouse 2105 has not yet been clicked with the mouse cursor over the 2-D image 3507 corresponding to the 3-D image, the values xi and yi can be calculated from equations (29) and (30) respectively.

$$xi=(s-wi)/2 \quad (29)$$

$$yi=(s-hi)/2 \quad (30)$$

Letting the width and height of the rectangular region 3508 indicating the display range of the 3-D image be represented by wd and hd respectively, the value wd can be calculated from equation (31) or equation (32) depending on the relationship between the value L and the value Wd, and the value hd can be calculated from equation (33) or equation (34) depending on the relationship between the value L and the value Hd.

If L>Wd, then:

$$wd=Wd \times s/L \quad (31)$$

If L≦Wd, then:

$$wd=S \quad (32)$$

If L>Hd, then:

$$hd=Hd \times s/L \quad (33)$$

If L≦Hd, then:

$$hd=S \quad (34)$$

Letting the X- and Y-coordinates of the top left corner of the rectangular region 3508 indicating the display range of the 3-D image be represented by xd and yd respectively in the initial state, i.e. in the state in which the left button of the mouse 2105 has not yet been clicked with the mouse cursor over the 2-D image 3507 corresponding to the 3-D image, the values xd and yd can be calculated using equations (35) and (36).

$$xd=(s-wd)/2 \quad (35)$$

$$yd=(s-hd)/2 \quad (36)$$

In FIG. 61, let the X- and Y-coordinates of the mouse cursor be represented by xc and yc respectively when the left button of the mouse 2105 is clicked with the mouse cursor over the 2-D image 3507 corresponding to the 3-D image. At this time, the display position must be moved such that the center of the rectangular region 3508 indicating the display range of the 3-D image moves to the coordinates (xc,yc). However, the 3-D image should be displayed such that the whole of the screen of the glasses-free type 3-D display 2103 is used effectively, and hence the rectangular region 3508 indicating the display range of the 3-D image is made to remain within the range of the 2-D image 3507 corresponding to the 3-D image. Values xm and ym are thus first calculated using equations (37) and (38) respectively.

$$xm=wd/2+xi \quad (37)$$

$$ym=hd/2+yi \quad (38)$$

Letting the new X- and Y-coordinates (i.e. the X- and Y-coordinates after the movement) of the rectangular region 3508 indicating the display range of the 3-D image be represented by xd' and yd' respectively, the value xd' can be calculated from equation (39), (40) or (41) depending on the relationship between the value xc and the value xm, and the value yd' can be calculated from equation (42), (43) or (44) depending on the relationship between the value yc and the value ym.

If xc≦xm, then:

$$xd'=xd+xm-(s/2) \quad (39)$$

If xc≧(s-xm), then:

$$xd'=xd-xm+(s/2) \quad (40)$$

If xc>xm and xc<(s-xm), then:

$$xd'=xd+xc-(s/2) \quad (41)$$

If yc≦ym, then:

$$yd'=yd+ym-(s/2) \quad (42)$$

If yc≧(s-ym), then:

$$yd'=yd-ym+(s/2) \quad (43)$$

If yc>ym and yc<(s-ym), then:

$$yd'=yd+yc-(s/2) \quad (44)$$

In FIG. 62, letting the X- and Y-coordinates of the top left corner of the 3-D image (including any part not displayed on the screen of the glasses-free type 3-D display 2103)

enlarged or reduced in accordance with the magnification (the value Z) selected using the magnification combo box 3509 be represented by Xi and Yi respectively, the values Xi and Yi can be calculated using equations (45) and (46) respectively. It should be noted, however, that these values Xi and Yi are for the state in which the left button of the mouse 2105 has not yet been clicked with the mouse cursor over the 2-D image 3507 corresponding to the 3-D image.

$$Xi=(Wd-Wi')/2 \quad (45)$$

$$Yi=(Hd-Hi')/2 \quad (46)$$

Next, letting the X- and Y-coordinates of the top left corner of the 3-D image in the state in which the left button of the mouse 2105 has been clicked with the mouse cursor over the 2-D image 3507 corresponding to the 3-D image (i.e. after moving to the new position) be represented by Xi' and Yi' respectively, the values Xi' and Yi' can be calculated using equations (47) and (48) respectively.

$$Xi'=(xd'-xd) \times L/s \quad (47)$$

$$Yi'=(yd'-yd) \times L/s \quad (48)$$

As described above, according to the image display apparatus of the third embodiment of the present invention, the CPU 2201 of the PC 2101 carries out display control in accordance with the 3-D image display program such that user interfaces are displayed on a 2-D image display unit (the 2-D display 2102) and a 3-D image is displayed on a 3-D image display unit (the glasses-free type 3-D display 2103), and also carries out display control such that 2-D image display control and 3-D image display control are linked together. As a result, the following effect is produced.

User interfaces for the 3-D image and display control results (a 2-D image corresponding to the 3-D image) can be displayed to one user, and at the same time display control results (the 3-D image) only can be displayed to another user.

Fourth Embodiment

Small characters or detailed patterns displayed on a glasses-free type 3-D display of a general purpose 3-D image display apparatus may be extremely difficult to see, since the spatial resolution per eye of such a glasses-free type 3-D display is half of that for a 2-D display as described above. The present embodiment resolves this problem. In the second embodiment described above, there is provided an image display apparatus in which user interfaces are displayed on a 2-D image display unit and 3-D images are displayed on a 3-D image display unit. However, the user always needs to use both the 2-D image display unit and the 3-D image display unit, and hence if the user wishes to use only the 3-D image display unit or only the 2-D image display unit, then these requirements cannot be met.

To improve this situation, the fourth embodiment provides an image display apparatus capable of displaying user interfaces and images in a suitable format in any of cases where only the 3-D image display unit is used, only the 2-D image display unit is used, and both the 3-D image display unit and the 2-D image display unit are used in accordance with the user's requirements.

As in the second embodiment described above, the image display apparatus according to the fourth embodiment is comprised of a personal computer (PC) 2101, a 2-D display (2DDP) 2102, a glasses-free type 3-D display (3DDP) 2103, a keyboard (KB) 2104 (display position setting means), and a mouse (MS) 2105 (display position setting means) (see FIG. 52). The constitutions of these parts were described in detail with respect to the second embodiment, and hence description is omitted here.

As in the second embodiment, the PC 2101 of the image display apparatus according to the fourth embodiment, which is capable of executing a 3-D image display program (user interface switching means, image switching means), has a CPU 2201 (user interface switching means, image switching means), a ROM 2202, a RAM 2203, a disk controller (DKC) 2204, a hard disk (HD) 2205, a floppy disk controller (FD) 2206, a CD-ROM drive (CD-ROM) 2207, a system bus 2210, a display controller (DPC) 2211, a keyboard controller (KBC) 2212, and a mouse controller (MSC) 2213 (see FIG. 53). The constitutions of these parts were described in detail with respect to the second embodiment, and description is omitted here.

Moreover, regarding the correspondence between a virtual screen managed by the OS and screens displayed on the displays in the fourth embodiment, as in the second embodiment, the virtual screen 2401 managed by the OS has a range including a screen 2402 displayed on the 2-D display 2102 and a screen 2403 displayed on the glasses-free type 3-D display 2103 (see FIG. 54). In FIG. 54, the screen 2402 occupies a region of the virtual screen 2401 from coordinates (x0,y0) to coordinates (x1,y1), and the screen 2403 occupies a region of the virtual screen 2401 from coordinates (x1,y0) to coordinates (x2,y1). It should be noted that the screen 2402 and the screen 2403 do not necessarily have to be arranged as shown in FIG. 54; other arrangements are possible in accordance with the OS specifications.

Operating systems capable of screen control as shown in FIG. 54 include Windows 98 and Windows 2000 made by Microsoft. However, the 3-D image display program is not limited to being run on a particular OS. Any OS capable of outputting different screens to two displays may be used.

The OS displays images drawn in the screen 2402 region on the 2-D display 2102 and images drawn in the screen 2403 region on the glasses-free type 3-D display 2103, this being done via the display controller (DPC) 2211. By calling up OS functions, the 3-D image display program can obtain the coordinates indicating the screen 2402 region and the coordinates indicating the screen 2403 region.

By using OS functions, the user can move any chosen window to any chosen position within the range of the virtual screen 2401 managed by the OS. By calling up OS functions, the 3-D image display program can obtain the positions in which an application window 4500 (user interfaces), described below, and a 3-D image display window 4700 (an image) are displayed. These display positions can be set using the keyboard (KB) 2104 or the mouse (MS) 2105.

The 3-D image display program can thus find out whether each of the application window 4500 (the user interfaces) and the 3-D image display window 4700 (the image) is displayed on the screen 2402 (the 2-D display 2102) or the screen 2403 (the glasses-free type 3-D display 2103).

Figure 63:
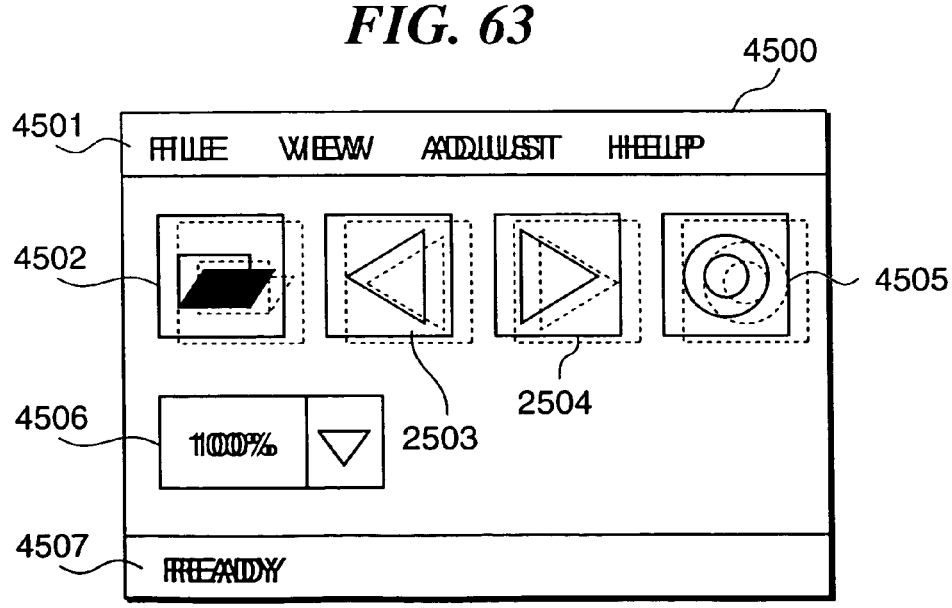
FIG. 63 is a view showing user interfaces using 3-D images displayed by the 3-D image display program according to the fourth embodiment.
Figure 64:
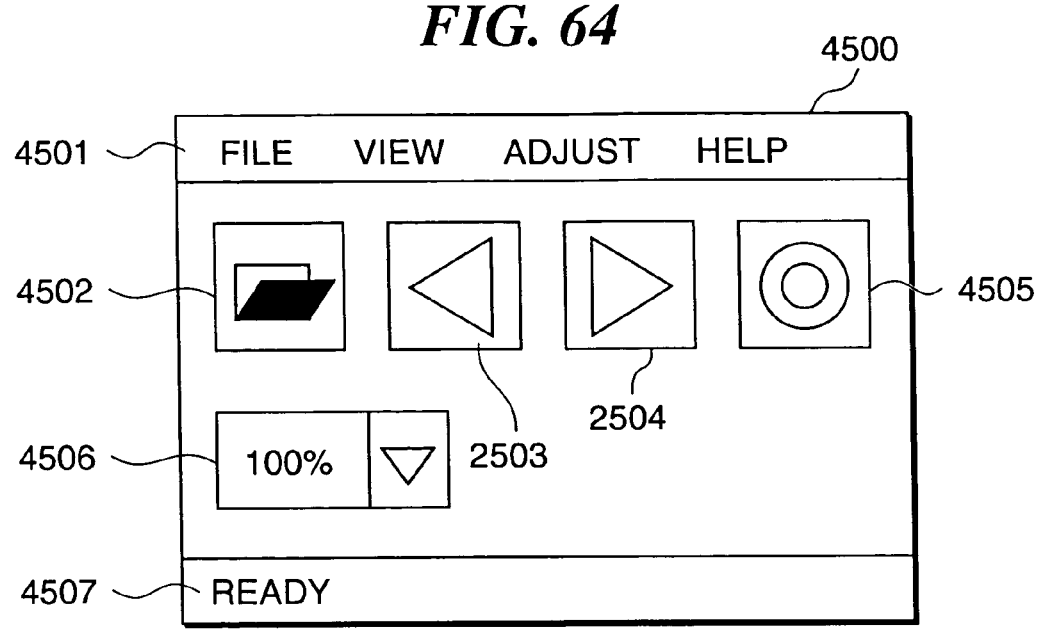
FIG. 64 is a view showing user interfaces using 2-D images displayed by the 3-D image display program according to the fourth embodiment.

FIG. 63 is a view showing user interfaces using 3-D images drawn by the 3-D image display program according to the fourth embodiment. FIG. 64 is a view showing user interfaces using 2-D images displayed by the 3-D image display program according to the fourth embodiment. Here, the user interfaces shown in FIGS. 63 and 64 will be described using terms used with Microsoft Windows 98. The application window 4500 contains a menu bar 4501, push buttons 4502 to 4505, a combo box 4506 and a status bar 4507. It should be noted, however, that these user interfaces are only examples used to show how the application window 4500 might look, and description of the functions thereof is omitted here. Any types of user interface can be adopted in the present invention, with the types not being limited to those shown in FIGS. 63 and 64.

As described above, the 3-D image display program can find out whether the application window 4500 (the user interfaces) is displayed on the screen 2402 (the 2-D display 2102) or the screen 2403 (the glasses-free type 3-D display 2103). When the application window 4500 is displayed on the screen 2402 (the 2-D display 2102), the user interfaces using 2-D images shown in FIG. 64 are displayed, whereas when the application window 4500 is displayed on the screen 2403 (the glasses-free type 3-D display 2103), the user interfaces using 3-D images shown in FIG. 63 are displayed.

Figure 65:
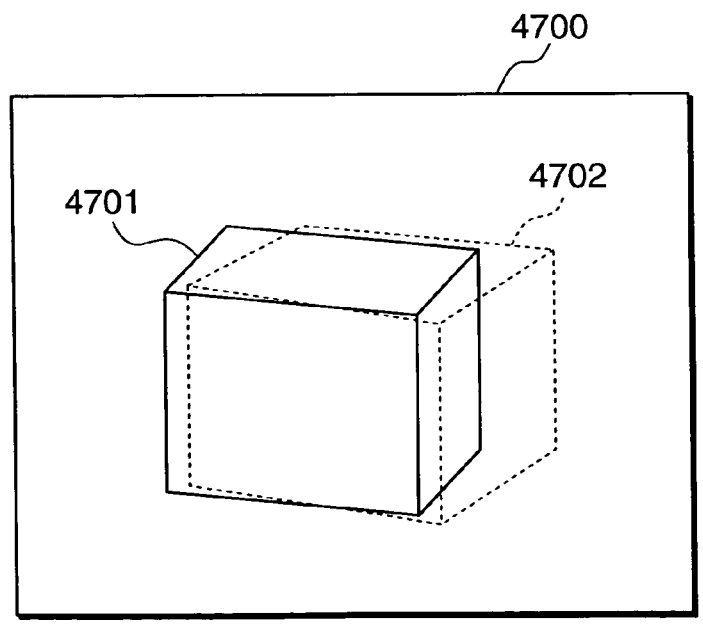
FIG. 65 is a view showing a 3-D image obtained by compositing a left eye image and a right eye image and displayed by the 3-D image display program according to the fourth embodiment.

FIG. 65 is a view showing a 3-D image obtained by compositing a left eye image and a right eye image and displayed by the 3-D image display program according to the fourth embodiment. A 3-D image obtained by compositing left eye image 4701 and a right eye image 4702 is drawn in the 3-D image display window 4700.

Figure 66:
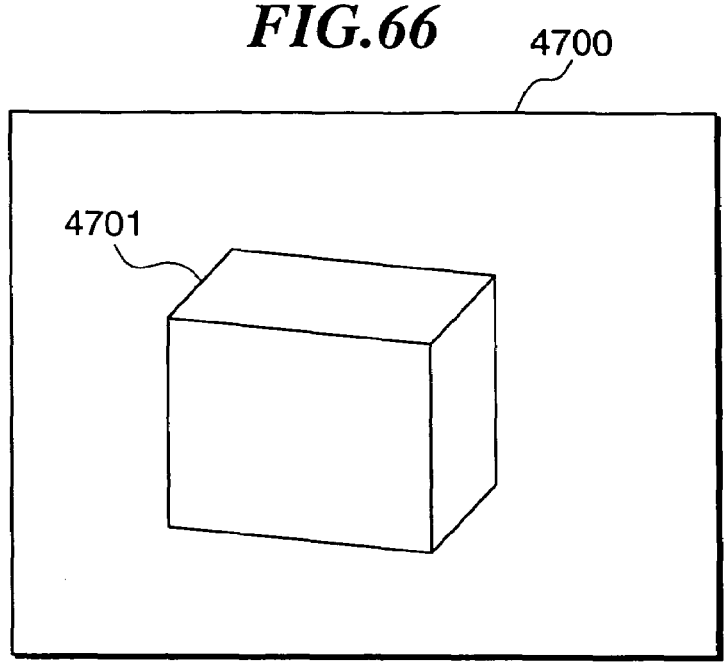
FIG. 66 is a view showing a 2-D image obtained by selecting either a left eye image or a right eye image and displayed by the 3-D image display program according to the fourth embodiment.

FIG. 66 is a view showing a 2-D image obtained by selecting either a left eye image or a right eye image and displayed by the 3-D image display program according to the fourth embodiment. In the example in FIG. 66, the left eye image 4701 is drawn in the 3-D image display window 4700.

As described above, the 3-D image display program can find out whether the 3-D image display window 4700 (the image) is displayed on the screen 2402 (the 2-D display 2102) or the screen 2403 (the glasses-free type 3-D display 2103). When the 3-D image display window 4700 is displayed on the screen 2402 (the 2-D display 2102), the 2-D image obtained by selecting either the left eye image 4701 or the right eye image 4702 is displayed as shown in FIG. 66, whereas when the 3-D image display window 4700 is displayed on the screen 2403 (the glasses-free type 3-D display 2103), the 3-D image obtained by compositing the left eye image 4701 and the right eye image 4702 is displayed as shown in FIG. 65.

Here, it is assumed that the glasses-free type 3-D display 2103 is designed such that the left eye image is displayed on even lines thereof and the right eye image on odd lines thereof. In this case, the 3-D image display program draws the left eye image 4701 on only even lines of the screen 2403 and the right eye image 4702 on only odd lines. As a result, a 3-D image can be displayed on the glasses-free type 3-D display 2103.

As described above, according to the image display apparatus of the fourth embodiment of the present invention, the CPU 2201 of the PC 2101 carries out display control in accordance with the 3-D image display program such that user interfaces using 2-D images are displayed when the application window is displayed on the 2-D image display unit (the 2-D display 2102), user interfaces using 3-D images are displayed when the application window is displayed on the 3-D image display unit (the glasses-free type 3-D display 2103), a 2-D image obtained by selecting either a left eye image or a right eye image is displayed when the 3-D image display window is displayed on the 2-D image display unit (the 2-D display 2102), and a 3-D image obtained by compositing a left eye image and a right eye image is displayed when the 3-D image display window is displayed on the 3-D image display unit (the glasses-free type 3-D display 2103). As a result, the following effect is produced.

It is possible to display user interfaces and images in a suitable format in any of cases where only the 3-D image display unit (the glasses-free type 3-D display 2103) is used, only the 2-D image display unit (the 2-D display 2102) is used, and both the 3-D image display unit (the glasses-free type 3-D display 2103) and the 2-D image display unit (the 2-D display 2102) are used in accordance with the user's requirements.

It should be noted that the present invention may either be applied to a system composed of a plurality of apparatuses or to a single apparatus.

Moreover, it goes without saying that the objects of the present invention can also be achieved by supplying a system or apparatus with a storage medium storing program code of a software program that realizes the functions of the embodiments described above, and then causing a computer (or CPU, MPU or the like) of the system or apparatus to read and execute the program code stored on the storage medium.

In this case, the program code itself read from the storage medium realizes the functions of the embodiments described above, and hence the storage medium on which the program code is stored constitutes the present invention. Examples of the storage medium for supplying the program code include a floppy disk, a hard disk, an optical disk, a magnetic-optical disk, a CD-ROM, a CD-R, a magnetic tape, a nonvolatile memory card, and a ROM. Alternatively, the program code may be downloaded from a network.

Moreover, it also goes without saying that the functions of the embodiments described above may be realized not necessarily by causing the computer to read and execute the program code, but alternatively by causing an operating system (OS) running on the computer to perform part or all of the actual processing based on instructions in the program code.

Furthermore, it also goes without saying that the functions of the embodiments described above may be realized by writing the program code read from the storage medium into a memory provided on a function expansion board inserted into the computer or in a function expansion unit connected to the computer, and then causing a CPU or the like provided on the function expansion board or in the function expansion unit to perform part or all of the actual processing based on instructions in the program code.

Figure 68:
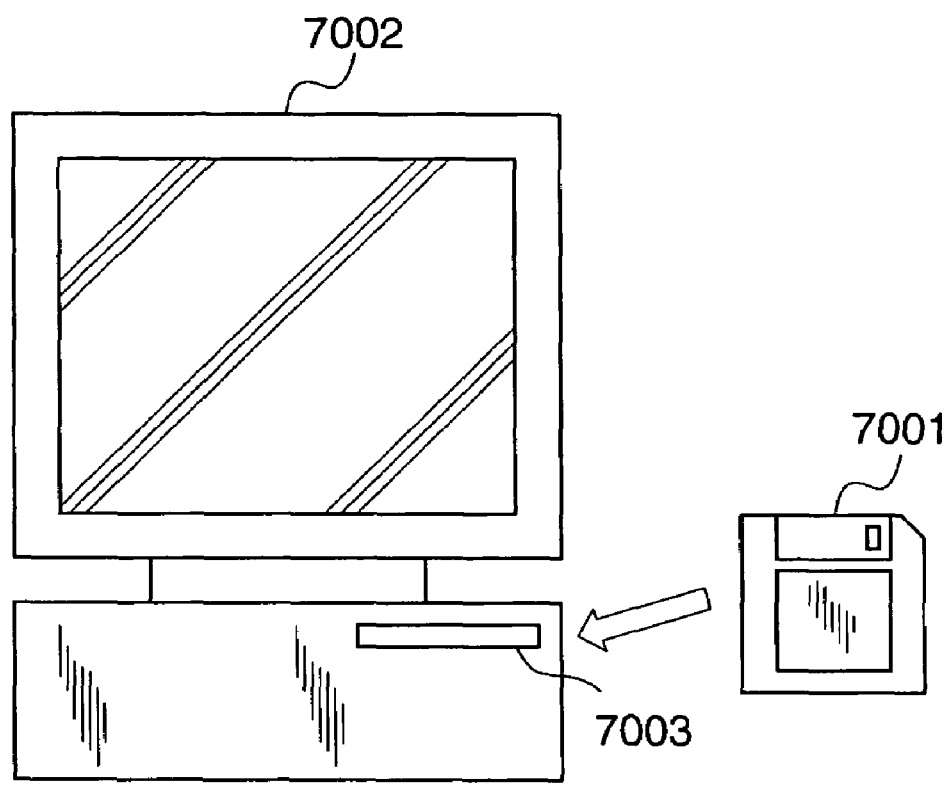
FIG. 68 is a view showing an example of supplying a program for implementing the image display method according to the present invention using the stereo image display apparatus according to any of the second to fourth embodiments and related data from a storage medium to an apparatus.

FIG. 68 is a view showing an example of supplying the program that implements the image display method according to the present invention using any of the second to fourth embodiments described above and related data from a storage medium to an apparatus. The program that implements the image display method according to the present invention and the related data are supplied by first inserting a storage medium 7001 such as a floppy disk or a CD-ROM into a storage medium drive insertion port 7003 of an apparatus 7002 such as a computer. The program that implements the image display method according to the present invention and the related data are then first installed from the storage medium 7001 into a hard disk and then loaded from the hard disk into a RAM, or are loaded directly into the RAM without installing into the hard disk. The program and the related data can then be executed.

When the program that implements the image display method according to the present invention is executed in the image display apparatus according to any of the second to fourth embodiments of the present invention described above, the program and the related data are either stored in the image display apparatus in advance, or else are supplied to the image display apparatus following, for example, the procedure described above with reference to FIG. 68. As a result, the program becomes executable.

Figure 67:
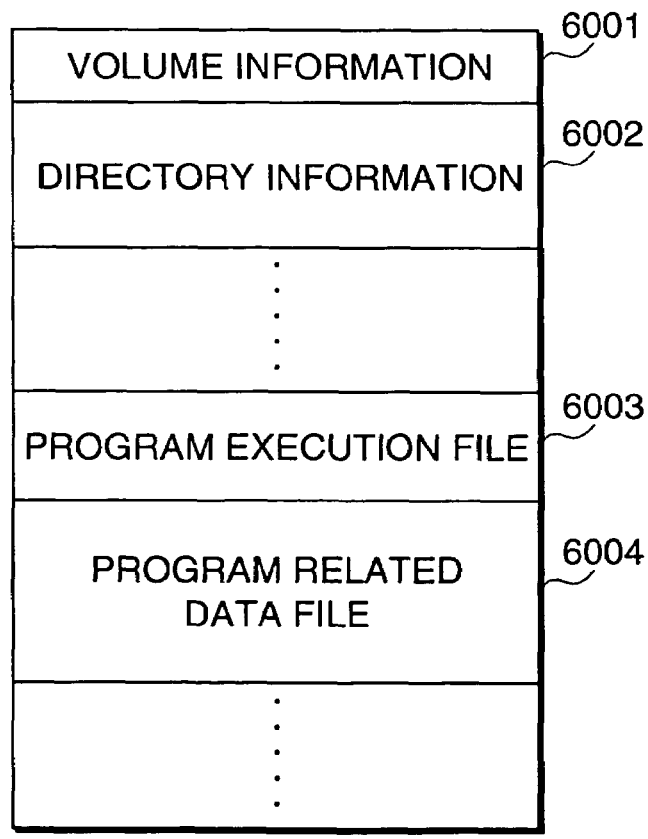
FIG. 67 is a diagram showing an example of the constitution of the storage contents of a storage medium storing a program for implementing an image display method according to the present invention using the stereo image display apparatus according to any of the second to fourth embodiments and related data.

FIG. 67 is a diagram showing an example of the constitution of the storage contents of a storage medium storing the program that implements the image display method according to the present invention using any of the second to fourth embodiments described above and related data. The storage contents are composed, for example, of volume information 6001, directory information 6002, a program execution file 6003, a program related data file 6004, and the like. The program code of the program that implements the image display method according to the present invention is written in accordance with the image display procedure described above.

As described above, according to the second embodiment of the present invention, only user interfaces are displayed on the 2-D image display unit, and only 3-D images are displayed on the 3-D image display unit. As a result, an image display apparatus and image display method allowing easily viewable user interfaces and 3-D images to be displayed simultaneously, and a storage medium storing a program for implementing the image display method, can be provided.

Moreover, according to the third embodiment, an image display apparatus and an image display method allowing user interfaces for a 3-D image and display control results (a 2-D image corresponding to the 3-D image) to be displayed to one user, and at the same time only display control results (the 3-D image) to be displayed to another user, and a storage medium storing a program for implementing the image display method, can be provided.

Moreover, according to the fourth embodiment, an image display apparatus and an image display method allowing user interfaces and images to be displayed in a suitable format in any of cases where only the 3-D image display unit is used, only the 2-D image display unit is used, and both the 3-D image display unit and the 2-D image display unit are used in accordance with the user's requirements, and a storage medium storing a program for implementing the image display method, can be provided.

What is claimed is:

1. A stereo image display apparatus allowing proper viewing from a suitable viewing position of a stereo image composed of a left eye image and a right eye image, the stereo image display apparatus comprising:
    a display unit adapted to display the left eye image and the right eye image on a display screen of said display unit to generate the stereo image; and
    a display control unit adapted to display predetermined constant marks on the display screen for causing a user to confirm whether a viewing position of the user is proper or not for observing the stereo image as a 3-D image, wherein the predetermined constant marks appear for the user different between in the case where the viewing position is proper for observing the stereo image as a 3-D image and in the case where the viewing position is not proper for observing the stereo image as a 3-D image.

2. A stereo image display apparatus as claimed in claim 1, including an input unit adapted to set a display method comprising at least one of display position, display range, and display color, of the predetermined image.

3. A stereo image display apparatus as claimed in claim 1, wherein the predetermined constant marks include fixed patterns.

4. A stereo image display apparatus as claimed in claim 1, wherein said display control unit is adapted to display, as the predetermined constant marks, a left eye pattern in a predetermined region on the display screen in pixel positions only seen by a left eye of the user, and a right eye pattern in a predetermined region on the display screen in pixel positions only seen by a right eye of the user.

5. A stereo image display apparatus as claimed in claim 1, wherein the display screen is a glasses-free type 3-D display screen.

6. A stereo image display method for use in a stereo image display apparatus allowing proper viewing from a suitable viewing position of a stereo image composed of a left eye image and a right eye image, the stereo image display method comprising:
    a display step of displaying the left eye image and the right eye image on a display screen of a display unit to generate the stereo image; and
    a display control step of displaying predetermined constant marks on the display screen for causing a user to confirm whether a viewing position is proper or not for observing the stereo image as a 3-D image, wherein the predetermined constant marks appear for the user different between in the case where the viewing position is proper for observing the stereo image as a 3-D image and in the case where the viewing position is not proper for observing the stereo image as a 3-D image.

7. A stereo image display method as claimed in claim 6, including an input step of setting a display method comprising at least one of display position, display range, and display color, of the predetermined image.

8. A stereo image display method as claimed in claim 6, wherein the predetermined constant marks include fixed patterns.

9. A stereo image display method as claimed in claim 6, wherein said display control step comprises displaying, as the predetermined constant marks, a left eye pattern in a predetermined region on the display screen in pixel positions only seen by a left eye of the user, and a right eye pattern in a predetermined region on the display screen in pixel positions only seen by a right eye of the user.

10. A stereo image display method as claimed in claim 6, wherein the display screen is a glasses-free type 3-D display screen.

11. A computer-readable storage medium storing a program causing a computer to implement a stereo image display method for use in a stereo image display apparatus allowing proper viewing from a suitable viewing position of a stereo image composed of a left eye image and a right eye image, the stereo image display method comprising:
    a display step of displaying the left eye image and the right eye image on a display screen of a display unit to generate the stereo image; and
    a display control step of displaying predetermined constant marks on the display screen for causing a user to confirm whether a viewing position is proper or not for observing the stereo image as a 3-D image, wherein the predetermined constant marks appear for the user different between in the case where the viewing position is proper for observing the stereo image as a 3-D image and in the case where the viewing position is not proper for observing the stereo image as a 3-D image.

12. A storage medium as claimed in claim 11, wherein the stereo image display method includes an input step of setting a display method comprising at least one of display position, display range, and display color, of the predetermined image.

13. A storage medium as claimed in claim 11, wherein the predetermined constant marks include fixed patterns.

14. A storage medium as claimed in claim 11, wherein said display control step comprises displaying, as the predetermined constant marks, a left eye pattern in a predetermined region on the display screen in pixel positions only seen by a left eye of the user, and a right eye pattern in a predetermined region on the display screen in pixel positions only seen by a right eye of the user.

* * * * *